United States Patent [19]

Flores et al.

[11] Patent Number: 5,734,837
[45] Date of Patent: *Mar. 31, 1998

[54] METHOD AND APPARATUS FOR BUILDING BUSINESS PROCESS APPLICATIONS IN TERMS OF ITS WORKFLOWS

[75] Inventors: Pablo A. Flores, Alameda; Rodrigo F. Flores, Berkeley, both of Calif.; Raul Medina-Mora Icaza, Mexico City, Mexico; Jaime Garza Vasquez, Alameda, Calif.; John A. McAfee, Kensington, Calif.; Manoj Kumar; Manuel Jasso Nuñez, both of Alameda, Calif.; Terry Allen Winograd, Stanford, Calif.; Harry K. T. Wong, Danville, Calif.; Roy L. Gift, San Anselmo, Calif.

[73] Assignee: Action Technologies, Inc., Alameda, Calif.

[*] Notice: The term of this patent shall not extend beyond the expiration date of Pat. No. 5,630,069.

[21] Appl. No.: 182,744

[22] Filed: Jan. 14, 1994

[51] Int. Cl.$^6$ .................................................. G06F 19/00
[52] U.S. Cl. .................... 395/207; 395/208; 395/209; 395/211
[58] Field of Search .................... 364/401, 408; 395/207, 208, 209, 211

[56] References Cited

U.S. PATENT DOCUMENTS

| | | |
|---|---|---|
| 3,736,409 | 5/1973 | Boyan . |
| 5,182,705 | 1/1993 | Barr et al. .................. 364/401 |
| 5,216,592 | 6/1993 | Mann et al. .................. 364/401 |
| 5,233,513 | 8/1993 | Doyle .................. 364/401 |
| 5,249,300 | 9/1993 | Bachman et al. . |
| 5,301,320 | 4/1994 | McAtee et al. . |

OTHER PUBLICATIONS

Scherr, A.L.; "A New Approach to Business Processes"; IBM Systems Journal; vol. 32, No. 1; 1993.

Primary Examiner—Gail O. Hayes
Assistant Examiner—Barton L. Bainbridge
Attorney, Agent, or Firm—Blakely Sokoloff Taylor & Zafman

[57] ABSTRACT

The invention is a method and system which provides consultants, business process analysts, and application developers with a unified tool with which to conduct business process analysis, design, documentation and to generate business process definitions and workflow-enabled applications. The invention may be implemented using a software system which has two functional sets. One is a set of graphical tools that can be used by a developer or business analyst to map out business processes. The second is a set of tools that can be used to document and specify in detail the attributes of each workflow definition, including roles, cycle time, conditions, of satisfaction, cost and value, associated text, forms, application data as well as detail the attributes of links between workflows required to complete a business process map, and to generate a business process definition and a workflow-enabled application. In this manner, the invention provides the capability of performing application generation and generation of business process definitions in a definitions database. The invention also includes a workflow language scripting capability.

37 Claims, 14 Drawing Sheets

METHOD AND APPARATUS FOR BUILDING BUSINESS PROCESS APPLICATIONS IN TERMS OF ITS WORKFLOWS

BRIEF SUMMARY OF THE INVENTION

The invention is a method and system which provides consultants, business process analysts, and application developers with a unified tool with which to conduct business process analysis, design, documentation and to generate business process definitions and workflow-enabled applications. The invention may be implemented using a software system which has two functional sets. One is a set of graphical tools that can be used by a developer or business analyst to map out business processes. The second is a set of tools that can be used to document and specify in detail the attributes of each workflow definition, including roles, cycle time, cost and value, conditions of satisfaction, associated text, forms, application data as well as detail the attributes of links between workflows required to complete a business process map, and to generate a business process definition and a workflow-enabled application.

A fundamental concept of workflow analysis is that any business process can be interpreted as a sequence of basic transactions called workflows. Every workflow has a customer, a performer, and conditions of satisfaction. The customer and performer are roles that participants can take in workflows. In addition, each workflow can have observers.

In a workflow, the customer is the person for the sake of whom the work is done, either because they made a request or accepted an offer. It is customers who are responsible for evaluating performed work and determining whether this work meets their conditions of satisfaction.

The performer is the person who is responsible for completing the work and for declaring to the customer when the work is done.

Requests and Offers are the two basic types of workflows. The conditions of satisfaction specify the work to be performed by the performer. In a request, the customer specifies the conditions of satisfaction, and in an offer the performer specifies them. (Then, of course, the two can enter into negotiation about the work to be done.)

For example, given the sentence: "John asked Frank to prepare the report and deliver it by noon on Friday," John is the customer for this workflow, Frank is the performer, and the conditions of satisfaction are "prepare the report and deliver it by noon on Friday." Further, because John asked for the report rather than Frank offering it, this workflow is of the type Request.

Given the sentence: "John proposed to prepare the report and deliver it by noon on Friday for Frank," John is the performer for this workflow, Frank is the customer, and the conditions of satisfaction are still "prepare the report and deliver it by noon on Friday." Further because John proposed the report rather than Frank asking for it, this workflow is of the type Offer.

Observers of workflows take no direct action; they usually observe for management or training purposes.

An important part of a workflow analyst's work is the development of business process maps, with which the analyst and his/her client can readily see and interpret the structure of a business process, and identify quickly areas for clarification or improvement.

Business process maps display the workflows as loops, and display the relevant information about each workflow—the customer, the performer, the conditions of satisfaction, the cycle time and cost/value.

Further, a business process map displays the relationships among workflows, called links. For example, in a loan approval business process, the workflow in which the loan is approved is linked to the workflow in which the bank issues a check. If the loan is approved, that triggers the initiation of the "write check" workflow. If the loan is not approved, the secondary workflow "write check" is not initiated.

Workflow maps highlight the following features of business processes:

the conditions of satisfaction of both internal and external customers;

the roles of process participants;

which workflows are primary and which workflows are secondary to the business process;

what work is performed in serial; what work is performed in parallel;

cycle times for the process, each workflow in the process and the phases of each workflow;

value, cost, application data with attributes, and forms associated with each workflow phase.

Additionally, workflow maps enable analysts to identify opportunities for improvement because workflow maps:

clarify business processes;

identify where roles are unclear or missing;

clarify customer conditions of satisfaction;

identify where customer expectations are unclear or do not match work performed;

indicate where work is redundant or is performed serially when the work could be performed in parallel.

In U.S. application Ser. No. 600,144 filed Oct. 17, 1990, now U.S. Pat. No. 5,216,603 and U.S. Ser. No. 07/368,179 filed Jun. 19, 1989, now U.S. Pat. No. 5,208,748, both owned by Action Technologies, Inc., the assignee of the present application, methods and systems for managing workflows, called conversations in the referenced applications, are described. However, the teachings in the cited references are limited to single workflows with no capability for mapping business processes made up of a number of workflows linked together. In U.S. application Ser. No. 08/005,236 filed Jan. 15, 1993, a method and system are disclosed to:

support the work of analyzing and mapping existing business processes and designing new business processes;

shorten the cycle time of producing workflow enabled applications which allow users and managers to participate in and manage business processes;

reduce existing coordination problems between business process analysts and programmers;

develop maps of a business process;

document a business process;

test maps of a business process for completeness and consistency.

However, the teachings in the pending application do not include the capability to perform application generation, or generate business process definitions in a definitions database, have no workflow language scripting capability and have no business process definition capability.

The invention disclosed in this previously filed application, which is referred to as a workflow analyst, is a component of a complete workflow system. The previously disclosed invention is the component of the system that allows creation of workflow maps of business processes. These maps are an input to another component of a complete workflow system, which component is referred to as a workflow application builder. The workflow application builder is the subject of the present application.

DETAILED DESCRIPTION OF THE INVENTION

OVERVIEW

The present invention is a method and system which is used to: build business process maps (covered in U.S. application Ser. No. 08/005,236 filed Jan. 15, 1993), now U.S. Pat. No. 5,630,069 verify consistency of business process maps, generate business process definitions and generate workflow-enabled applications.

Figure 1A:
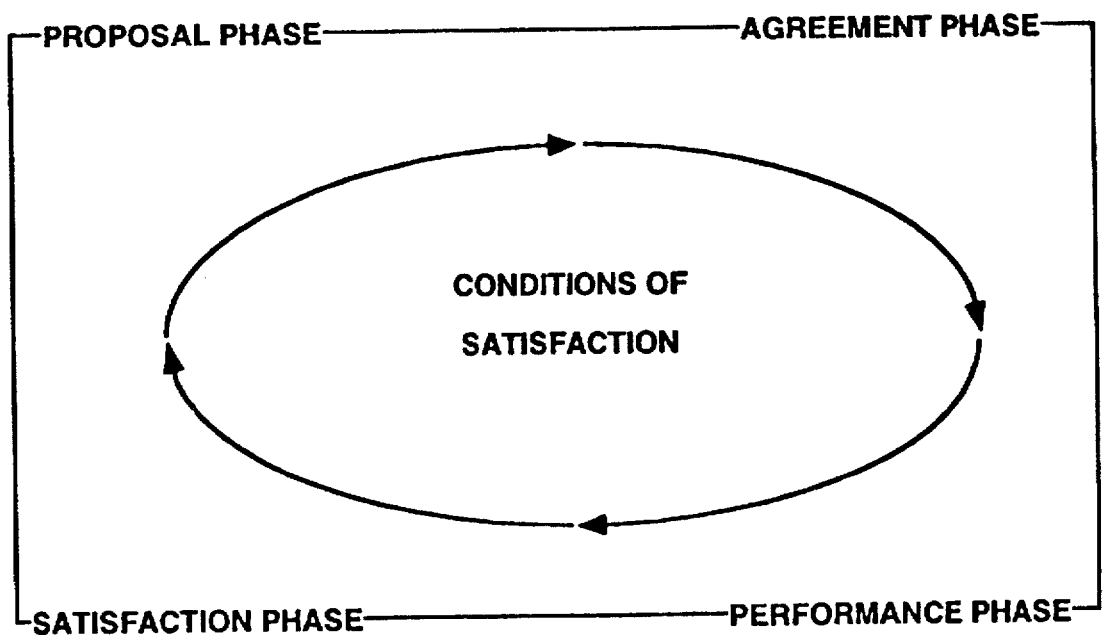
FIG. 1a is pictorial representation showing the phases of a single workflow.
Figure 1B:
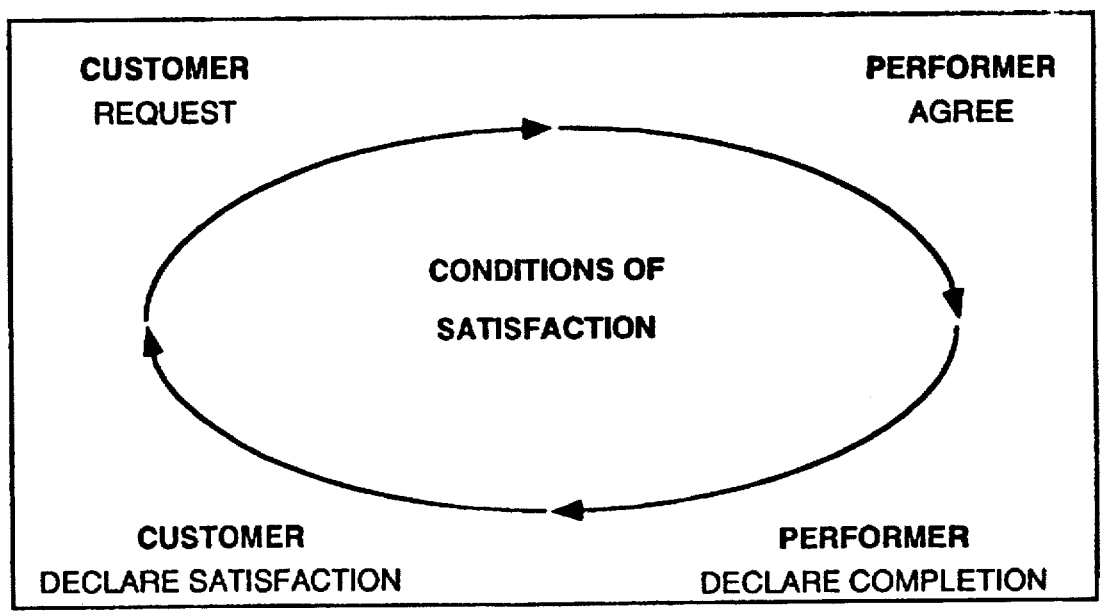
FIG. 1b is pictorial representation of a single workflow showing the normal flow of a request type workflow.
Figure 1C:
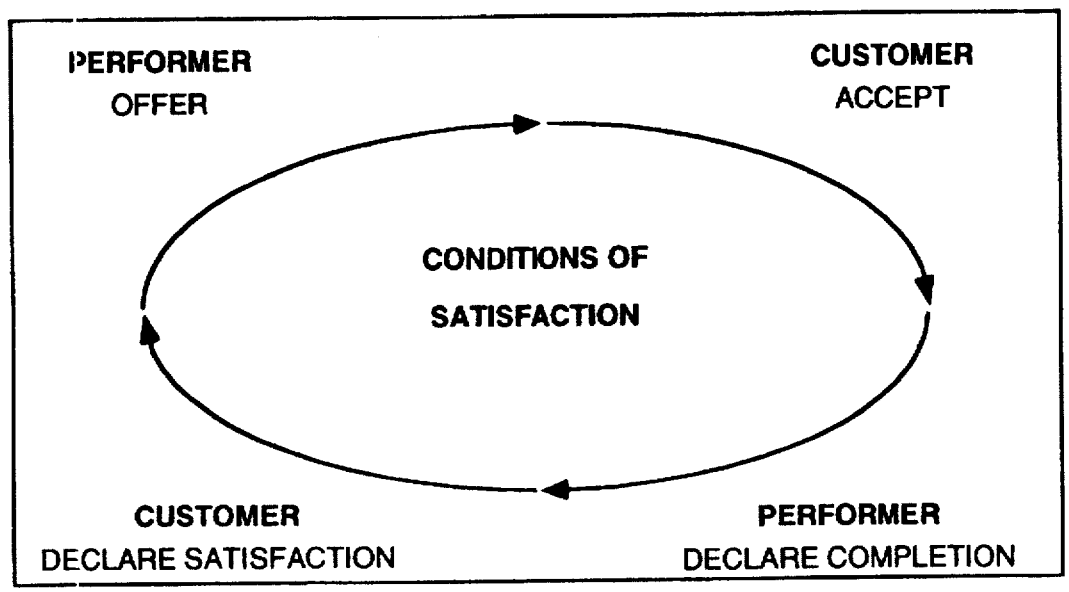
FIG. 1c is pictorial representation of a single workflow showing the normal flow of a offer type workflow.
Figure 1D:
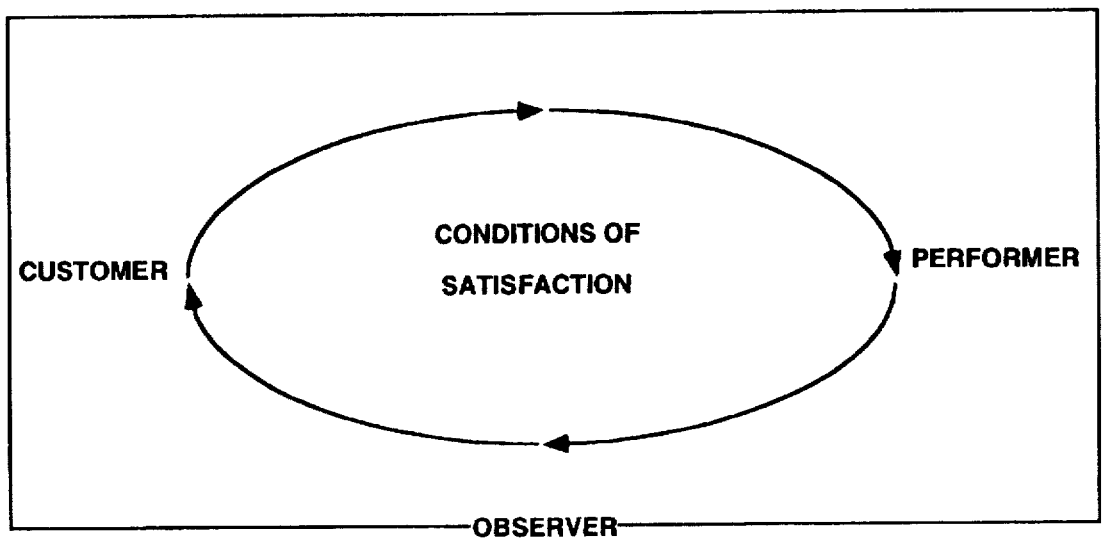
FIG. 1d is pictorial representation of a single workflow showing the roles of participants of a workflow.
Figure 1E:
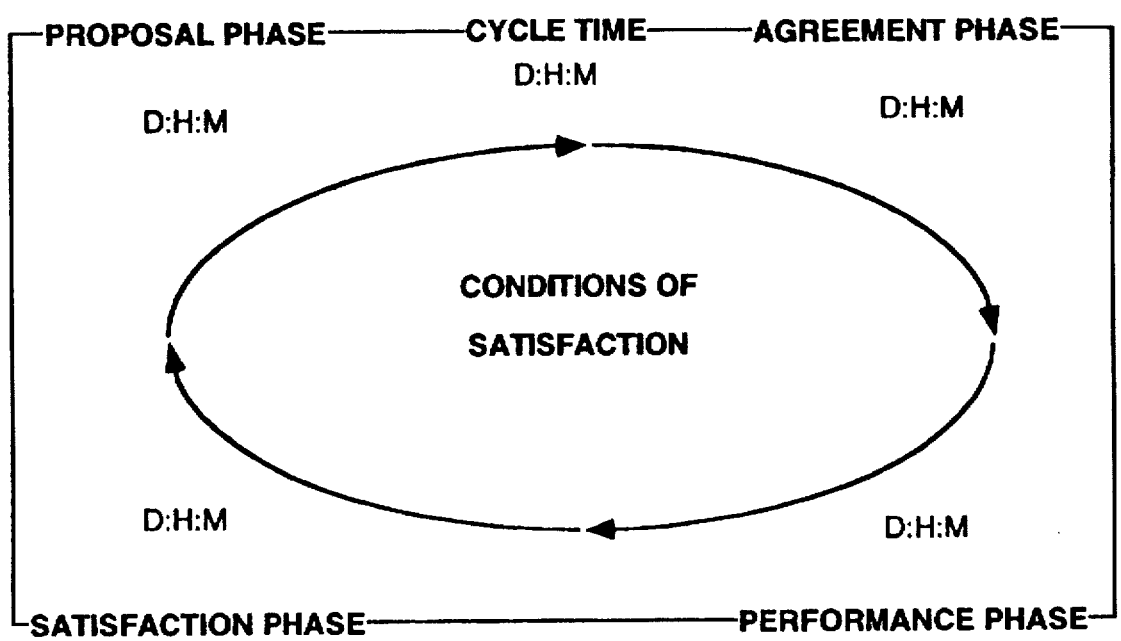
FIG. 1e is pictorial representation of a single workflow showing workflow cycle times.
Figure 1F:
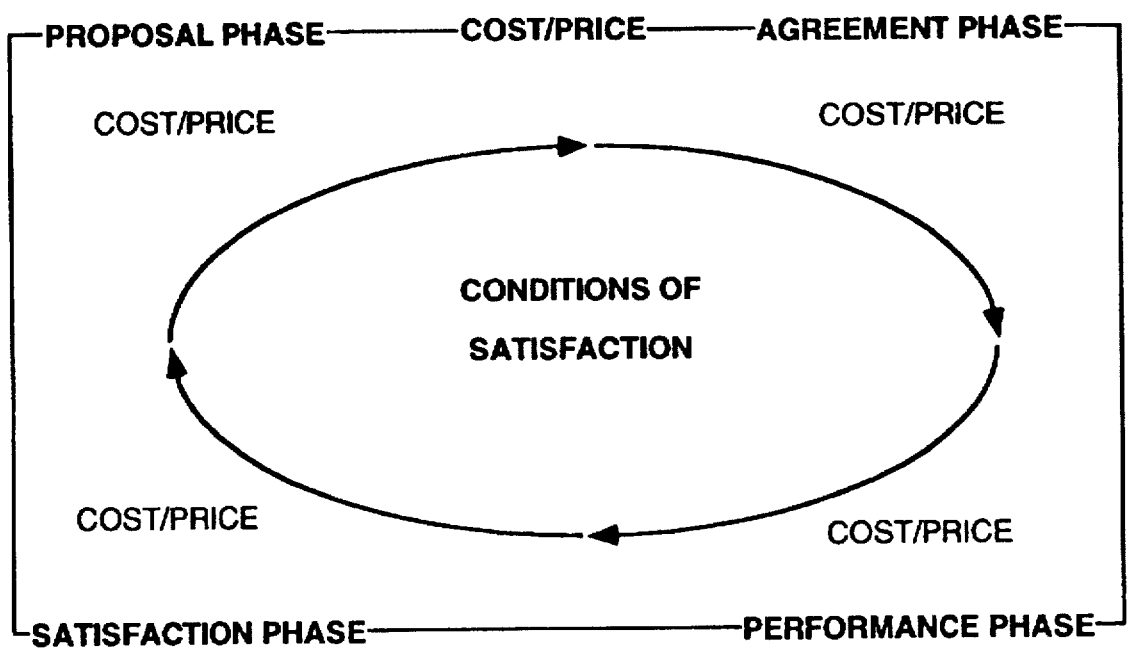
FIG. 1f is pictorial representation of a single workflow showing workflow cost/value.

A single workflow is shown in FIGS. 1a–1f as an elliptical loop with arrows shown in a clockwise direction wherein each quadrant of the ellipse signifies different phases of the workflow. The first phase is called the preparation phase during which a request is made of the prospective performer by a customer (FIG. 1b) or an offer to a customer is made by a prospective performer (FIG. 1c). The second phase is called the negotiation phase during which the offer is accepted by the customer or the request is agreed to by the performer and conditions of satisfaction are identified. Of course, during the negotiation phase, the original conditions of satisfaction can be negotiated by the customer and performer until an agreement is reached. The third phase is called the performance phase during which the performer undertakes to meet the agreed to or accepted conditions of satisfaction. When the performer believes that the conditions of satisfaction have been met, the performer declares completion. The last phase is the acceptance phase during which the customer determines whether or not the conditions of satisfaction have been met by the performer, and if so, declares satisfaction.

Figure 2A:
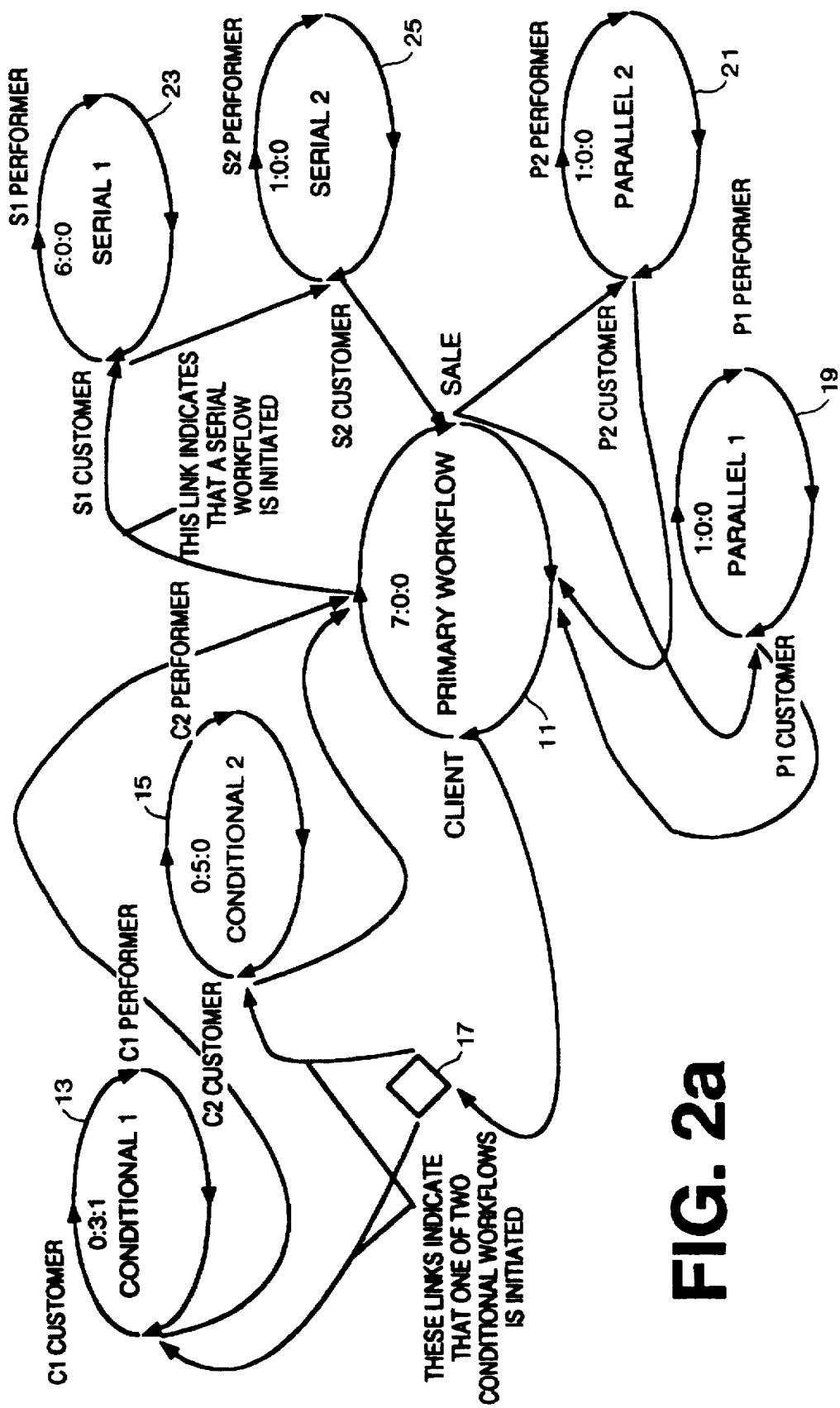
FIG. 2a is pictorial representation of a business process, i.e., a set of linked workflows.

FIG. 2a is a business process map having a primary workflow 11, conditional workflows 13 and 15, a conditional link 17, parallel workflows 19 and 21, serial workflows 23 and 25. It should be noted that while a business process such as the one shown in FIG. 2a can be graphically represented by any one of a number of prior art drawing programs capable of drawing shapes, curved lines, straight lines and arrowheads, such prior art programs have no ability to associate with each workflow various parameters such as roles, cycle time, cost/value, conditions of satisfaction or associate semantics to the links that imply automated action or provide the framework for application building, all of which are necessary to create a useful business process representation.

A workflow can be linked to (and initiate) multiple workflows from one of its phases. If all the workflows start at the same moment, the multiple workflows are said to have started in parallel. Multiple workflows can also be started serially. There are two mechanisms to indicate the serialization of workflows. As illustrated in FIG. 2a, workflows serial 1 and serial 2 are sequential workflows. The primary workflow at the beginning of the agreement phase, has a link to start workflow serial 1. Workflow serial 2 is linked from the satisfaction phase of workflow serial 1. Upon satisfaction of workflow serial 2, there is a link back to the primary workflow.

In workflow analysis practice, it is often necessary and useful to construct business process maps that do not have the four complete phases to illustrate breakdowns in the process.

Components of a Workflow System

Figure 3:
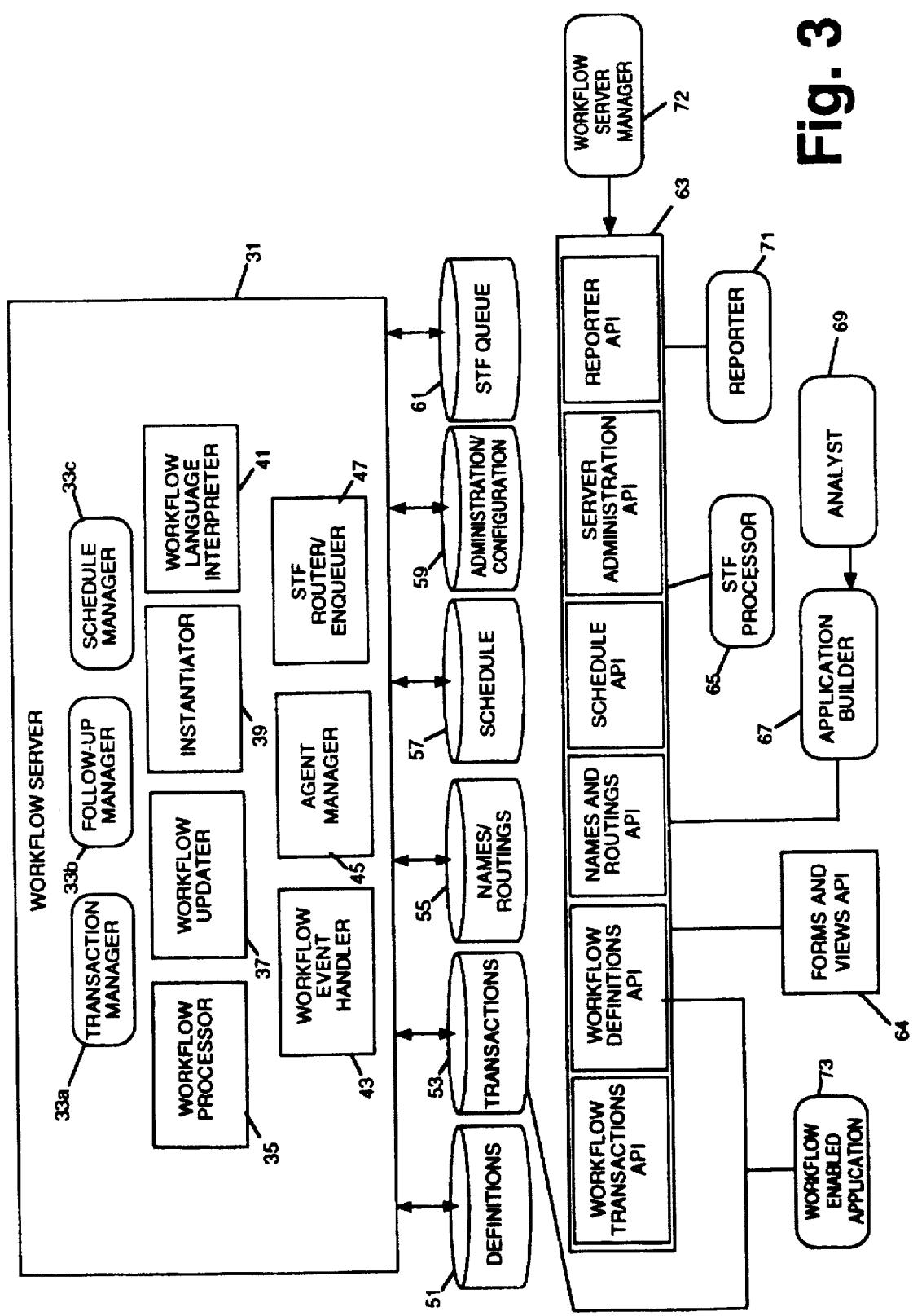
FIG. 3 is a block overview diagram of a complete workflow system showing how the present invention interfaces with the rest of the workflow system.

Although the present invention is one element of a complete workflow system, and details of other elements of a workflow system are not needed to obtain an understanding of the invention, a suitable workflow system in which the present invention may be utilized incorporates the following components which are shown in FIG. 3.

Workflow Server

The workflow server is the heart of a workflow system. The workflow system concentrates workflow operations in the workflow server rather than in the end user applications. By using this client/server design, applications do not need to have the intelligence about workflows as part of their design. Application developers can concentrate on their particular application development not having to worry about workflow logic and overhead because such functionality is handled at the server. Referring to FIG. 3, the workflow server 31 includes a transaction manager 33a, follow-up manager 33b, schedule manager 33c, workflow processor 35, workflow updater 37, instantiator 39 workflow language interpreter 41, workflow event handler 43, agent manager 45 and STF router/enqueuer 47. The workflow server utilizes a definitions database 51, transactions database 53, names/routings database 55, schedule database 57, administration/configuration database 59 and STF queue 61. The transaction manager identifies changes that have happened in the workflow transaction database and invokes the proper server modules to provide the services that have been requested or that those changes represent. The workflow processor embodies the logic of workflows with phases, actions, roles and dates of completion and reply. The workflow updater maintains and updates the workflow transaction database. It uses the workflow processor to determine the status of workflows and the set of possible actions for each one of the roles. The workflow language interpreter interprets workflow language scripts. These scripts contain workflow commands, such as the initiation or taking an act in a workflow. These scripts are part of the business process definition. These scripts are automatically generated by the application builder. The agent manager executes workflow commands. "Agents" take action on behalf of some role in a workflow. The commands that the "agents" execute are specified through the workflow language.

The definitions database contains records that define each type of business process and workflow in the system. These records are used by the workflow updater and workflow processor to determine new workflow states and available actions.

The transactions database contains the history of completed workflows and workflows-in-progress. These records are used by the workflow updater and workflow processor to determine new workflow states and available actions.

The names/routing database contains the record of roles and identities of the organization where the workflow system has been installed.

U.S. application Ser. No. 08/014,796 filed Feb. 8, 1993 contains a complete description of a suitable workflow server with a detailed description of the above-noted elements which may be utilized with the present invention.

In addition to the workflow server, a complete workflow system of the type in which the present invention may be utilized includes a set of application program interfaces (APIs) 63, forms and views API 64, and workflow server manager 72, standard transaction format (STF) processors 65, application builder 67, analyst 69 and reporter 71 components as follows.

Workflow APIs

The workflow APIs 63 provide a programming interface to access the services of the workflow server. Workflow enabled applications, STF processors and the application builder are all developed using these APIs. APIs used by a workflow system are as follows: forms and views API, transactions API, definitions API, names and routings API, schedule API, server administration API, and reporter API. The APIs other than the forms and views API 64 and the definitions API as needed to implement the Application Builder are described in co-pending application Ser. No. 08/014,796 filed Feb. 8, 1993, although a description of the definitions API as needed to implement the invention which is described in the co-pending application is set forth therein.

Forms and Views API

The forms and views API responds to application builder API calls to communicate to a forms generation package, to generate the forms and views needed to implement the application which has been defined through the application builder.

Definitions API

The definitions API from the workflow library and the application builder are used to generate the business process and workflow definition structures stored in the definitions database.

Workflow-Enabled Application

A workflow-enabled application interfaces to the server via the transactions database of the workflow server or via APIs, or via messaging, database, or inter-process communications (IPCs) or through the use of an STF processor.

STF Processors

A standard transaction format (STF) processor 65 is an application whose job is to interface external systems to the workflow system. There is one STF processor for each different type of system that interfaces to the workflow system. STF processors can be of three types: message, database, and IPC. The STF processors translate between an application's data format and the workflow APIs. It is the job of the particular STF processor developer to design the mapping of the external system and the workflow APIs.

Workflow Application Builder

The workflow application builder 67, which is the invention described herein, is a Graphical User Interface (GUI) application that allows a business process designer to specify the business process design with its network of workflows. The application builder, in turn, creates or edits the workflow definitions databases that define the business process and that will be used by the workflow server. The workflow application builder also generates forms and views for client workflow enabled applications.

Workflow Analyst

The workflow analyst 69 is a GUI application that allows a business process analyst to specify the map of business processes with its network of workflows. Its output is readable by the application builder which will update the definitions database of the server.

Workflow Reporter

The workflow reporter 71 is a GUI application that provides an interface to the transaction databases of the system. It allows the observation of the status of current transactions as well as the history and performance of past transactions.

Definitions

In describing the invention, the following terms with their indicated definitions are used:

Act—Basic linguistic occurrence by which people intervene in moving a workflow towards completion.

Agreement—The outcome of the negotiation phase, in which two parties come to a common agreement of the conditions of satisfaction.

Business Process—A network of workflows linked together that represent the recurrent process by which an organization performs and completes work, delivers products and services and satisfies customers.

Business Process Map—This is a graphical representation of business process, which shows its workflows and their relationship.

Primary workflow—This is the first workflow which is initiated when a business process is initiated. Its condition of satisfaction represent the condition of satisfaction of the business process.

Conditional Link—A link that indicates that only one of a group of workflows will be triggered based on some condition.

Conditions of Satisfaction—Conditions declared by or agreed to by a customer. The fulfillment of which is the purpose of a workflow.

Customer—The role in a workflow who makes a request or accepts and offer.

Customer Satisfaction—The objective of a workflow, the accomplishment of which is declared by the customer when the conditions of satisfaction in the workflow have been fulfilled.

Cycle time—A measure of the time from initiation to successful completion of a workflow phase, a complete workflow or a business process.

Exception flow—The path in the business process workflow map which is followed if a customer cancels or a performer revokes or declines.

Link—A defined dependency between two workflows and the mechanism by which dependencies between workflows is established.

Loops (Workflow)—A workflow is represented graphically by an elliptical loop with arrows shown in a clockwise direction wherein each quadrant of the ellipse signifies a different phase of the workflow.

Normal flow—This is the path followed in a business process when workflows complete with customer satisfaction.

Observer—A role in a workflow who cannot perform acts in the workflow, but is informed of acts in the workflow, and has access to the information and data associated with the workflow.

Offer—The act by which the performer can initiate a workflow, specifying conditions of satisfaction that he is willing to satisfy for a customer.

Organization roles—Named positions in an organization who are authorized to make certain requests, agreements, take certain actions, set certain policies, and make certain decisions. The kind of roles will be accountant, office manager, etc.

Performer—One of the principal roles in a workflow: the role that commits to complete the conditions of satisfaction.

Phase—A characterization of the status of a workflow based on the acts that have happened and the acts that are permitted.

Request—A customer does this act to initiate a workflow and declare conditions of satisfaction.

Trigger—An action in a workflow which causes an action in some other workflow.

Triggered—Action in a workflow based on certain conditions/status in some other workflow.

Workflow—A structured set of acts between customers and performers organized to satisfy a customer's conditions of satisfaction.

Workflow Activation—A triggered action that enables the customer or performer of the workflow to take the initial act of the workflow.

Workflow Initiation—An act of request or offer that initiates a workflow.

Workflow Roles—The association of participants in the workflows that take the acts in workflows; three roles are distinguished in workflows: customer, performer, and observer.

Workflow Type—This indicates whether the workflow is of request or offer type.

OPERATIONAL DESCRIPTION

The invention utilizes a graphical user interface in a computer system which incorporates a graphical user interlace (GUI) such as the Microsoft Windows (Win3.1+) environment, using MDI and Windows HELP facility. A display on a video monitor includes a toolbar which is provided for the actions that need to be immediately accessible. A status bar is used to display information (e.g. the function of the currently selected menu option and the like). Dialog boxes are used where appropriate.

Typically, a workflow map, as it appears on a monitor in a size suitable for comfortable viewing, is larger than the screen. For this reason, horizontal and vertical scroll bars allow the user to scroll through the entire map.

The status bar is used for displaying information only.

The user is prompted for confirmation on deletion of workflows and links. Objects such as workflows, links, annotated text, etc. may be moved around on the screen by typical clicking and dragging of a mouse as occurs in a GUI. A workflow scripting language is available to automate the generation of workflow acts and to set conditions for execution of those acts. Scripting is also used to set conditions for calling other functions or programs or generating E-mail. In addition, prior to application generation, the invented system is able to perform consistency checking to ensure the creation of logical and consistent business process maps.

The invention i) produces standard workflow maps of business processes that show workflows and the links defined between workflows or receives such maps and defined links created by the Analyst; and ii) defines triggers that will cause events to occur, states to change, or acts in workflows; iii) verifies the consistency of the business process maps; iv) produces the workflow scripts that correspond to the workflow and links defined in the map; v) generates definitions database; and iv) generates business process applications through forms, form fields and their visual representation.

The user of the invented system is known as a business process analyst or systems analyst or designer or application developer. To use the system, the user first creates a business process which is defined in terms of a business process map. A business process map contains customer and performer names and organizational roles for the primary workflow, target cycle times for the entire process, version of the process, when and by whom the process may be started, and so forth. In addition, it contains workflow and link definitions, roles, permitted acts, default identities, application data and forms for each workflow in the process, and trigger act or state, triggered act or state and condition (if link is conditional) for each link in the process.

Workflows are represented graphically as elliptical loops with four phases as shown in FIGS. 1a–1f. Each workflow, and each phase within the workflow, has a starting point and an ending point. The primary workflow of the business process is displayed as a large elliptical loop to make it visually distinct as shown in FIG. 2a.

Workflows can be created without having all links defined and the user is able to link them afterwards. In addition to the loop, the workflow attributes workflow name, customer, performer, conditions of satisfaction, cost and price (or value) for the workflow and each phase and cycle times for the entire workflow and each phase are displayed. Furthermore, if a form name attribute is specified then a form icon and name will also be displayed. The form name attribute is for identifying any forms to be used by the generated application.

The invention supports two types of workflows:

Request; and

Offer.

The invention supports three different roles for each workflow:

Customer: The organizational role or name of the person that can declare satisfaction for the completion of the workflow.

Performer: The organizational role or name of the person who fulfills the conditions of satisfaction of the workflow.

Observer: The organizational role or name of persons who neither declare satisfaction nor fulfill the conditions of satisfaction but who monitor the workflow for management, training, or to fulfill other organizational concerns.

Each workflow has a unique name that identifies it in the business process.

The conditions of satisfaction of a workflow are the conditions that will satisfy the customer of a request or offer.

The cycle time of a workflow is the time to achieve customer satisfaction as well as to reach agreement and completion which are specified for each workflow. The cycle time for each phase is the time it is expected to complete the phase. Cycle time includes days, hours, and minutes for all cases. In some cases, months and years for the cycle time may also be specified.

The cost and value of a workflow is the sum of the cost and value which are specified for each phase of the workflow.

Each workflow can have associated text. Such text could be used, for example, to describe the workflow in narrative form in order to construct the narrative of the process.

A workflow may also have a form name which is the name of a form that is associated with the workflow. As noted above, a form refers to the form to be used by the workflow-enabled application generated by the application builder which forms the present invention.

When a workflow is created on a business process map, the user is given an accessible way to enter the workflow attributes, namely, workflow name, customer, performer, conditions of satisfaction, costs and prices (or values), cycle times, application data, its attributes, forms and type of workflow.

In many cases of a business process, a workflow represents a collection of workflows rather than a single workflow. This collection of workflows have the same conditions of satisfaction (and hence can be observed as a single workflow). These workflows are multiple in that they either have multiple performers in the request type case, or multiple customers in the offer type case. These workflows are repeating in that there will be a set of similar workflows managed by the workflow system.

A graphical representation to indicate multiple repeating (group) workflows is accomplished through a shadow or other such graphical representation under the current arrow of the third quadrant.

To input all of the workflow attributes, the user selects the workflow, double-clicks it and enters all the information through a standard dialog box.

A link specifies the relationship between two workflows, i.e. where an action in one workflow causes an action in another workflow. When such a relationship is established, it is said that the second workflow is linked to the first.

A link contains definitions of trigger conditions and the actions that result from those trigger conditions. The trigger conditions are either:

Workflow-Act based; or
Workflow-State based.
Triggered actions to be taken are:
Workflow initiation;
Workflow activation;
Workflow acts;
Workflow states; or
Prompt for conditions for conditional link.

Links are represented graphically as lines with arrowheads that connect two workflows. The arrowheads indicate that a triggered action happens in the workflow pointed to by the arrowhead due to the trigger action in the workflow at the tail of the line. The "tail" of each line anchors to the trigger action, and can be placed in any part of the loop phase, indicating sequencing of triggering action. The "head" of the line indicates the triggered action.

Conditional links are indicated with a diamond icon.

To establish a link, the user selects one workflow and draws a link to a second workflow.

When a new link is drawn, the default values are as follows:

The trigger action is either of type Act. The user interface allows specifying the trigger action type. The triggered action default value is Initiate or Activate depending on where the arrow was drawn to (the beginning or end of the first phase).

There are two kinds of links, those that correspond to the "normal" flow of the process and those that correspond to the "exception" flow of the process. The latter are links triggered by cancel, revoke or decline acts.

Tables Ia and Ib establish the relationship between triggering and triggered actions under normal and exception cases.

TABLE Ia

| Outgoing Links | Request | Offer |
|---|---|---|
| Out from Preparation state | | |
| Default trigger act | S:Activate | S:Activate |
| Other valid trigger acts | none | none |
| Valid trigger state | Preparation | Preparation |
| Out from Negotiation state | | |
| Default trigger act | C:Request, C:Initiate | P:Offer, P:Initiate |
| Other valid trigger acts | C:Decline Counter-Offer, C:Counter, C:Cancel, P:Counteroffer | P:Counteroffer, P:Decline Counter, C:Cancel C:Counter |
| Valid trigger state | Negotiation, Negotiation (Countered) | Negotiation, Negotiation (Countered) |
| Out from Performance state | | |
| Default trigger act | P:Agree | C:Agree To Offer |
| Other valid trigger acts | C:Decline To Accept, C:Agree To Counteroffer, C:Cancel, P:Decline | C:Decline To Accept, P:Agree To Counter, C:Decline offer, C:Cancel |
| Valid trigger state | Performance | Performance |
| Out from Acceptance state | | |
| Default trigger act | P:Report Completion | P:Report Completion |
| Other valid trigger acts | C:Cancel, P:Revoke | C:Cancel, P:Revoke |
| Valid trigger state | Acceptance | Acceptance |
| Out from Satisfied state | | |
| Default trigger act | C:Declare Satisfaction | C:Declare Satisfaction |
| Other valid trigger acts | C:Cancel | C:Cancel |
| Valid trigger state | Satisfied, Canceled, Revoked, Declined | Satisfied, Canceled, Revoked |

TABLE Ib

| Incoming Links | Request | Offer |
|---|---|---|
| Into Preparation state | | |
| Default trigger act | S:Activate | S:Activate |
| Other valid trigger acts | none | none |
| Valid trigger state | Preparation | Preparation |
| Into Negotiation state | | |
| Default trigger act | C:Initiate (C:Request) | P:Initiate (P:Offer) |
| Other valid trigger acts | C:Decline Counteroffer, C:Counter, C:Cancel, P:Counteroffer | P:Counteroffer, P:Decline Counter, C:Cancel, C:Counter |
| Valid trigger state | Negotiation, Negotiation (Countered) | Negotiation, Negotiation (Countered) |
| Into Performance state | | |
| Default trigger act | P:Agree | C:Agree To Offer |

TABLE Ib-continued

| Incoming Links | Request | Offer |
| --- | --- | --- |
| Other valid trigger acts | C:Agree To Counteroffer, C:Decline To Accept, C:Cancel, P:Decline | P:Agree To Counter, C:Decline To Accept, C:Decline Offer, C:Cancel Performance |
| Valid trigger state Into Acceptance state | Performance | |
| Default trigger act Other valid trigger acts Valid trigger state Into Satisfied state | P:Report Completion C:Cancel, P:Revoke Acceptance | P:Report Completion C:Cancel, P:Revoke Acceptance |
| Default trigger act Order valid trigger acts Valid trigger state | C:Declare Satisfaction C:Cancel Satisfied, Canceled, Revoked, Declined | C:Declare Satisfaction C:Cancel Satisfied, Canceled, Revoked |

The Acts are Activate, Initiate, Request, Agree, Offer, Agree to Offer, Counter-Offer, Counter, Accept Counter-Offer, Decline Counter-Offer, Report Completion, Declare Satisfaction, Decline Report, Cancel, Revoke, Decline.

The user is able to draw a link between two workflow loops on a map by selecting the "from quadrant" and the "to quadrant" in each of the loops. The initial portion of the link is drawn as a straight line. The user may then create a drawing handle on the link line and "pull" the line into a curve. The user may create multiple points on a line to aid in drawing an "S" or other multi-shaped curve. Such drawing handles and multiple points may be created by mouse clicks at the desired points in the link.

A user may change the destination of a link by selecting and dragging with the mouse.

When a link between two workflows is conditional, a conditional icon is drawn between the workflows. To link more workflows conditionally, the user links a new target workflow to the conditional icon.

BASIC TOOLS

The invention provides a set of basic tools for drawing, filing, editing, printing, viewing and manipulating business processes, workflows, links, application data with attributes, forms, cycle times, coast and value, roles and identities. The most frequently used of these tools are available through icons.

Workflow Mapping Tools

To facilitate the definition of business processes, the invention provides tools for drawing maps of workflows and the links between them. The lines are Bezier-like and are for drawing a line from the termination of one phase in a workflow to another phase in another workflow. The line contains handles which allow the line to curve.

Map Drawing Tools

The invention supports the following map drawing tools:
 Pointer
 Draw Workflow
 Draw Normal Flow Link
 Draw Conditional link
 Draw Exception Flow Link
 Annotate Text.

File and Print Tools

The invention provides file and print-related tools that enable the user to:
 Create a new business process map
 Open an existing business process map for read, display and edit
 Save a business process map to a file
 Provide summary information about a business process map
 Print the map and reports of the business process
 Retrieve a previous version of a business process map that has been stored on a server for review or further editing
 Export map data to Windows metafile format
 Export value data
 Transfer business process and workflow information to the Definitions database
 Create forms and views.

Edit Tools

The invention provides editing functions that enable the user to:

Cut, copy, delete and paste workflows, links, and annotated text.-Using edit operations in conjunction with the clipboard, it is possible to cut or copy objects (expanded and collapsed workflows, links, text) and paste them in the same or different business process. It is also possible to paste these objects in drawing packages.

Editing Attributes—Edit any element of the business process map, such as workflow attributes, links, business process definitions, and annotated text.

View Tools

The invention provides functions for different kinds of views of business processes. It provides functions that enable the user to:

Zoom in and zoom out for magnifying and shrinking the map size
 Expand and Collapse Workflows
 Obtain normal flow of workflows and links
 Obtain exception flow of workflows and links: i.e., links for cases where workflows are canceled, declined or revoked.

Mouse Tools

The invention utilizes the following mouse tools: Single Click—A single click selects a workflow or a link.

Double Click—A double click on a workflow loop opens the workflow definition dialog. A double click on a link opens the link definition.

Multiple Select—Holding the shift key while single clicking on multiple workflows or links causes all highlighted workflows or links to be selected. Alternatively, the toolbar contains a "Select" tool.

Click and Drag Workflow to New Location—Moves the workflow loop to a new location on the screen. Automatically adjusts the corresponding links in the map drawing.

Testing Tools

The invention provides a tool for testing and debugging a business process map as follows:

Test for completeness. Causes the software to find all the workflows that do not have complete information. Specifically, it finds missing roles, conditions of satisfaction, cycle times and workflow names.

Data Tools

The invention provides functions implemented using the following commands for defining roles and identities, specifying business process and workflow attributes, creating workflow templates, and checking map completeness.

| Command | Purpose |
| --- | --- |
| Organizational Roles | Define roles used to specify workflow participants. |
| Identities | Specify personal information about individuals in the organization. |
| Business Process Definition | Enter basic information about the business process. |
| Default Role Mapping | Assign specific default identities to organizational roles. |
| Policy Document | Enter text of policy document pertinent to the business process. |
| Business Process Global Data | Define field names, types and attributes of global data. |
| Workflow Definition | Specify general information about a workflow such as its name, short name, customer and performer, template and conditions of satisfaction. |
| Workflow Cycle Times | Enter maximum time values for each of the phases of the workflow. |
| Follow Up and Reminders | Enter time values for follow ups and reminders and specify frequency and number of times. |
| Workflow Application Data | Define field names and set attributes of workflow data. |
| Workflow Scripting | Enter scripting information for specific acts and states of workflow. Scripts are used to automatically generate workflow acts and to set conditions for the execution of those acts. |
| Workflow Form Names | Set form names for participants of the selected workflow. |
| Form Fields Specification | Set attributes of application data fields for forms used by workflow participants. |
| Phase Styles | Define the line type and color of the arcs representing each phase of the selected workflow. |
| Workflow Template | Create or modify templates used to limit acts available in a workflow and to enter substitute terminology for acts and states. |
| Check Consistency | Check a business process map for the validity and consistency of link paths and other workflow elements. |
| View Last Errors | Reopen the most recent consistency checking errors list. |

The following is a description of the basic operations performed by the software used to implement the invention:

Start-up

The program can be started by any suitable mechanism depending on the platform.

Annotated text

Free text used to describe the business process. This text is not associated with any specific element of a business map.

Associated Text

Free text associated with each workflow. It can be used to provide a narrative of the workflow in order to construct the narrative of the business process.

Toolbar

A set of icons in a software package with a GUI, which allows users to select the most frequently used options without going through the menus and dialog boxes.

Export to a Windows Metafile

The Windows metafile is a binary format which allows storing of the business process map as an image. This allows the map to be incorporated in other presentation tools.

Exit

This is the option to exit the program.

Workflow Language and Scripting

The following is a description of the Application Builder's workflow (scripting) language. Scripting is used to automatically generate workflow acts and to set conditions for the execution of those acts. Scripting is also used for other functions such as sending a message or executing a program. A designer using the Application Builder, can specify scripts associated with acts or states in a workflow. This allows a great deal of flexibility in the design of the business process. A script is a series of workflow language statements. The user interface for user defined scripting is described below.

The Application Builder also produces "system generated scripts" that are executed to implement the connection between workflows in a business process. For every link and conditional link in the map there is a system script generated automatically. Automatic transitions (as defined with the command Phase Styles from the Data menu) also create system generated scripts.

Execution of Scripts

Scripts are used to move a business process forward towards meeting the conditions of satisfaction. Scripts are always executed within one of three contexts. Scripts are executed when:

An action is taken by an individual

An action is taken by the system

A workflow enters a specified state

An action taken by an individual could be a customer's canceling a request. For instance a script could be written to generate a sendmail notice to warn the sales person. The script could specify the conditions for sending the mail, the recipient of the mail, the recipient's address and the text of the mail.

An action taken by the system could be a follow-up, reminder, or other automated script.

A workflow entering a specified state could be a workflow which enters the Acceptance state.

The following conventions are used in this description:

<brackets> Indicate place holders for information supplied by the designer.

[square brackets] Indicate optional items.

(choice|choice) Parenthesis and a vertical bar indicate a mandatory choice between two or more items. One of the items must be chosen unless all of the items are enclosed in square brackets[].

Data Types and Variables

The following data types are supported in the language:

Numeric

Character

Date and Time

Case sensitivity and character set

The workflow language uses the ASCII character set in a case insensitive way ('a' is equal to 'A'). Spaces, tab characters and new lines are ignored.

A string is a sequence of characters between quotes ("string"). It cannot extend past the end of line marker. If an end of line character is found inside a string an error message is generated.

Inside a character string, ASCII alphanumeric characters can be specified using spaces and characters in the 850 international code page.

The insertion of special characters in the string can be accomplished by the use of the escape character, similar to C escape characters.

\t introduces a tab character

\n introduces a new line character

\\ introduces a backslash character

\" introduce the quote character

A string can be continued to the next line by using a backslash followed by a carriage return. This is useful when a string is too long to fit into the Workflow Scripting window.

For example:

SendMail( . . . . "Please review the totals\defined below and let me know if you find\any difference.\n", . . . )

Strings can also be divided using the character concatenation operator. For example:

SendMail( . . . , "Please review the totals"+"defined below and let me know if you find"+"any difference.\n", . . . )

This combines two strings (listed on two lines) into one string.

Variables Support

Variables can be any of the above data types (Numeric, Character, Date and Time).

Variables are used in expressions and statements to represent values. For example, a variable can represent the value in an application field. Scripts can be written to execute an action based on the value in a field at the moment of a specific act or state in the workflow.

Scope

Variables have a scope, which is either global—the value is available to any script of all workflows local—the value is available only to the script of the current workflow Identifiers Often, variables include an identifier such as the ones used in the workflow short name or in application data field names. An identifier is a single word which can start with an alphabetic character followed by a sequence of alphanumeric or underline characters. No spaces or punctuation marks are allowed.

For example:

total tot2

Total_Purchase

The two kinds of variables are workflow data variables and application data variables.

Reserved Words

The following are reserved words and cannot be used as identifier names. These are used in the Application Builder to identify grammatical constructions.

IF
ELSEIF
ELSE
ENDIF
INITIATE
ACTIVATE
ACT
SENDMAIL
CALLPROGRAM
ECHO
ISACTIVE
ISINSTATE
ISNOTINSTATE
CUSTOMER
PERFORMER
OBSERVERS
TRUE
FALSE
STR
AND
OR
NOT

Special Symbols

The following symbols have special meaning to the application builder and cannot be used in identifiers:

Assignment: '='

Arithmetical operators: '+', '−', '*', '/'

Relational operators: ==, <>, >, <, >=, <=

Logical operators: AND, OR, NOT (also reserved words)

Workflow Data

Syntax

[ <workflow-name>. ] (CUSTOMER|PERFORMER|OBSERVERS) where the workflow-name is either a string or an identifier.

The workflow data variables supported are:

Customer

Performer

Observers

Workflow data variables are global.

Application data

Application data is data that is specified in data fields in an application. Within a workflow system, application data variables can be either local or global.

The term "local application data" refers to the names of fields that can be made available to, and edited by participants in a specific workflow. (Participants in directly connected workflows may also view these fields as "read only.")

The term "global application data" refers to the names of fields that can be made available to participants in any workflow in the business process.

Application data variables and their data types are defined using Data menu commands such as Workflow Definition and Business Process Definition. The Application Builder uses these definitions to use each identifier as the appropriate data type.

Syntax

[<workflow-name>.]<identifier> where the workflow-name is either a string or an identifier.

Variables from connected workflow loops can be referred to with the following syntax:

<workflow-name>.variable

Search order

When the Application Builder evaluates an application data variable, it searches for the application data in the following order:

1. If a workflow name is specified:
   a) If the workflow name is a string, it will search in the specified workflow.
   b) If the workflow name is an identifier, it will locate the workflow by the short workflow name and search in the specified workflow.
   c) If the workflow is not found, it will generate an error message.

2. If no workflow name is given:
   a) It will try to locate the data in the current workflow
   b) It will try to locate the data as global application data
   c) If the data is not found, it will generate an error message.

Specifying application data field values:

Expressions can be derived from application data, or can be constants. Application data field values are specified as follows:

| | |
|---|---|
| Priority | Where "Priority" is a global data field |
| "Expense Report".Budget | Where the data field "Budget" is local to the workflow "Expense Report" (full workflow name) |
| exprep.Budget | Where data field "Budget" is local to a workflow for which the short workflow name is "exprep" |
| "Pat Smith" | Where the string expression is specified between quotations |
| 1234567890 | Where the numeric expressions are specified without quotation marks |
| {Jan 5 1993 10:23:00} or {01051993102300} | Where date expressions are specified between braces in a Month, Day, Year, Hour, Minute, Second format: MMDDYYYYHHMMSS Month (2 digits) Day (2 digit) Year (4 digit) Hour (2 digit) Minute (2 digit) Seconds (2 digits) |

Expressions and Operators
Relational expressions

Relational expressions are used to compare values and to guide action of the workflow server; they are used in conditional links and in If statements.

Syntax

<expression><relational operator><expression>

The relational operators and their applications are:

| Operator | Application |
|---|---|
| = (equal to) | Character, Numeric, Date |
| <> (not equal to) | Character, Numeric, Date |
| > (greater than) | Numeric, Date |
| >= (greater than or equal to) | Numeric, Date |
| < (less than) | Numeric, Date |
| <= (less than or equal to) | Numeric, Date |

Logical Expressions

Logical expressions can be used to combine relational expressions.

Syntax

<relational expression> AND <relational expression>
<relational expression> OR <relational expression>
NOT <relational expression>

Arithmetic Operators

Arithmetic operators are:

+ Plus
− Minus
\* Multiply
\ Divide

Syntax

<expression><+|−|\*|\><expression>

Character fields can be assigned from string constants or other character fields.

They cannot be assigned from numeric fields.

Character Operators

The only character operator is

+ Character concatenation

Syntax

<text>+<text> where text is a text string or identifier.

Operator Precedence

Standard C and Basic conventions are followed regarding expression evaluation order. For example, all AND expressions are evaluated first, then ORs are evaluated. Parentheses are used to force evaluation order.

The operator precedence is outlined from lowest to highest, along with their associatively (the direction in which expressions are evaluated):

| Order | Operator | Associatively |
|---|---|---|
| 1 | OR | left |
| 2 | AND | left |
| 3 | NOT | right |
| 4 | >=, <=, >, <, =, <> | left |
| 5 | +, − | left |
| 6 | *, / | left |
| 7 | unary minus | right |

Date and Time

The date and time types are defined as sequences of characters enclosed in braces ({ and }).

Syntax a) Long Date Format: {month d, year hh:mm:ss}
b) Short Date Format: {mo d, yy hh:mm:ss}
c) Compact Date Format: {mm/dd/yy hh:mm:ss}
d) Offset Format: {yy Y mm M dd D hh:mm:ss} where the absence of any field will assume that the value of that field is zero. The offset format is the same as is used in the Workflow Cycle Times dialog box.

Statements
Comments

Script statements can include comments or remarks. Comments are preceded by the word "REM" or by an apostrophe. REM is a command that must be at the beginning of a line. An apostrophe can be used to put a comment anywhere in a script and is particularly useful at the end of a statement line.

Workflow Statements

Scripts can specify actions that the workflow server will take.

There are three workflow statements which cause action to be taken based on events. These are:

1. Activate

Activate is used to start a workflow at the preparation state of a workflow.

"Activate" is used when there are child workflows that need to happen during the preparation phase of the parent workflow. Activate is also used when the customer is specifically required to take the request act (or, in an offer type workflow, the performer is required to take the offer act).

Syntax

Activate (<Workflow Name>)

2. Initiate

Initiate is used to start a workflow in the negotiation state. "Initiate" is used when the workflow can be started with a request or offer directly, and further preparation work is not needed.

Syntax

Initiate (<Workflow Name>)

3. Act

"Act" is used to take an act on behalf of a workflow participant; this can be triggered by an act or state in the workflow or in another workflow.

Syntax

Act(<Act Name>, <Workflow Name>)

4. Available Acts

Request workflows
      S:Activate

C:Initiate
C:Request
P:Agree
P:Counteroffer
P:Report Completion
P:Decline
C:Declare Satisfaction
C:Cancel
P:Revoke
C:Decline To Accept
C:Agree To Counteroffer
C:Counter
C:Decline Counteroffer
C:Comment
P:Comment Offer workflows
S:Activate
P:Initiate
P:Offer
C:Agree To Offer
C:Counter
P:Report Completion
C:Decline Offer
C:Declare Satisfaction
C:Cancel
P:Revoke
C:Decline To Accept
P:Agree To Counter
P:CounterOffer
P:Decline Counter
C:Comment
P:Comment Using Workflow States in Logical Expressions Every time there is an act in a connected workflow (either a parent or child workflow), any user defined scripts for the current state of a workflow are executed. Scripts that will be executed are those that are conditioned on acts or conditioned on application data changes in these connected workflows.

States of the current workflow or of linked workflows can be used as logical expressions. You can write scripts to delay an action (or movement of a workflow into the next state) until certain conditions are met. You can set the conditions as a change in state of a child workflow, a change in a data field or both. You can also specify that all the child workflows are checked to see if your conditions are met, every time any one of them changes. A state-based script will be executed every time there is a change in the state. There are three workflow statements which cause action to be taken based on workflow states. These are:

1. IsInState
   Tests whether a workflow is in a specified state.
   Syntax
   IsInState("workflow","state")
   Example
   IsInState("Deliver Order","Acceptance") would return TRUE if the Deliver Order workflow is in the Acceptance state.

2. IsNotInState
   Tests whether a workflow is not in a specified state.
   Syntax
   IsNotInState("workflow","state")
   Example
   IsNotInState("EstimateBudget","Satisfied") would return TRUE if the EstimateBudget workflow is not in the Satisfied state.

3. IsActive
   Tests whether a workflow is active.
   Syntax
   IsActive("workflow")
   Example
   IsActive("ShipProduct") is true when the workflow "ShipProduct" has been instantiated.

State based scripts are executed after Act-based scripts.

Available States
Preparation
Negotiation
Performance
Acceptance
Satisfied
Negotiation (countered)
Cancelled
Declined
Revoked Conditional Statements Logical expressions are used to control script execution using If-ElseIf-Else-EndIf constructs.

Syntax

If(<logical expression>)

<statements>

ElseIf(<logical expression>)

<statements>

Else

<statements>

EndIf

When an If statement is specified, an EndIf statement is required. If statements can be nested. Elseif and Else may be used optionally. If, Elseif, Else, and Endif must appear on different lines of the script.

Other commands and functions

SendMail: Electronic mail can be sent based on script commands:

Syntax

SendMail(<FromAddress>,<ToAddress>, <CCAddresses>,<SubjectText>, <BodyText>)

Each of the parameters specified in the SendMail statement is the name of a character application data field, or of a workflow data field, such as customer, performer, or observer.

FromAddress, ToAddress, and CCAddress can also be workflow system identities. In the Builder, a designer can specify the mail address for each identity. The mail address specified for "Mail STF" is used for the SendMail function. The address specified for the identity must be in the format permitted by the selected STF Processor.

The <CCAddress> can be left blank (""), but must be present. The <ToAddress> and <CCAddress> parameters can be single identities. Single identities can be expressed as string constants or as the names of Character application data fields. Lists of identities can only be expressed in application data fields. These fields can be constructed from Character constants by assigning the desired character constant to a character application data field.

CallProgram: An external program can be executed by a script. The program called must be able to run natively on the operating platform of the workflow server.

Syntax

CallProgram(<ProgramName>,<CommandLine Parameters>,

<EnvironmentVariables>,√

<ReturnValueAppFieldName>,<boolReturnValue>)

The program name specifies the name of the program to be executed. The Command Line Parameter string must be specified, though it can be an empty string. The Environment variables string allows setting of operating system environment strings, such as those that appear in the OS/2 environment. If the Boolean is set to TRUE, and the <RetValAppFieldName> specifies the name of a numeric application data field, then the called program's error return number is stored in the specified application data field. If the Boolean is set to FALSE, the program's returned value is ignored.

The called program is run asynchronously. The workflow server does not wait for the called program to complete its operation.

Echo: Displays a character string on the server log. This is used to watch script execution.

Syntax echo <string_expression>

Str Returns the string representation of an expression.

Syntax

Str (<expression>)

Consistency Checking

The following provides an explanation of the principles of creating logical and consistent business process maps. Also included here is a numbered reference to the Application Builder map rules.

As a map is drawn, the designer adds workflows and connect them with links and conditional links. The map is a visual representation of a business process and shows the interconnecting network of personal commitments and the flow of work needed to meet the conditions of customer satisfaction.

When creating a business process map, it is possible to create very complex paths with links passing through numerous secondary workflows before returning to the primary workflow. The Application Builder allows a great deal of flexibility in map design, but the business process map must flow in a logical and orderly way and conform to workflow principles for the purposes of generating an application The map rules outlined below are the specific principles required for successful application generation. These rules concern the connection of links to workflows and conditional link boxes. These rules also require that you set certain attributes for the business process and the workflows in it.

When a map has been created, the Check Consistency command from the Data menu is used to see if any map rules have been violated. The Consistency Errors dialog box specifies any map rules that have been violated. This following provides more information on those rules and illustrates both how those rules can be broken and how they can be followed.

Principles of consistency

A business process map describes a flow of work and defines a series of events. In order for a business process to meet its conditions of satisfaction, the map it is based on must be complete and logical.

Consistency checking is based on a set of map rules. These rules are designed to insure that during creation of the map you have adhered to the following principles:

Logical consistency—no definition you have created should contradict the effect of another definition.

Simplicity—maps should not be unnecessarily complex.

Avoiding redundancy—elements in a map which serve no function should be eliminated.

Completeness—all elements of the business process definition that are essential must be included.

Some map rules are defined as warnings. These rules apply to ambiguous cases in which one of the above principles may have been violated. Warnings do not prevent application generation because the designer may have used a method, such as scripting, to achieve map consistency.

Logical Consistency

It is possible to use the tools of the Application Builder to create definitions which contradict the effect of other definitions. For instance an automatic transition could be defined to move a workflow forward at the same time that a link with stop flag on is preventing acts in that workflow until a subprocess has completed.

Figure 2B:
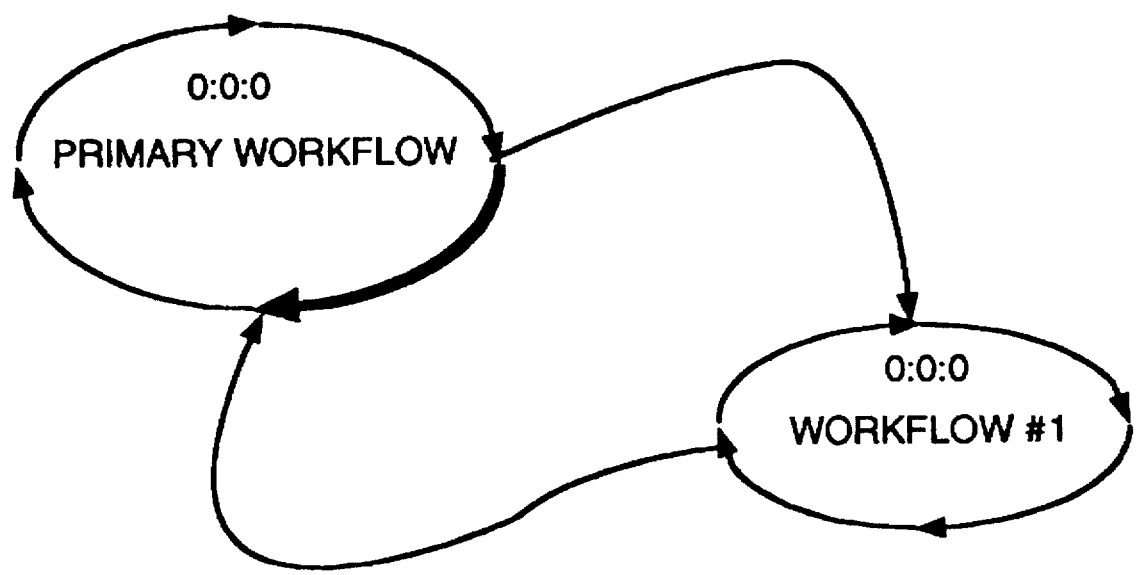
FIG. 2b is a pictorial representation of a primary workflow which is a request type workflow with automatic transition turned on for performance.

In the example shown in FIG. 2b, Primary Workflow is a Request type workflow and automatic transition is turned on for Performance. (The performance phase is shown in this illustration as the emphasized segment of the Primary Workflow loop). The effect of the automatic transition is that as soon as the act P:Agree occurs, the system automatically takes the act P:Report Completion and the workflow moves into Acceptance. However, there is also a subprocess which begins with a link from the act P:Agree, goes to Workflow #1 and returns with a link to P:Report Completion and, in this example, the Stop Flag is on (as set in the Link Definition dialog box for the first link in the subprocess). This stop flag requires that Primary Workflow must remain in Performance until Workflow #1 is complete so it is in direct contradiction to the automatic transition setting. This kind of inconsistency prevents a logical flow to the coordinated work that needs to be done.

It is possible to create other situations in which two definitions are in opposition. The following rules are designed to prevent this kind of contradiction:

Rule 10

If an act is automatic then there should not be an incoming link with stop flag on which takes that act and is part of the path that has the stop flag on.

The case described here is a logical contradiction: the automatic act says the workflow must continue immediately, the stop flag says that the workflow must wait until the subprocess has completed.

Rule 11

Paths staffed by multiple outgoing links from a common Act or State, having the Stop Flag on, must return to a common state of the workflow.

The purpose of a stop flag is to cause the parent workflow to pause in a given state, then continue when a subprocess is completed. It is possible to draw a map in which two subprocesses start in a given state with the stop flag on, but one returns to the same state and the other returns to a subsequent state. At runtime, the one returning to the subsequent state could return first. In this case, one subprocess would be telling the parent workflow to move to the next state and the other subprocess, since it is not yet completed, would be telling the parent workflow to remain in the same state.

Rule 12

Paths started by multiple conditional links from a common Act or State must all return to a common state in all combinations of conditional paths.

This rule covers cases in which the use of conditional links has the potential to create situations which violate Rule 11.

Rule 17

Paths starting with outgoing links of mixed types (State-based and Act-based) must return to a common Workflow state.

This rule is also based on the same general principle as Rule 11, subprocesses should not contradict each other by giving conflicting instructions to the parent workflow.

Rule 15

A workflow can only be initiated once.

In a given instance of a business process, any workflow can only be started once, so multiple incoming links that start the workflow are a logical contradiction unless they are mutually exclusive. A valid map could have two links coming from a conditional link box with both set to start a workflow because the conditional link box insures that only one link will be operational. A valid map could also have two links coming from different acts of the same state with both links set to start the same workflow because as soon as one act occurs, it will start the subprocess and it will also move the parent workflow to another state, thus preventing the second act from occurring and also attempting to start the subprocess.

Rule 13b

Paths from a Workflow, which return to that workflow, must terminate in that Workflow with an incoming link to the state from which they originated, or with a valid act to another state. If the Stop Flag is not on, paths do not have to terminate in the workflow from which they originated but if they do return, they must follow this rule.

In any given state, only certain acts are available. When a path returns to a parent workflow, the parent may still be in the same state it was in when the path left (necessarily so if the stop flag is on). Consequently the act that the returning link triggers must be a valid act for the original state.

Rule 14

Workflow links based on the same Act must have the same Stop Flag setting.

If a single act triggers two links, the stop flag settings cannot be contradictory. Since both subprocesses will necessarily occur, it is an unavoidable logical contradiction if one is telling the parent workflow to continue and the other is telling the parent workflow to stop.

Rule 16

Workflow links of mixed types (State-based and Act-based) from the same state must have the same Stop Flag setting.

This rule is based on avoiding the same potential for contradiction that rule 14 addresses. Since entering the state will necessarily trigger a subprocess, any act which might occur in that state should not trigger a subprocess that could contradict the stop flag setting of the state-based link.

Rule 29

A link should take an act in the target workflow.

Acts cause workflows to move forward to new states. A state is the result of an act which has been taken. An incoming link cannot connect to a state (unless it is the same state the path originated from) because no act has occurred to cause the workflow to be in the new state. Thus an incoming link to a state is contradicting the actual state that workflow is still in, i.e., the state it will remain in until an act causes it to move to another state.

Simplicity

The Application Builder provides a great deal of flexibility in methods of designing business processes. Certain constructions are overly complex, however and are ruled out because other, simpler methods are available.

Rule 1

Conditional links can have only one incoming link.

Multiple incoming links would require "and/or" type constructions and would add unnecessary complexity to the conditional link specification.

Rule 3

Links to or from a Conditional Link must connect to a Workflow. Two Conditional Links cannot be directly connected.

Connecting conditional links is not necessary because any conditions that can be defined with multiple conditional links can all be defined in one conditional link box. There is no limit to the number of links that can come out of a conditional link box.

Avoiding Redundancy

It is possible to create map elements that serve no purpose. Some redundancies can prevent application generation and some are flagged as warnings during consistency checking. Warnings serve to notify the map designer of map elements which may need to be modified in order to achieve an intended purpose.

Rule 2

Conditional links must have at least one outgoing link.

If there is no outgoing link, the conditional link box and the link coming into it can serve no function.

Rule 7

Conditional links should not be isolated.

Similarly, a conditional link that is not connected to workflows can have no purpose.

Rule 5

Primary workflows cannot have outgoing links from their Satisfied state.

Primary workflow reach the satisfied state when the conditions of satisfaction of the business process have been met. Since the satisfied state means that the business process is over, no subprocess can start at this point.

Rule 13a

Incoming links starting a new workflow can only trigger a limited set of acts:

i) for request workflows S:Activate, C:Initiate and P:Agree; ii) for offer workflows S:Activate C:Agree To Offer and P:Initiate.

Incoming links starting workflows are limited to triggering acts in this set because triggering any other act does not lead to completion of the conditions of satisfaction of the workflow. The acts in this set are the only acts that are not exception acts which occur before the Performance phase of a workflow. There is no point in starting a workflow with an exception act that terminates a workflow and there is no point in starting a workflow after performance because acceptance without performance is meaningless.

Rule 24

Script has references to some objects (i.e. workflow name, identities or application data) which are either deleted or renamed.

During the process of designing a workflow and adding definitions it is possible to create elements, refer to them in scripting and then rename or delete them. When this happens, the script can have no function.

Rule 25

Primary workflow is always activated. So script or link for initiate act will never be executed.

When a business process is instantiated, the primary workflow is activated and moves past the initiate act. A script or link based on the initiate act can have no function because the initiate act will never occur.

Completeness

In order to manage a business process, the workflow server must be able to identify all the elements within the business process definition. The rules for completeness are designed to insure the presence of the minimum required identifiers. These rules are self-explanatory.

Rule 18

A Business Process must have a Name and Administrator.

Rule 19

A Workflow must have a Customer, Performer, and Conditions of Satisfaction.

Rule 20

A Conditional Link must have a Description and Expression.

Rule 26

Workflows must have a name.

Rule 27

Workflows must have a unique name.

Rule 28

Workflows must have a unique short name

Map Rules

The following is a numbered reference to the Application Builder map rules. Rules are listed in numerical order with missing numbers meaning that there is no associated rule.

Rule 1: Conditional links can have only one incoming link.

Rule 2: Conditional links must have at least one outgoing link.

Rule 3: Links to or from a Conditional Link must connect to a Workflow. Two Conditional Links cannot be directly connected.

Rule 5: Primary workflows cannot have outgoing links from their satisfied state.

Rule 6: Workflows should not be isolated.

Note that Rule 6 is only a warning. Isolated workflows will not prevent application generation. Isolated workflows can be linked through user generated scripting; you can write a script causing an act or state in one workflow to generate an act in another workflow, even though the two workflows are not connected by links.

Rule 7: Conditional links should not be isolated.

Rule 10: If an act is automatic then there should not be any incoming links with Stop Flag on which takes that act.

Rule 11: Paths started by multiple outgoing links from a common Act or State, having the Stop Flag on, must return to a common state of the workflow.

Rule 12: Paths started by multiple conditional links from a common Act or State must all return to a common state in all combinations of conditional paths.

Rule 13: Paths between Workflows must be logically correct:

Rule 13 concerns the way the system finds "incorrect links." The map is traversed in a number of allowed paths. All links found that follow an allowed path are declared "correct" initially. Any links left are considered "logically incorrect."

In the case of normal links, the method for traversing is a forward movement so that no link can move a workflow to a prior state. There are, however, some acts that are allowed to move the workflow backwards—like Decline to Accept and counteroffers. Also, some exception acts am also allowed to follow an abnormal flow in some circumstances, like a Cancel that does not return to the workflow.

Rule 14: Workflow links based on the same Act must have the same Stop Flag setting.

Rule 15: A Workflow can only be initiated once.

Rule 16: Workflow links of mixed types (State-based and Act-based) from the same state must have the same Stop Flag setting.

Rule 16 means that if the links coming from a state are a mix of act and state based links, they must all have the same Stop Flag setting.

Rule 17: Paths starting with outgoing links of mixed types (State-based and Act-based) must return to a common Workflow state.

Rule 18: The required attributes of a Business Process are Name and Administrator.

Rule 19: The required attributes of a Workflow are Customer, Performer, and Conditions of Satisfaction.

Rule 20: The required attributes of a Conditional Link are Description and Expression.

Rule 21: If no act can be taken in a state then it may cause deadlock.

This is a warning message that can occur when all acts in a state have been disabled.

If all acts have been disabled and there is no link path which moves the workflow forward and no Automatic Transition to move the workflow forward, the workflow will be deadlocked.

Rule 22: At least one normal act should be allowed in each state.

This is a warning message that occurs when a workflow has been defined by a template in which all the normal flow acts for a given state have been disabled. This workflow will only be able to move forward through exception flow acts.

Rule 23: If this act is disallowed, then the workflow may not be able to proceed to completion.

This is a warning message that occurs when a workflow has been defined by a template in which the designer disabled either Request, Agree, Report Completion or Declare Satisfaction and/or Agree to Counteroffer (or their counterparts in Offer types).

Rule 24: Script has references to some objects (i.e. workflow name, identities or application data) which are either deleted or renamed.

This error occurs when a script has been written, then later there is a change to the map topology, naming, application data or global data so that the script refers to an element that no longer exists.

Rule 25: Primary workflow is always activated. So script or link for initiate act will never be executed.

A workflow can only be initiated if it has not been activated. An instance of a business process always begins with the activation of the primary workflow (by the system). Therefore, the act C:Initiate is always invalid, since Customer can never initiate a Primary workflow.

This error message has two possible causes:

1. A script has been written for the C: Initiate act of the Primary Workflow.
2. A link is connected to the C:Initiate act of the Primary workflow.

This message is a warning and does not prevent application generation.

Rule 26: Workflows must have a name.

Rule 27: Workflows must have a unique name.

Rule 28: Workflows must have a unique short name.

Rule 29: A link should take an act in the target workflow.

A workflow can only move forward as the result of an act being taken. Links must connect to acts (rather than states) in target workflows because connecting to a state could have the effect of moving the target workflow forward by skipping the required act. The exception to this rule is when a link terminates a path in the state from which the path originated.

APPLICATION WINDOW LAYOUT

Each MDI Window (MapView) displays a business process map as above. Each window can be sized, moved, maximized or minimized.

Single-clicking on a map component selects the component (i.e., for cut, copy, delete, hide, etc.) To select multiple components, the shift button must be held down while single-clicking on additional components. Double-clicking on a map component (MapShape) brings up a dialog displaying the properties of the component. Holding the mouse button down over a workflow allows the workflow symbol and name to be dragged to another location. Holding the mouse button down on the "handle" of a Link line allows the link curvature to be changed.

The operation of the tools is based upon typical GUI protocols as follows.

Menu Bar

Figure 5:
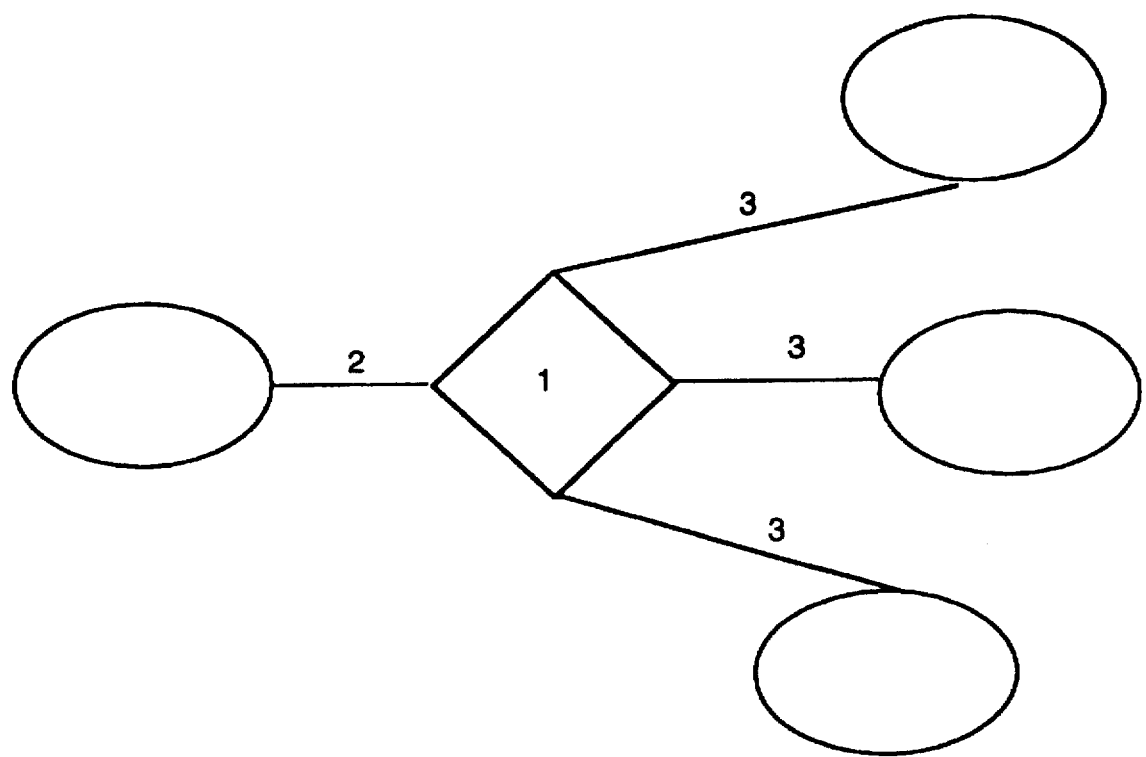
FIG. 5 is an illustration of a conditional link between workflows.

The structure of the Menu Bar and pulldown menus is as follows:

File
  Contains the features for file handling:
  New. Creates a new map.
  Open. Opens a saved map.
  Save. Saves a map.
  Save As. Offers to save the map under a new name.
  Export. Exports map data to a Windows metafile format.
  Business Process Summary. Displays summary information which includes the following:
    Owner: This refers to the person in charge of modifying the conditions of satisfactions, cycle times, or roles in the workflow.
    Creation date, modification date, and modifier. The date on which the workflow was created, last modified, and by whom this was done.
    Version: the version of business process map.
  Print Map. Prints the map as it appears on the screen.
  Print Report. Prints map data in a tabular report (including, for example, workflow definitions, conditions of satisfaction, form names, link definitions, and the like).
  Retrieve: Retrieves a previous version of a business process map that has been stored on a server for review or further editing.
  Generate Application: Converts the currently displayed map to an application consisting of a series of server specific definitions, and the forms and views required for a workflow-enabled application.
  Page Setup. Specifies map margins, headers, and footers.
  Printer Setup. Standard Windows print dialog for selecting printers, print trays and the like.
  Exit.
Edit
  Contains the Windows-standard features
  Cut. Removes a selected object from the screen and places it in the Windows Clipboard.
  Copy. Copies selected objects to the Clipboard without removing them from the current screen.
  Paste. Places Clipboard contents on the map (if they are either text or previously selected workflows.)
  Delete. Deletes the selected objects from the screen without placing them in the Clipboard.
  Select Workflow: Brings up a dialog box to select a particular workflow as the object on the display to be manipulated or operated on.
View
  Contains the tools for viewing a map in different ways
  All. Displays all workflows and workflow links.
  Normal Flow. Displays workflows and links that lead to successful completion.
  Exception Flow. Displays workflows and links that do not lead to successful completion (cancel, for example).
  Missing Information. Displays workflows in which some critical element has not yet been defined.
  Collapse. Hides secondary workflow associated with the selected workflows.
  Expand. Expands to display secondary workflows associated with the selected workflow which were hidden by a previously issued Collapse command.
  Expand All. Displays all workflows.
  Zoom In. Enlarges the display of workflows on the screen by 25% each time it is selected.
  Zoom Out. Reduces the display of workflows on the screen by 25% each time it is selected.
  Actual Size. Returns the display to 100%.
Data
  Application Data: Places a unique icon on the screen next to workflows which have application data defined in them.
  Follow Up and Reminders: Places a unique icon on the screen next to workflows which have follow ups or reminders set.
  Organizational Roles: Brings up a series of dialog boxes to enter new organizational roles or to modify existing ones.
  Identifies: Brings up a series of dialog boxes to enter new identities and the data associated with them or to modify existing identifies.
  Default Role Mapping: Brings up a dialog box to assign roles in the current business process to specific identities.
  Policy Document: Brings up a dialog box to enter text which represents a policy document for the current business process.
  Business Process Global Data: Brings up a dialog box to define data used globally by the business process.
  Follow Up and Reminders: Brings up a dialog box to set follow ups or reminders on a workflow.
  Workflow Application Data: Brings up a dialog box to define data used locally by the workflow.
  Workflow Scripting: Brings up a dialog box to enter scripts for the workflow.
  Workflow Form Names: Brings up a dialog box to enter the names of forms which will be generated by the application.
  Form Field Specifications: Brings up a dialog box to set the viewing/editing attributes of data used by the workflow.
  Workflow Template: Brings up a series of dialog boxes to define new templates or to edit existing templates.
  Check Consistency: Starts a process to check the business process for errors.
  View Last Errors: Brings up a dialog box to show the results of the last time the business process was checked for errors.
Tools
  Contains the tools for selecting different modes in the Application Builder:
  Workflow. Turns on the workflow cursor which in the preferred embodiment is an oval divided into quadrants with arrowheads at the end of each quadrant as shown in FIGS. 1a–1f. When this option is selected, new workflows can be added to the map.
  Conditional Link. Turns on the conditional link cursor which in the preferred embodiment is a diamond shape as shown in FIG. 5.
  Text. Turns on the text cursor which in the preferred embodiment is an I-beam indicating the insertion point or a pointer with a T (for text) associated with it. When this option is selected, annotation text can be added anywhere on the screen (except inside a workflow) utilizing different fonts, styles and sizes.

Pointer. Turns on the object selection cursor

Normal Flow. Turns on the defining of a normal-flow link.

Exception Flow. Turns on the defining of an exception-flow link (in which the link is one that does not move the workflow toward successful completion, such as when a cancel, decline or revoke in the originating workflow triggers a cancel in the linked workflow).

Properties. Displays the properties dialog relevant to the object currently selected. (For example, displays the workflow definition of the current workflow if a workflow is selected).

Options

Defaults. Defines the defaults for features of the program, such as the default directory into which to save map files and default workflow types.

Display. Defines the defaults for display of the icon bar and link handles.

Fonts. Defines the default font, style and font size for workflow text and annotations.

Windows

Contains standard Windows handling options.

Help

Contains an on-line help system.

Dialogs

Some of the more important dialogs are described below.

File Open (Standard Windows 3.1 File Open)

As well as File Open, several other standard Windows 3.1 dialogs (Printer Setup, Save As etc.) are used.

Business Process Summary Information

This dialog is presented when a file is saved for the first time (before the Save As dialog), or when the Business Process Summary option is selected from the File menu.

Link Definition

This dialog is displayed by double-clicking on an existing link or selecting the Properties menu option when a Link is selected. Each of the two Listboxes displays the available actions for the "from" and "to" workflow quadrants. One action may be selected from each, in order to define the Trigger and Triggered actions, respectively.

Conditional Link Definition

A Conditional Link Definition dialog is displayed by double-clicking on an existing Conditional Link or selecting the Properties menu option.

Creating a conditional link involves drawing a link between two workflows as usual (but using the Conditional Link Tool). The conditional link will be created between the two selected workflows, using the default trigger and triggered actions for the phase as with normal links. A diamond shape is displayed. By double-clicking on the diamond, a Conditional Link dialog is presented which allows the user to enter a description of the condition for the conditional link and then shows the origin and target workflows. The user may then access an Origin Link dialog and a Target Links dialog.

Double-clicking on the Origin Link or selecting the Origin Link button in the dialog box of the Conditional Link dialog presents the Origin Link dialog that allows the user to select the trigger act or state.

Double-clicking on one of the Target Links in the dialog box of the Conditional Link dialog presents the Target Links dialog that allows the user to specify the specific condition and the triggered action.

Adding additional Target Links to a Conditional diamond is done by drawing a link from a point on the diamond to a target workflow. The user is then able to edit the resulting Target Link by double-clicking on it.

File Save

This is a standard Windows File Save dialog box with the addition of a control to allow the user to save all organizational roles rather than just those roles used in the business process map.

Retrieve

This dialog shows a list of generated applications along with their current version number. The user picks one from the list and can either double click on the selection or select the OK button to load the application map.

Select Workflow

This dialog shows a list of all workflows in the business process from which the user can select one to operate on.

Roles

This dialog shows a list of organizational roles. From this dialog, the user can choose to enter a new role, modify an existing one, delete it, or print a list of roles.

Define Role

This dialog is used to enter the name of a new role and to set descriptive text for it.

Identities

This dialog shows a list of identifies. From this dialog, the user can choose to enter a new identity, modify an existing one, delete it, or print a list of them.

Edit Identity

This dialog is used to enter data about a new identity or to modify data on an existing one. The data that can be entered include name, address, phone number, roles that can be assigned, and descriptive text.

Roles To Identity Mapping

This dialog is used to associate roles that may be assigned to the identity being edited. A list of all roles is presented from which the user may select as many as may apply to the identity.

Business Process Definition

This dialog is where the user enters all general information about the business process. This includes the business process name, owner, administrator, process initiator, and the projected cycle time. The version of the business process as well as the computed cycle time are also displayed.

Default Role Mapping

This dialog box shows a list of all roles actually used within the business process and the particular identities assigned to those roles. The user may select a role and pick from a list of identities which can be assigned to that role.

Policy Document

This dialog is used to enter text which describes the policy document of the business process.

Business Process Global Data

This dialog box is used to enter or modify data used globally by the business process. The user may select whether the data item is a character string, a number, or a calendar date.

Workflow Definition

This dialog sets the basic information for the definition of a workflow. This includes the workflow name, which template is used, the participants, conditions of satisfaction, cycle times, cost/value, styles and associated text.

Workflow Template

This dialog is brought up from the Workflow Definition dialog box and is used to locally modify the template selected for the workflow. The user is presented with a list of Acts and States with space provided to substitute new names for them. Also provided is dialog box which allows the user to specify that an act should be disabled.

Select Participants

This dialog is brought up by the Workflow Definition dialog box and is used as an aid to selecting the participants (Customer, Performer, Observer) of a workflow. The dialog shows a list of available roles and a series of pushbuttons to automatically assign them to be the workflow participants.

Follow Up and Reminders

This dialog is used to set whether follow ups and reminders are issued when cycle times are exceeded for phases of a workflow. The user can set the amount of time after the due time has passed for issuing the follow up or reminder and the interval of subsequent messages.

Workflow Application Data

This dialog is used for the definition of data item that are used locally by the workflow. The user can enter the name used to identify the data item, the type of data that it is, and a default value for it.

Workflow Scripting

This dialog allows the user to enter scripts for the workflow. The user can choose to write scripts for all Acts and States or for individual ones. A pushbutton is provided to bring up a second dialog box which provides assistance in writing these scripts. A mechanism is provided for checking scripts as they are being written or edited for syntax errors.

Script Assist

This dialog is brought up by the Workflow Scripting dialog. It provides the user with lists of the available script commands, Acts and States, workflow names, and data field names. The user can select items from these lists and have them 'pasted' in to the Workflow Scripting dialog box. An act or state as well as workflow names can be selected from drop-down lists. The user may type scripts directly into a text field provided by the dialog.

Workflow Form Names

This dialog is where the user enters in the names of forms for the workflow. These names will be used when forms are generated from the application. Space is provided for separate form names for the Initiator, Customer, Performer and Observer.

Form Field Specifications

This dialog is used to set the attributes on data that will be used in the forms generated by the application. A list of all data items, both global and local, is shown and the user may choose to set these items as editable, hidden, read only, or must fill. The user can also choose whether these attributes apply to all Acts and States or to individual ones.

Select Template

This dialog allows the user to choose a template for modification or to define a new one.

New Template

This dialog is used to define a new template. The user enters a name for the new template and is presented with a list of Acts and States and space where substitute names for them can be entered. Also provided is dialog box which allows the user to specify that an act should be disabled.

Defaults

This dialog is used to set global defaults for the program. The user sets the default template to be used for workflows, the map author name, and default file path for saving maps here.

DESIGN AND IMPLEMENTATION DESCRIPTION

In a preferred embodiment, the software used to implement the workflow Application Builder design is based on the Model-View-Controller (MVC) paradigm of object oriented programming. The MVC paradigm divides an application into three main divisions: Model which represents the core application logic, View which represents the user interface logic, and Controller which represents the message and event handling logic that implements the tools for manipulation of objects.

The MVC framework for applications provides a logical split of the different functions in a GUI application. Isolating the core application logic in the Model makes the application more portable, the design more understandable and the implementation extendible. The further logical separation of the event handling in the Controller from the user interface in the View enables the application to be more easily ported to another GUI environment. The Application Builder is designed on the MVC paradigm discussed above as shown in FIG. 4. The Model classes describe the business process and its components in terms of a hierarchy of classes. The View Classes draw the workflow map of a business process and its components on different displays including the screen, printer and metafile (i.e., a graphics-format Windows 3.1 metafile on disk, which can be displayed by other Windows programs)

The two highest level classes of the Model and the View provide the framework for a software implementation of the invention. A class designated as the ActWfModel class owns and manages all the model classes (Object Model) such as business processes, workflows etc. ActWfModel is used by the ActWfView class which owns and manages user interface components such as menus, icon bars, dialogs and Multiple Document Interface (MDI) child windows. Only one instance of the ActWfModel and ActWfView objects are allowed.

The ActWfView class receives the menu and toolbar commands from C++/Views and the toolbar. It in turn passes them directly to the active (top level) MDI window (represented by a MapView Controller component object).

The MapView class has two main components, the painting and controller components. The controller component contains the menu and toolbar interpreter 81 as well as the mouse and keyboard interpreter 83 which receive the interaction (inputs) from the user. These are a set of methods that receive input from the user and pass them to the appropriate tool. There are also methods for changing the active tool, namely tool selector 85, e.g. when the user clicks the mouse in an empty area of the window the current tool is called, and when the user clicks the mouse in a current object the appropriate object tool is called to process the click. The tool procedures 87 of MapTool are responsible for managing the creation, deletion, selection of object attributes, selection and dragging of the various objects in the screen. They also handle the automatic linking (selecting a temporary tool) when the mouse is on the border of a specific object. For this they have a close interaction with the shapes in the view with an interface that helps retrieve, set, and prompt user for attributes.

The main methods of the tools are: mouseDn (for mouse down events) mouseDbl (for mouse double click events) mouseMv (for mouse move events), mouseUp (for mouse up events), keyDelete and keyEscape events (for their equivalent key selections). The tool translates mouse up/down sequences into clicks and calls the appropriate methods. It also contains the method getShape to find a specific object in an area of the window. The specific methods for the various tools can be found on the Controller Class Attributes section below.

The shapes provide with a set of methods used by the tools to find them (pointIn, pointInZone, rectIn), calculate areas used (getInvalidRect), change attributes with a properties dialog 45 (showProperties) and change position (beginDraggingAt, draggingAt, endDraggingAt). These methods are in the View Class Attributes section below. There are other methods used that serve as an interface to obtain/set the various object attributes.

The painting component of the MapView class contains the methods to display the image in the Window. This class enumerates all of its objects in that area and issues the paint method in the shape object. Also when the user is dragging an object, the tool object calls the draw method to display the object as it is being dragged. The two main shape methods along with the MapView paint method constitute the Display Module 97. To print or export a map, the print or export command from the file Menu is received at the MapView object which sets up a different environment via MapPrinter and MapMetafile which redefine the display port through which the object will be displayed, and calls the same shape paint procedures. These MapPrinter and MapMetafile classes define the functionality for the print module 98 and export module 99.

The system maintains the main data in the Model classes. Every view class has its model class equivalent where the data is stored. The view classes get all this information from the model classes. The main interface for the model classes is a series of set/get functions to manage the attributes of the class. The functions enable the system to maintain the consistency of the object's data and provide the map rules 103 for the data. This model data is the only data that is stored in data files. The process of storing this data is via get/put methods that every model class provides. These two methods in every model class constitute the file I/O module 105 that maintains the map files.

Figure 6:
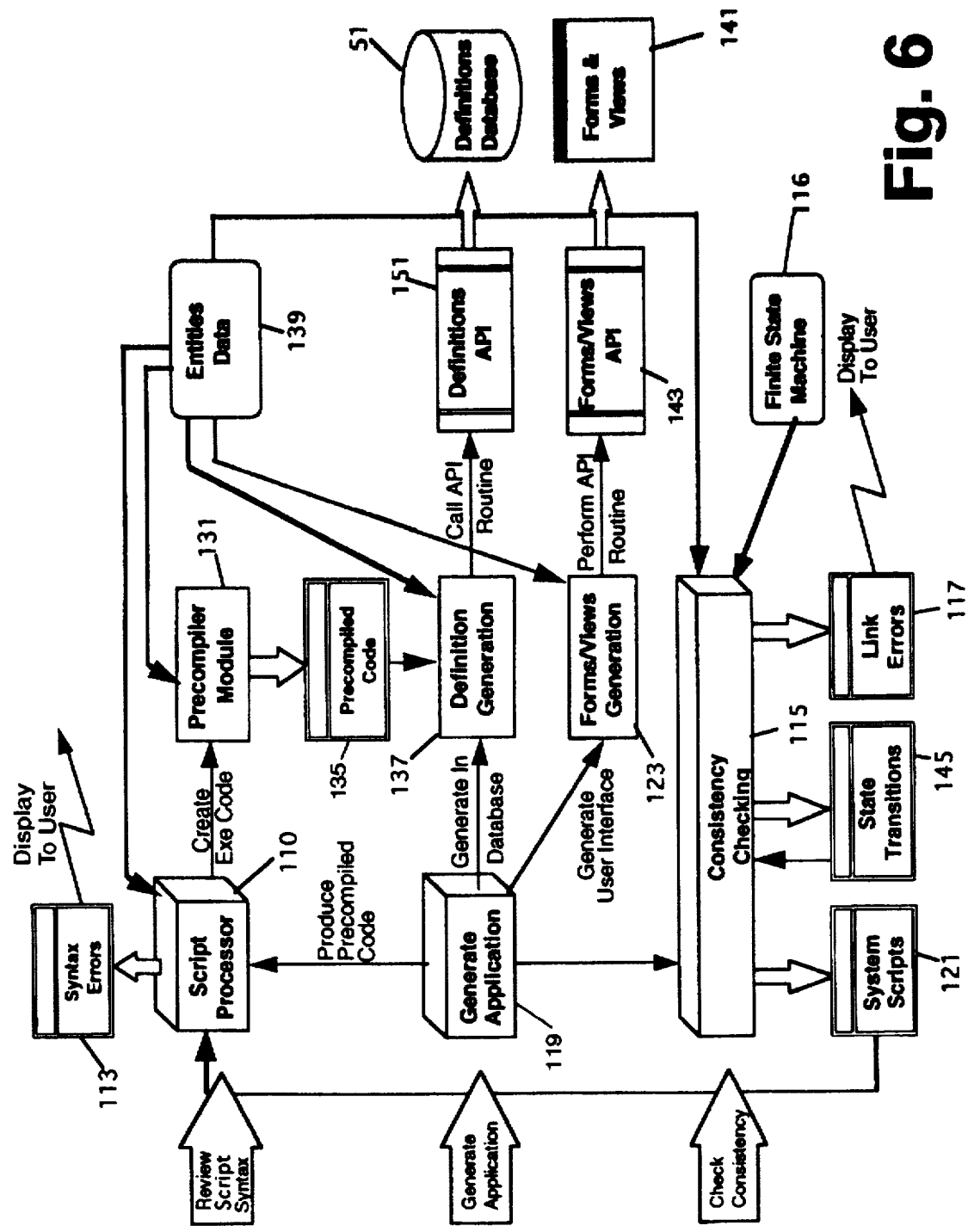
FIG. 6 is a block diagram showing the flow of an application builder implemented according to the teachings of the present invention.

Referring now to FIG. 6 which illustrates the overall flow of an implementation of the invented application builder, the user initiates the flow by one of three processes namely, Review Script Syntax, Generate Application or Check Consistency.

By initiating the Review Script Syntax process e.g. by selecting workflow scripting from the Data menu, a process is begun to verify the syntax of a workflow script. This process calls Script Processor module 110 which checks the syntax and generates syntax errors 113 if there are any.

By initiating the Check Consistency process e.g. by selecting from the Data menu, a process is begun to verify the completeness of the business process maps and the validity of the relationships among workflows. The Consistency Checking module 115 is called for this purpose. The Consistency Checking module uses Finite State Machine 116 and generates Link Errors 117 if there are any.

By initiating the Generate Application process e.g. by selecting from the File menu, a process is begun to generate the business process application in the definitions database 51. This task is performed by Generate Application module 119. This module first checks the completeness of the map by calling Consistency Checking module 115, generates System Scripts 121, precompiles system and user scripts, writes details of the business process in the definitions database and calls forms and views generation module 123 for the user interface of the workflow application.

The script processor module 110 implements the parser which checks the syntax of the script written by user. This module also generates the precompiled code using the PreCompiler module 131 if required. This module is used in two cases:

Case 1: If the user initiates the Review Script Syntax process, then the Script Parser checks the syntax and if there is any error then it puts the description of the error in a Syntax Error Description object, which is shown to the user.

Case: If the user initiates Generate Application process, then the Script Processor module is called to generate the PreCompiled Code 135. This module is capable of parsing system scripts as well as user scripts.

The PreCompiler module 131 is used by Script Processor 110 to generate the PreCompiled Code for all types of scripts. This module has the knowledge of the grammar of the workflow scripting language for PreCompiled Code. The purpose of this module is to convert scripts to a tokenized form and reduce the need for database references at run time. This module converts the name-references of all objects to identification references. This reduces the total number of database accesses the transaction manager 33a makes while executing the script.

The output of the PreCompiler module—PreCompiled Code 135 is used by Definition Generation module 137 to store the tokenized script in the database.

This module uses Entities Data 139 to obtain the details of various objects like workflow, link, conditional link, type of workflow and the like.

The Consistency Checking module 115 is called for two different purposes:

Case 1: When the user initiates Check Consistency e.g., by selecting from the Data menu, then this module is called. This module checks the completeness of the business process map by verifying that all essential data has been provided by the user. After that it traverses the business process map and checks if all the links are proper. It uses Finite State Machine 116 to verify the appropriate links taking into account the context. If there is any problem with the link, then it generates Link Error 117 objects for each error. These LinkError objects are used by the user interface module (not shown) to communicate to the user about the problems in the business process map. The Consistency Checking module uses Finite State Machine 116 to verify the correctness of the type of links in various contexts. Analyzing the automatic transitions defined by the user, acts disabled by the user, and links among workflows, this module generates all possible state transitions for each workflow, where they are kept. At the end, it uses state transition data from each workflow to detect the conflicting specifications and possible causes of deadlocks.

Case 2: When the user activates the Generate Application process e.g., by selecting from the File menu, this module is called. In this case this module does everything described in the Case 1 and it also generates System Scripts 121. The System Scripts implement links between workflows. The System Scripts also manage the synchronization between workflows by setting various internal flags. The Consistency Checking module utilizes a set of routines distributed in three classes: Business Process, (WfBusProcess), Workflow (WfWorkflow) and Links (WfLink). The WfBusProcess routine calls the WfWorkflow routine which in turn calls itself for different workflows The Generate Application module 119 executes the following tasks:

Calls Consistency Checking module 115 to verify the completeness and the consistency of the map.

Calls Consistency Checking module 115 again to generate the system scripts. These system scripts are used to ensure the synchronization between the workflows and to implement links between workflows.

Calls Script Processor module 110 to check the syntax of user defined script.

Calls Script Processor module 110 to tokenize all user and system scripts to produce PreCompiled code 135.

Calls Definition Generation module 137 to write the details in the definition database 51.

Calls Forms/Views Generation module 123 to create the forms and views in the definitions database.

The Definition Generation module 137 is initiated by the Generate Application process. It obtains the details of all objects in a business process from Entities Data 139 and writes them in the database using Definitions API 151.

The Definition Generation module 137 is distributed over several classes. The Definition Generation method in each class has the responsibility of writing the details of the corresponding objects. First the method of business process is called which in turn calls for all the workflows. The method in each workflow calls the lower level methods of definition generation for the objects it consists of.

The Forms/Views Generation module 123 is called by Generate Application module 119 to create Forms and Views 141. It obtains the details of fields of the forms and their attributes from Entities Data 139 and uses Forms/Views API 143 to create the user interface in the database.

In a business process map, the user defines workflows and links among them. The purpose of the links between workflows is to synchronize the events of different workflows. One can specify a link which will start a workflow when some other workflow is in certain state. The user can also make some of the state transitions automatic. All these specifications are converted into System Scripts. When a business process is running, the Transaction Manager 33a executes these scripts to get the desired triggering of acts in various workflows.

This script is generated by the Consistency Checking module when Generate Application module 119 calls for it.

The Syntax Error object is created by Script Processor module 110 to preserve the details of the error detected in scripts defined by the user. It contains the line number and column number where the error was detected. It also contains the description of the error and has a method to display the error.

Link Error objects are created by the Consistency Checking module to preserve the details of the errors detected while checking the consistency of the map. Each Link Error object points to the object it is associated with and has the description of the error.

The State Transitions object 145 preserves details of all possible transitions in a workflow. It knows whether a transition is automatic, manual, is initiated by a user defined script or by a link specified in the map or a combination of all these. Once all the transitions are generated, the Consistency Checking module verifies that all the transitions are consistent and free from deadlock situations.

The State Transitions object 145 are created and used by Consistency Checking module only 115.

PreCompiled code 135 is the tokenized form of the script. PreCompiler module 131 tokenizes all the script in an assembly like language and Definition Generation module 137 stores them in the definition database.

The business process definition is the most important output of the Application Builder. This data is stored in the definitions database 51 and used by Transaction Manager 33a in the various stages of the business process. It contains all the details of the business process.

The Forms/Views generation module 123 uses Forms/Views API 143 to create the user interface of the workflow enabled application 73. The Forms/Views API has the knowledge of the underlying database.

The Finite State Machine module 116 has the state transition tables for Request and Offer type of workflows. It implements various methods to access the data and provides support to the Consistency Checking module for checking the consistency and for generating the System Scripts.

The Entities Data 139 is the data associated with all basic elements of a business process. The main objects are Workflows, Links, Conditional Links, Followup, Cycle Time, Customized Names, Acts and States.

The Definition API 151 is a set of application programming interface used by Definition Generation module 137 to access the underlying database. Most of the services are to write the details of objects like- Business Process, Workflow, Cycle Time, Followup, Scripts, Application Data. Some of the API provides facilities to read the definitions database such as obtaining the identification of the workflow or application data.

The Forms/Views API module 143 is used to create forms and views in the database. This module provides an interface to the Application Builder to specify the details of forms for viewing at different times and for different workflows. After obtaining all the details, this module creates the forms and views in the definitions database 51.

Figure 7:
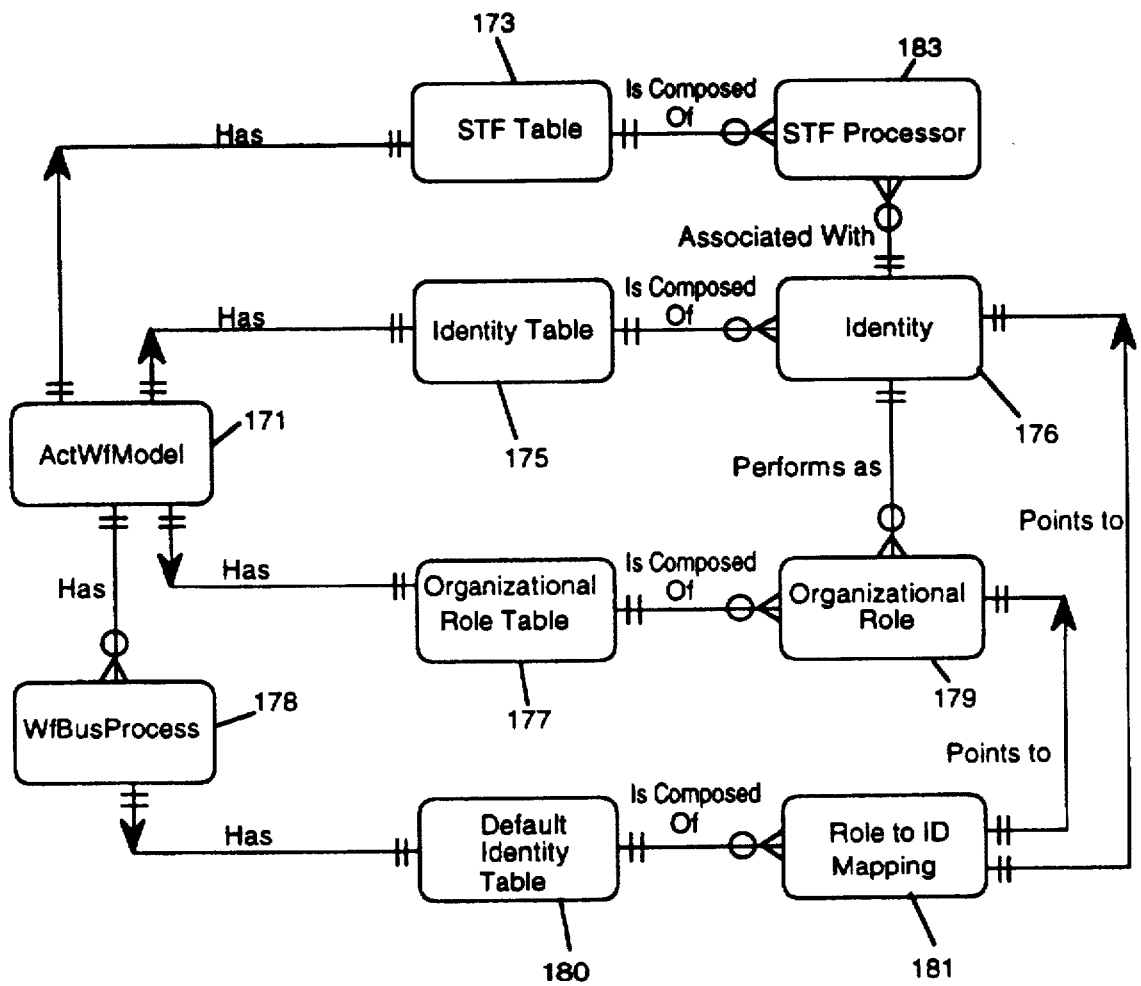
FIG. 7 is a block diagram showing the relationships of data used utilized by the present invention when viewed at the organization level.

Referring now to FIG. 7, the relationships of data used at the organization level will now be described.

The class ActWfModel 171 has three tables used at the organization level. They are the STF Table 173, the Identity Table 175, and the Organizational Role Table 177.

The STF Table is composed of instances of STF Processor (STFPROC). These represent Standard Transaction Format Processors used in Network mail.

The Organizational Role Table is composed of instances of Organizational Role (ORGROLE) 179.

The Identity Table 175 is composed of instances of Identity (IDENTITY) 176. Identities are the real people who will take on an organizational role within the business process. Each Identity may be associated with up to two STF Processor's 183. Each Identity may perform zero or more Organizational Roles.

Each business process (WfBusProcess) 178 has a Default Identity Table 180 which is composed of zero or more Role To ID Mapping instances (ROLETOID) 181. Each Role to ID Mapping points to one Identity and one Organizational Role and forms the association between the two for the particular business process.

Figure 8:
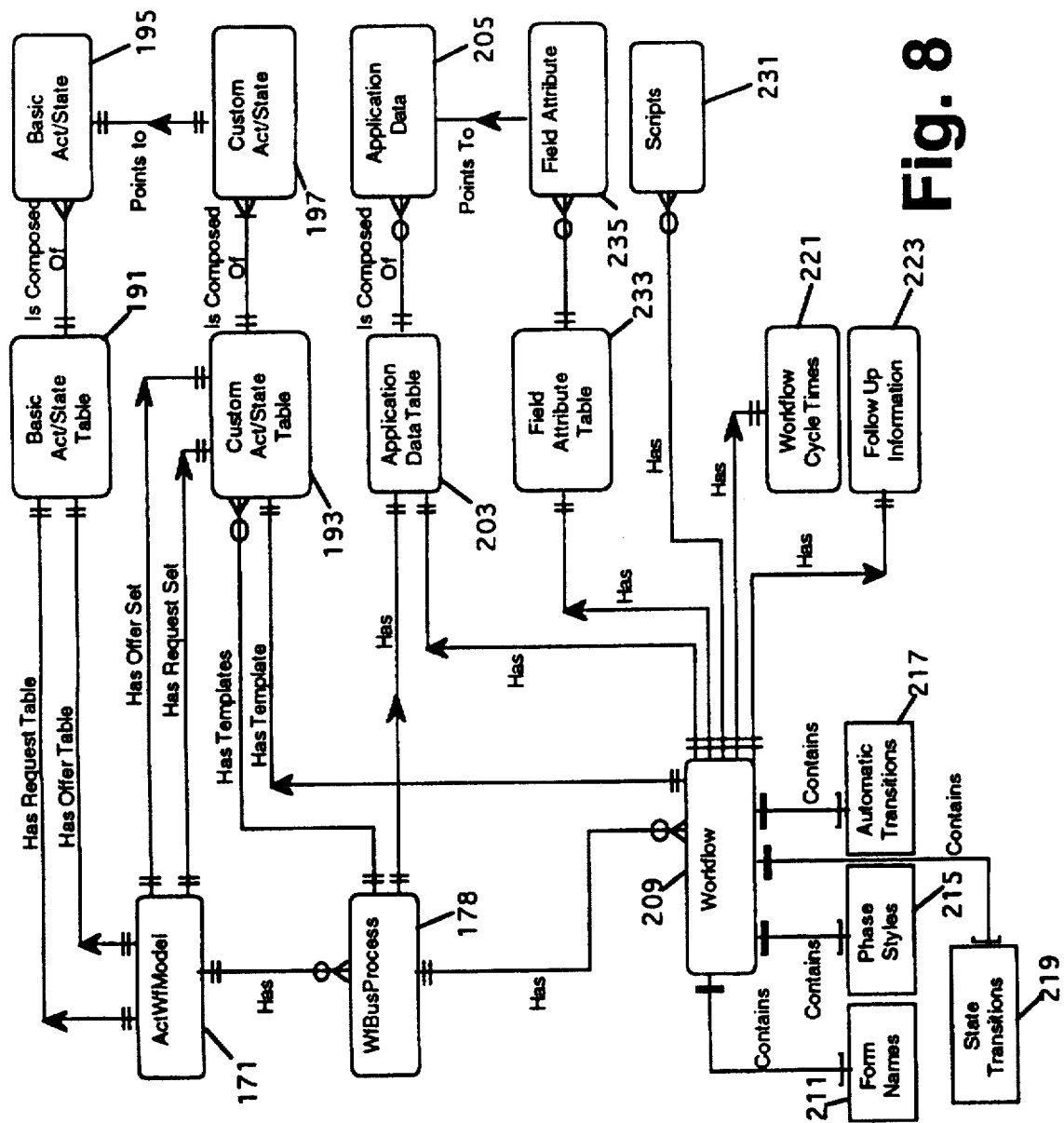
FIG. 8 is a block diagram showing the relationships of data used utilized by the present invention when viewed at the business process level.

Referring now to FIG. 8 which illustrates the relationships of data used utilized by the present invention when viewed at the business process level, ActWfModel is the class which is the parent to all business processes. It has an Offer and a Request Basic Act/State Table 191 and two Custom Act/State Tables 193 representing Offer and Request custom types.

The Basic Act/State Table (BACTSTAT) is composed of a collection of Basic Acts and States 195. These are the standard Acts and States which a workflow may use. An Act is the action that will be done when a particular Workflow phase is reached and a State is the condition that that phase is in.

The Custom Act/State Table 193 is composed of a collection of Custom Act/States 197. These are the standard Acts and States which may be aliased with customized names. The aliasing is done by the user so that the Acts and States will have more meaningful names to the Business Process and its Workflows.

Each Business Process is represented by an instance of WfBusProcess 178. These will be the parents to the associated workflows that make up the business process. Each WfBusProcess may have templates which represent Custom Act/State Tables that are used with the workflows of the business process. These templates are the choices available to the workflows. The WfBusProcess also has an Application Data Table 203 for data that is global in nature to the whole Business Process. The Application Data Table is composed of many individual items of Application Data 205. Each Application Data item may represent a name, a number, or a date.

There is an one instance of workflow 209 for each workflow in the business process. Each workflow may have it own template of Custom Acts/States 197 from the Custom Act/State Table 193.

Each workflow instance contains Form Names (FORMNAME) 211 or the four possible forms that can be created by the Forms and Views Generation module. The four forms are Initial (used only in the Primary Workflow), Customer, Performer, and Observer. If the user enters a name for any of these forms then the intention is that a form will be generated when the application is run.

Each workflow instance contains Phase Styles 215 for the four workflow phases. These styles determine the appearance of the particular Phase in the user interface.

Each workflow instance contains Automatic Transitions 217 for the four workflow phases. These can be set active by the user to automatically transit the workflow phase when no actions are required.

Each workflow instance contains temporary State Transitions 219 only when consistency checking is performed. This object preserves details of all possible transitions in a workflow. It knows whether a transition is automatic, manual, by a user defined script, or by a link specified in the map, or any combination of these.

Each Workflow also has an instance of Workflow Cycle Times 221 to set the cycle times for the four phases and an instance of Follow Up Information 223 to set reminders when cycle times are exceeded.

If the user has entered Scripts (SCRIPT) 231 to be executed by the workflow when certain Acts or States are achieved, then these are also attached.

The Workflow may have Application Data 205 that is used only by itself locally and so it has its own Application Data Table for this.

Application Data used by the workflow, whether global or local, must have attributes (Hidden, Read Only, etc.) attached to it as to how the data is presented in this workflow. This attribute information is stored in a Field Attribute Table 233 which is composed of Field Attributes (FLDATTR) 235. There is a Field Attribute item for each Application Data item.

The Model Classes and Model Class Attributes

The Model incorporates model classes which implement the workflow Application Builder logic. The model classes describe the business process and its components in terms of a hierarchy of classes. The classes in the model form what is sometimes described as the Object Model for the application. The Object Model is similar to an Entity-Relationship model in data modeling.

The model classes are, in effect, data structures. External (data) attributes of the Model Classes are listed below. Implementation will require additional instance variables (internal data) and methods beyond those described here which depend upon the platform on which the software is to be used. Such additional details would be readily apparent to persons skilled in the art.

ActWfMdl

Manages the other classes in the model including any database access and storage. This is the top class of the model and represents a collection of WfBusProcess objects and the data to operate them.

| Attribute | Description | Type | Size |
|---|---|---|---|
| obColBusProcesses | Collection of Business Processes | | |
| ReqActStateTable | Basic Act State table for Request type Workflows | | |
| OfrActStateTable | Basic Act State table for Offer type Workflows | | |
| STFProcs | Table of STF Processors | | |
| StrMapAuthor | Default Map Author | String | 64 |
| StrMapPath | Default Map Path | String | 132 |
| RequestTemplate | Default Request Template | WfTemplate | |
| OfferTemplate | Default offer Template | WfTemplate | |
| OrgRoleTable | Organization Role Table | OrgRoleTable | |
| IdentityTable | Identity Table | IdentityTable | |

OrgRoleTable—Collection of OrganizationRoles
IdentityTable—Collection of Identities
OrganizationRole A class used to describe a role used in a business process. The role is responsible for actions within the phases of workflows. An identity is assigned to the role in the business process to indicate the individual responsible for the actions.

| Attribute | Description | Type | Size |
|---|---|---|---|
| OrgRoleId | Role ID number | long | |
| StrName | Name | char | 64 |
| StrDesc | Description | char | 64 |

Identity

A class used to describe the identity of an individual within the organization which contains the business process. This identity may be assigned to a role within the business process to indicate the individual responsible for the actions of that role.

| Attribute | Description | Type | Size |
|---|---|---|---|
| Id | Identity ID number | long | |
| StrName | Name | char | 64 |
| StrPostalAddr | Postal address | char | 128 |
| StrTelNo | Telephone number | char | 32 |
| StrTelExtNo | Telephone extension number | char | 10 |
| StrFaxAddr | Fax number | char | 32 |
| StrOrgnName | Organization name individual belongs to | char | 64 |
| StrDeptName | Department name individual belongs to | char | 32 |
| StrLocationName | Location of individual | char | 32 |
| StrNotes | Descriptive text of individual | char | 254 |
| StrNetAddr | Net address | char | 128 |
| MailAddr | Net Mail address | char | 128 |
| STFId | STF Processor ID | long | |
| MailId | Net Mail STF Processor ID | long | |
| CollRoleIds | List of Roles this identity can take | | |

STFProc

A class used to associate STF Processor names and ID's for use by Identities.

| Attribute | Description | Type | Size |
|---|---|---|---|
| Id | STF ID number | long | |
| Name | Name | char | 64 |

WfBusProcess

This is included in a collection in ActWfModel. This class provides the logical representation of the business process to be mapped. It includes a collection of map components (WfComponent) as well as information on the creation of the map (Author, creation date, etc.).

| Attribute | Description | Type | Size |
|---|---|---|---|
| StrName | Name of the business process | char | 64 |
| StrAdmin | Administrator of the business process | char | 64 |
| DateCreated | Creation data | date | 8 |
| StrProcessVersion | Version of the business process map | char | 64 |
| StrMapAuthor | Author of the business process map | char | 64 |
| Initiator | Initiator of the business process | char | 64 |
| CollComponents | Collection of WfComponents | | |
| ComCycleTime | Computed cycle time | CycleTime | |
| UsrCycleTime | Projected cycle time | CycleTime | |
| BpBoundDataTable | Business process global application data | BoundDataTable | |
| RoleToldTable | Default Role to Identity table | RoleToldTable | |
| StrPolicyText | Business process policy document | char | 254 |
| CollAvlTemplates | Collection of available workflow templates | | |
| DefTemplate | Default workflow template | WfTemplate | |
| Cost | Computed cost of business process | | |
| Price | Computed price or value of business process | | |
| Main Methods | | | |
| GenerateApp | Generate the application from the business process map | method | |
| CheckMissingInfo | Check the business process map for missing information | method | |

RoleToldTable

A class containing the associations of roles to specific identities within the business organization. This is in the form of a dictionary of key/value pairs where the Role is the key to a corresponding Identity value.

| Main Methods | Description | Type | Size |
|---|---|---|---|
| getRoleWithIdentity | Obtain the Role associated with this Identity | method | |
| getIdentityWithRole | Obtain the Identity associated with this Role | method | |

DefaultRoleMapping

This is a collection of default identity assignments that correspond to the roles used in the business process.

WfComponent

This is an abstract class which provides the base for all the classes which represent components of a business process. It includes the component type, the name and position of the object.

| Attribute | Description | Type | Size |
|---|---|---|---|
| ComponentKey | unique identifier of this component in the business process | int | |
| ComponentType | One of Workflow, Link, Conditional link or FreeText | enum | |
| StrName | Name of a Map, Workflow, Link or other component | Character | 64 |

| Attribute | Description | Type | Size |
|---|---|---|---|
| Origin | Logical position with respect to the origin (0,0) of the Business Business Process Map. Translated to device units as required for display, printing and metafile output. | VLocation object (x,y) | |

WfAnchor

This is derived from WfComponent. This is an abstract class which provides the meaning for origin/target objects as Workflows and conditional links. It includes the size of the object.

| Attribute | Description | Type | Size |
|---|---|---|---|
| WfComponent | inherited | WfComponent Object | |
| Width | Width of the component | int | |
| Height | Height of the component | int | |

WfWorkflow

This class is derived from WfAnchor. It models the logical concept of a workflow, including customer, performer and observers data, conditions of satisfaction, associated text as will as cycle times.

| Attribute | Description | Type | Size |
|---|---|---|---|
| WFAnchor | inherited | WfAnchor Object | |
| Primary Workflow | identifies Primary workflow request or offer | Boolean char | 1 |
| Type Multiple repeating | identifies if workflow is of type multiple repeating | | |
| Customer Name | name of the person requesting the work | text | 64 |
| Performer Name | name of the person performing the work | text | 64 |
| Observers Names | names of non-participating, but interested, parties | text | 64 |
| Initial Form name | name of the associated form | text | 64 |
| Customer Form name | name of the associated form | text | 64 |
| Performer Form name | name of the associated form | text | 64 |
| Observer Form name | name of the associated form | text | 64 |
| Conditions of satisfaction | Conditions of satisfaction of the workflow | text | 1500 |
| Associated Text | Additional text. | text | 1500 |
| Workflow Cycle Time | days, hours, minutes allowed to complete the workflow | WfCycleTime | |
| Followup Data | Followup data for the workflow | FollowUp | |
| Bound Data Table | Application data for this workflow | BoundDataTable | |
| Field Attribute Table | Field attributes for the workflow data | FieldAttrTable | |
| Custom Names | Customized names for Acts and States | WfTemplate | |
| User Scripts | Arrays of user scripts for Acts and States | char [ ] | |
| Workflow Total Cost | cost to complete the workflow | int | |
| Proposal Phase Cost | cost to complete the proposal phase of the workflow | int | |
| Agreement Phase Cost | cost to complete the agreement phase of the workflow | int | |

| Attribute | Description | Type | Size |
|---|---|---|---|
| Performance Phase Cost | cost to complete the performance phase of the workflow | int | |
| Satisfaction Phase Cost | cost to complete the satisfaction phase of the workflow | int | |
| Workflow Total Price | assessment of price/value associated with the completion of the workflow | int | |
| Proposal Phase Price | assessment of price/value associated with the completion of the proposal phase of the workflow | int | |
| Agreement Phase Price | assessment of price/value associated with the completion of the agreement phase of the workflow | int | |
| Performance Phase Price | assessment of price/value associated with the completion of the performance phase of the workflow | int | |
| Satisfaction Phase Price | assessment of price/value associated with the completion of the satisfaction phase of the workflow | int | |
| Graphical attributes | requested graphical attributes such as style | Styles | |

WfConditionalLink

This class is derived from WfAnchor. It documents conditional links between Workflows. The WfConditionalLink components are illustrated in FIG. 5. WfConditionalLink has the following attributes:

| Attribute | Description | Type | Size |
|---|---|---|---|
| WFAnchor | inherited | WfAnchor Object | |
| Description | Text explaining the decision to be made | text | 1500 |

WfLink

This class is derived from WfComponent. It models the logical link between Workflows and Conditional links, including the link type and the trigger and triggered actions in the source and target workflows, respectively.

| Attribute | Description | Type | Size |
|---|---|---|---|
| WfComponent | inherited | WfComponent Object | |
| FromPosition | Workflow/State/Sequence from which this Link initiates | pointer to Wfposition Object | |
| ToPosition | Workflow/State at which this Link terminates | pointer to Wfposition Object | |
| TriggerAction | Action (Trigger Action) within the originating Workflow which can initiate this link | | |
| TriggeredAction | Action (Triggered Action) within the target Workflow which is initiated by this link | | |
| Condition | condition that triggers this link (in the case of links from conditionals to workflows) | text | 64 |

WfFreeText

This class is derived from WfComponent. It models the free-form text which may be placed on a Map of a Business Process. Please note that the Component name is used to hold the text to print.

| Attribute | Description | Type | Size |
|---|---|---|---|
| WfComponent | name, position | WfComponent | |
| Width | size of the text box | int | |
| Height | size of the text box | int | |
| Text | text of the annotation | text | 64 |
| Font | e.g. "Helv" | text | 20 |
| Size | e.g. 8 | text | 2 |
| Attributes | Bold, underline etc. | Boolean | |
| Alignment | left, right, centered | enum | |
| Border | has a border | Boolean | |
| Word wrapping | this text should/should not wrap | | |

WfPosition

A class used to model the position of the starting or ending point of a link in a workflow as well as the curvature handles for the link. This object is created by a MapShape or derived classes from a given point in a MapShape.

| Attribute | Description | Type | Size |
|---|---|---|---|
| Phase | phase in the workflow | int | |
| Direction | From, To | int | |
| Sequence | key for anchor | int | |

WfCycleTime

This is a class which is a collection of four Cycle Time objects to represent the four phases of a workflow.

| Attribute | Description | Type | Size |
|---|---|---|---|
| Request or Offer Time | Time to make the request or offer | CycleTime | |
| Response Time | Time to respond to request or offer | CycleTime | |
| Performance Time | Time to perform request or offer | CycleTime | |
| Customer Response Time | Time for customer to respond to fulfilled request or offer | CycleTime | |

CycleTime

A class used to keep track of hours, minutes, and days for workflow phases.

| Attribute | Description | Type | Size |
|---|---|---|---|
| usDays | Number of days | int | |
| usHours | Number of hours | int | |
| usMinutes | Number of minutes | int | |

FollowUp

A class to contain details about when follow ups should be sent to the customer or performer when cycle time is exceeded.

| Attribute | Description | Type | Size |
|---|---|---|---|
| Completion Offset | Time offset when follow up message should be sent | CycleTime | |
| Completion Max Times | Maximum number of times the message sent | int | |
| Enable Late Completion | Send Completion Late messages? | Boolean | |
| Completion Recurrence | Message recurrence interval | Recurrence | |

43

-continued

| Attribute | Description | Type | Size |
|---|---|---|---|
| Performer Response Offset | Time offset when follow up message should be sent | CycleTime | |
| Performer Response Max Times | Maximum number of times the message sent | int | |
| Enable Late Performer Response | Send Performer Response Late messages? | Boolean | |
| Performer Response Recurrence | Message recurrence interval | Recurrence | |
| Customer Response Offset | Time offset when follow up message should be sent | CycleTime | |
| Customer Response Max Times | Maximum number of times the message sent | int | |
| Enable Late Customer Response | Send Customer Response Late messages? | Boolean | |
| Customer Response Recurrence | Message recurrence interval | Recurrence | |
| Remind Offset | Time offset when follow up message should be sent | CycleTime | |
| Enable Remind | Send Reminder of Completion messages? | Boolean | |

WfTemplate

This class is used to define templates for the actions and states of a workflow. The two common type are offer and request. Customized templates can be used to give these actions and states more meaningful names.

| Attribute | Description | Type | Size |
|---|---|---|---|
| CollASCNames | Collection of Acts, States, and Custom Names | Collection | |
| StrName | Template Name | char | 32 |

ActStateCustName

This class stores basic information about an Act or State used in a template. The name can be set to a custom name.

| Attribute | Description | Type | Size |
|---|---|---|---|
| StrName | Customized AAct or State name | char | 128 |
| ActStateId | Act or State ID number | int | |
| fActState | Act or State flag | Boolean | |
| fDisabled | Disabled flag | Boolean | |

BasicActState

This class describes an Act or a State.

| Attribute | Description | Type | Size |
|---|---|---|---|
| StrName | Customized AAct or State name | char | 128 |
| ActStateId | Act or State ID number | int | |
| fActState | Act or State flag | Boolean | |
| WfType | Request or Offer workflow type | int | |
| fException | Exception flag | Boolean | |
| ActProtagonist | Protagonist in Action | enum | |
| FormType | Form type | enum | |

44

BasicActStateTable

A collection of BasicActStates.

BDFieldAttrib

A class to describe attributes of data fields.

| Attribute | Description | Type | Size |
|---|---|---|---|
| idBDStruct | Pointer to Bound Data these attributes are for | BoundData | |
| idWorkflow | Pointer to workflow this belongs to | WfWorkflow | |
| DefaultAttrib | Default attribute | enum | |
| ActAttribs | Array of attributes for Acts | enum array | |
| StateAtrribs | Array of attributes for States | enum array | |

FieldAttrTable

A collection of BDFieldAttrib's.

BoundData

This is data that can either be associated with the business process as a whole or with just one particular workflow. This class describes that data.

| Attribute | Description | Type | Size |
|---|---|---|---|
| StrName | Bound Data name | char | 64 |
| DataType | Data type | enum | |
| MaxLen | Maximum length | int | |
| StrInitialVal | Initial value | char | 254 |
| BDId | Bound Data ID | int | |

BoundDataTable

A collection of BoundData's.

AwFSM

This class encapsulates all static information about the finite state machine of a workflow. It provides static methods to access the characteristics of different acts and states.

| | Description | Type | Size |
|---|---|---|---|
| Attribute | | | |
| ReqStateTransit | Table of all possible state transitions in Request type of workflow | StateTransition | |
| OfrStateTransit | Table of all possible state transitions in Offer type of workflow | StateTransition | |
| Main Methods | | | |
| getNormPostActs | Returns a list of normal acts which can be taken in the specified state | method | |
| getExcpPostActs | Returns a list of exception acts which can be taken in the specified state | method | |
| getPostActs | Returns a list of all acts which can be taken in the specified state | method | |
| getPreActs | Returns a list of all acts which lead to a specified state | method | |
| getPostState | Return the state after a specified act is taken | method | |
| getPreStates | Returns a list of all the states in which a specified act can be taken | method | |
| isValidPostAct | Confirms if a specified act can be taken in a specified state | method | |
| getMostNatural-PostAct | Returns a normal act which can be taken in a specified state | method | |

| | Description | Type | Size |
|---|---|---|---|
| getSeqFor-Traversal | Returns the list of all acts and states which is used by consistency checking algorithm to traverse the links in a specific sequence | method | |
| takesToPrevState | Confirms if a given act will take workflow to previous state | method | |

SyntaxError

This class contains the full description of error detected by script parser and provides methods to form the error message string.

| | Description | Type | Size |
|---|---|---|---|
| Attribute | | | |
| Location | The character column where error is detected | int | 2 |
| LineNum | The line number where error is detected | int | 2 |
| ScriptText | Text of the script which was having error | string | |
| LastToken | Text of the last token detected by lexical analyzer | string | |
| ErrMsgId | Resource id of the error message string | unsigned | 2 |
| Description | Description of the error message | string | |
| Main Methods | | | |
| getDescription | Returns the description of the error message | method | |
| display | Displays the error message in the current window | method | |

StateTransition

This class contains the details of all possible transitions of states in a workflow. It has details whether a particular transition is automatic, manual or it is because of some map links or user script. The information is collected for a workflow while doing the consistency checking and at the end all the transitions are analyzed to check the possibility of deadlocks or conflicts in the specification of the map.

| | Description | Type | Size |
|---|---|---|---|
| Attribute | | | |
| WfType | Request or Offer type of workflow | unsigned | 2 |
| pTransTypes | Array of records containing details of state transitions | tTransDetail | |
| pActToAct-Transitions | pointer to a static list of all possible transitions | | |
| Main Methods | | | |
| checkConsistency | Checks if there is any possible deadlocks or if there is a conflict between two specifications of the same transition | method | |
| getReachable-States | Gets all states which can be reached in a workflow | method | |

Script

This class provides method to validate the text of script. It uses yacc and lex to parse the text of script.

| Main Method | Description | Type | Size |
|---|---|---|---|
| Validate | Parses the script to find out if there is any error. It also tokenizes the script while generating the application. | method | |

The attributes of the model classes described above are the only attributes saved when a map of a business process is stored.

Figure 4:
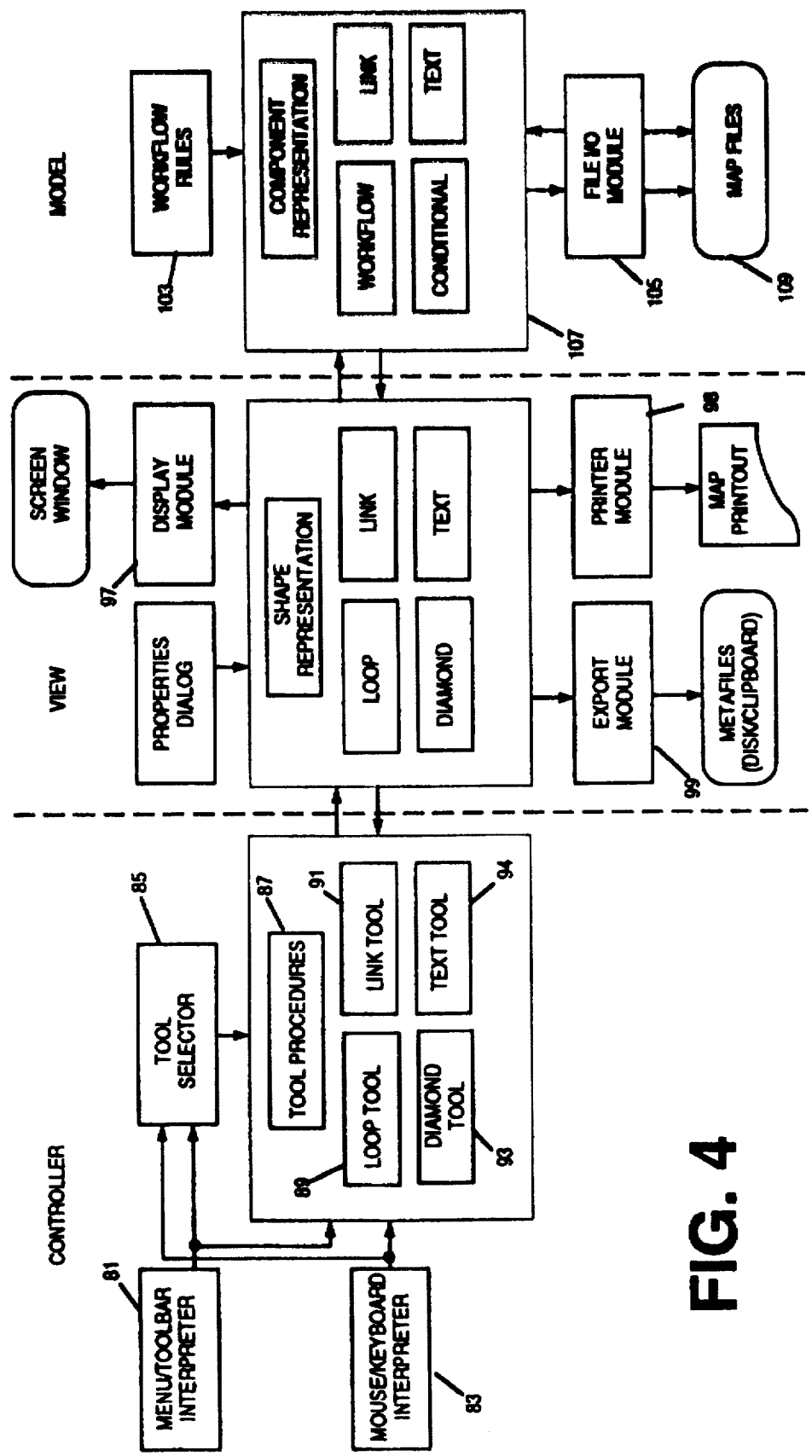
FIG. 4 is a block diagram showing the various functional components of the invented system when implemented as a software system.

The model classes are represented in FIG. 4 within block 107. The Model also utilizes a set of MAP rules as described above.

A software implementation of the MAP rules and model classes would be well within the ability of persons skilled in the field of the invention in view of the foregoing description.

An I/O module 105 stores the model classes in map files 109 in a storage medium which is typically a high capacity, non-volatile storage device such as a hard disk. The details for implementing I/O module should be readily apparent to persons skilled in the art.

The View Classes and View Class Attributes

The View classes implement the user interface components required to draw the model classes on a display. Each class derived from the WfComponent model class is drawn by a class derived from the MapShape class. The View Classes and their attributes are described in copending application Ser. No. 08/005,236 filed Jan. 15, 1993.

Relationships between Model and View Classes

Each MDI window is implemented by a MapView object. A MapView object uses the MapShapes defined above to draw various shapes in the window. The application details for each shape are stored in a corresponding model class. For example, each MapView object has a WfBusProcess object as an attribute. The WfBusProcess object has an ordered collection of objects derived from the WfComponent class.

For all shapes that need to be painted or repainted, the MapView calls the appropriate paint method for the shape class. The shape class gets elements from the WfComponent derived class that conforms to the shape. For example, if MapShape retrieves a WfWorkflow object from the WfBusProcess object, then the MapView object will draw a MapLoop on the display.

The splitting of the logical attributes from the graphical attributes of a workflow component enables the workflow component to be drawn on any display which implements a set of MapShapes. Both the MapPrinter and MapMetafile classes may implement different logic from the MapView to draw the loops and links.

The Controller Classes and Controller Class Attributes

The Controller division utilizes a menu/tool bar interpreter 81, a mouse/keyboard interpreter 83, a tool selector 85 and a set of tool procedures 87 for the loop tool 89, link tool 91, diamond tool 93 and text tool 94. The implementation details for each of the foregoing elements of the controller division in terms of its classes and their attributes are set forth in co-pending application Ser. No. 08/005,236 filed Jan. 15, 1993.

External Definitions API

The Application Builder generation process is intended to produce a database definition utilizing a visual representation of a map. This database definition is a set of entries in a database that properly describes the business process definition, workflow contents and properties, workflow interaction (links), application data, form field definitions, workflow scripts, follow-up information and additional attributes.

The definitions API is the interface that allows the Application Builder to define such schema. The following is a description that can be used to implement the definitions API.

AWD_BeginBPDefinition

Description

This call creams a new Business Process record. The Business Process name is specified as a parameter. The Business Process name should be unique. If a Business Process with the same name is present, the current definition is overwritten as a new version. This takes place only if there are no active instances of the current business processes definition. However, if instances for current definition exists, then both versions of definitions co-exist in the database. All new instantiations will be from the latest version of BP definition. The version number is maintained internally by the Server.

The AWD_BeginBPDefinition should be the first call when defining a business process and no other AWD_BeginBPDefinition call should be in progress. Every AWD_BeginBPDefinition has to be closed by a AWD_EndBPDefinition call. The AWD_EndBPDefinition should be the last call and ends the definition of a business process.

AWD_BeginBPDefinition sets up a context for the business process and all subsequent calls require this context. The AWD_EndBPDefinition closes this context.

Syntax

VOID FAR PASCAL AWD_BeginBPDefinition (STRING szBPName, IDENT IBP Admin, IDENT IInitiatorOrgRoleID, LPERRCODE lpError)

Input Parameters

| Name | Type | Description |
| --- | --- | --- |
| szBPName | STRING | The Business Process name. This name should be unique. If a business process with the same name is present, the current definition is overwritten as a new version. There should be no active instances of the current definition for this to occur. If however some instances are present, then both versions of definition co-exist in the database. The maintenance of versions of definitions is internally handled by the server. Older versions of BP definition could be deleted from the database using SAF. |
| IBPAdmin | IDENT | The Identity of the person creating this business process. The Identity should have the rights to create business processes. |
| IInitiatorOrgRoleID | IDENT | ID of the organization role who can initiate the business process. |

Output Parameters

| Name | Type | Description |
| --- | --- | --- |
| lpError | LPERRCODE | Error code returned. |

Return Value
None.

AWD_EndBPDefinition

Description

Close the currently open business process. A call to AWD_EndBPDefinition should be preceded by a call to AWD_BeginBPDefinition.

The AWD_EndBPDefinition should be the last call when defining a business process. Every AWD_BeginBPDefinition has to be closed by a AWD_EndBPDefinition. The AWD_EndBPDefinition should be the last call and ends the definition of a business process. The AWD_EndBPDefinition closes the context set up by AWD_BeginBPDefinition.

Note: AWD_EndBPDefinition should be called only after a AWD_EndWFDefinition call has been made.

Syntax

VOID FAR PASCAL AWD_EndBPDefinition (LPERRCODE lpError)

Output Parameters

| Name | Type | Description |
| --- | --- | --- |
| lpError | LPERRCODE | Error code returned. |

Return Value
None.

AWD_DeleteBPDefinition

Description

Deletes a Business Process. The delete is successful only if the Business Process has no active instances in the transactions database. This function is used to remove business processes no longer in use. This function can be called only if the business process is not active.

Syntax

VOID FAR PASCAL AWD_DeleteBPDefinition (STRING szBPName, IDENT IBPAdmin, LPERRCODE lpError)

Input Parameters

| Name | Type | Description |
| --- | --- | --- |
| szBPName | STRING | The name of the business process to delete. There should be no active instances for this BPName. |
| IBPAdmin | IDENT | The Identity of the person deleting this business process. The Identity should have the rights to delete this business processes. |

Output Parameters

| Name | Type | Description |
| --- | --- | --- |
| lpError | LPERRCODE | Error code returned. |

Return Value
None.

AWD_DefineBPAppFields

Description

Define the list of application data fields associated with the business process. The field name, type, size, attributes and initial value, if any, are specified. The field names must be unique at a Business Process level.

Syntax

VOID FAR PASCAL AWD_DefineBPAppFields(INT iCount, LPAPPDATAINFO lpBDFieldStructPtr, LPERRCODE lpError)

Input Parameters

| Name | Type | Description |
| --- | --- | --- |
| iCount | INT | The number of fields to attach with the business process. |

-continued

| Name | Type | Description |
|---|---|---|
| lpBDFieldStructPtr | LPAPPDATAINFO | A pointer to an array of APPDATAINFO structures containing field name, type, size, attributes and initial value, if any. |

Output Parameters

| Name | Type | Description |
|---|---|---|
| lpError | LPERRCODE | Error code returned. |

APPDATAINFO

| Name | Type | Description |
|---|---|---|
| szFieldName | String | Name of the application data |
| szValue | String | Initial value of the application data |
| AppDataType | APPDATATYPE | Type of the application data |
| iSize | INT | Maximum size of the application data |
| AppDataAttribute | APPDATAATTRIBUTE | Default attribute of the application data |

APPDATATYPE

Following are the types of application data type:

ADT_TEXT

ADT_NUMERIC

ADT_DATE

APPDATAATTRIBUTE

Following are the types of attribute an application data can have:

ADATTR_READONLY

ADATTR_HIDDEN

ADATTR_MUSTFILL

ADATTR_EDITABLE

Return Value

None.

AWD_BeginWFDefinition

Description

Creates a new workflow in a Business Process. The workflow name is specified as a parameter. The workflow name should be unique. If a workflow with the same name is present, then the context for this workflow is used.

The AWD_BeginWFDefinition should be the first call when deeming a workflow and no other AWD_BeginWFDefinition call should be in progress. Every AWD_BeginWFDefinition has to be closed by a AWD_EndWFDefinition call.

AWD_BeginWFDefinition sets up a context for the workflow and all subsequent workflow calls require this context. The AWD_EndWFDefinition closes this context.

Syntax

VOID FAR PASCAL AWD_BeginWFDefinition (STRING szWFName, STRING szShortWFName, LPERRCODE lpError)

Input Parameters

| Name | Type | Description |
|---|---|---|
| szWFName | STRING | The workflow name. This name should be unique. |
| szShortWFName | STRING | A short name for the workflow. This name should also be unique. |

Output Parameters

| Name | Type | Description |
|---|---|---|
| lpError | LPERRCODE | Error code returned. |

Return Value

None.

AWD_EndWFDefinition

Description

Close the currently open workflow. A call to AWD_EndWFDefinition should be preceded by a call to AWD_BeginWFDefinition.

The AWD_EndWFDefinition should be the last call when defining a workflow. Every AWD_BeginWFDefinition has to be closed by a AWD_EndWFDefinition call. The AWD_EndWFDefinition should be the last call and ends the definition of a workflow. The AWD_EndWFDefinition closes the context set up by AWD_BeginWFDefinition.

Syntax

VOID FAR PASCAL AWD_EndWFDefinition (LPERRCODE lpError)

Output Parameters

| Name | Type | Description |
|---|---|---|
| lpError | LPERRCODE | Error code returned. |

Return Value

None.

AWD_SetWFParameters

Description

Specify workflow information. The workflow type, the organization role for the customer and performer. This call must be made only after AWD_BeginWFDefinition is called.

Syntax

VOID FAR PASCAL AWD_SetWFParameters (WFTYPE WFType, WFCATEGORY WFCategory, BOOL bCentralWF, IDENT lCustomer, IDENT lPerformer, LPERRCODE lpError)

Input Parameters

| Name | Type | Description |
|---|---|---|
| WFType | WFTYPE | This specifies the type of workflow, i.e., Request or Offer. |
| WFCategory | WFCATEGORY | This specified whether it is a group workflow, primary workflow, ad-hoc workflow, or a normal workflow. |
| bCentralWF | BOOL | Flag to indicate if this workflow is the central workflow of the Business Process. This flag is TRUE if it is the central workflow, FALSE otherwise. |
| lCustomer | ORGROLEID | The Organization Role of the Customer. |
| lPerformer | ORGROLEID | The Organization Role of the Per- |

51
-continued

| Name | Type | Description |
|------|------|-------------|
|  |  | former. |

Output Parameters

| Name | Type | Description |
|------|------|-------------|
| lpError | LPERRCODE | Error code returned value |

WFTYPE

There are two types of workflow

WFTYPE_REQUEST
WFTYPE_OFFER

WFCATEGORY

Following are the categories of workflows:

WFCATEGORY_STANDARD
WFCATEGORY_PRIMARY
WFCATEGORY_ADHOC
WFCATEGORY_GROUP

Return Value

None.

AWD_SetWFCycleTime

Description

Set the various cycle times associated with the workflow. Depending on the workflow type—Request or Offer, the response time for each act of the workflow may be specified. The table below enumerates the various times that can be stored.

Read table below as

<OrgRole1> must <Action1> [after <OrgRole2><Action2>]within time <time>

For Request type workflow

| OrgRole1 | Action1 | OrgRole2 | Action2 | Time |
|----------|---------|----------|---------|------|
| Customer | Request |  |  | time 1 |
| Performer | Respond | Customer | Request | time 2 |
| Performer | Complete | Customer | Request | time 3 |
| Customer | Respond | Performer | Reports completion | time 4 |

For Offer type workflow

| OrgRole1 | Action1 | OrgRole2 | Action2 | Time |
|----------|---------|----------|---------|------|
| Performer | Offer |  |  | time 1 |
| Customer | Respond | Performer | Offer | time 2 |
| Performer | Complete | Performer | Offer | time 3 |
| Customer | Respond | Performer | Reports completion | time 4 |

Note: The call must be made only after function AWD_SetWFParameters is called.

52

Syntax

VOID FAR PASCAL AWD_SETCYCLETIME (LPAWTIME lpArrayCycleTime, LPERRCODE lpError)

Input Parameters

| Name | Type | Description |
|------|------|-------------|
| lpArrayCycleTime | LPAWTIME | Pointer to an array of AWTIME time offsets. Depending on the workflow type the array elements refer to different times are listed in the tables above. |

Output Parameters

| Name | Type | Description |
|------|------|-------------|
| lpError | LPERRCODE | Error code returned value |

AWTIME

| Name | Type | Description |
|------|------|-------------|
| iYear | INT | Year of the time (NOT USED) |
| iMonth | INT | Month of the time (NOT USED) |
| iDay | INT | Day of the month or number of days. |
| iHour | INT | Hour of the day or number of hours. |
| iMinute | INT | Number of minutes. |
| iSecond | INT | Number of seconds. |
| TimeType | TIMETYPE | TIMETYPE_ABSOLUTE or TIMETYPE_OFFSET (Must be TIMETYPE_OFFSET for this function.) |

Return Value
None.

AWD_DisableWFAct

Description

Disable a set of workflow acts for a specific workflow role. By default all acts are enabled for a workflow. This call facilitates disabling specific acts. This call must be made only after a call to AWD_BeginWFDefinition.

Syntax

VOID FAR PASCAL AWD_DisableWFAct(WFROLE WFRole, INT iCount, LPACT lpAct, LPERRCODE lpError)

Input Parameters

| Name | Type | Description |
|------|------|-------------|
| WFRole | WFROLE | The Workflow Role for which the acts are to be disabled. |
| iCount | INT | The number of acts to disable. |
| lpAct | LPACT | A pointer to an array of IDs which is the list of acts to disable. The number of acts is specified by parameter nCount |

Output Parameters

| Name | Type | Description |
|------|------|-------------|
| lpError | LPERRCODE | Error code returned value |

WFROLE

Following are the possible values of WFROLE type of parameters

WFROLE_CUSTOMER
WFROLE_PERFORMER

WFROLE_OBSERVER
WFROLE_SYSTEM

Return Value

None.

AWD_StoreActUserDefinedName

Description

Set the user-defined description for the workflow Acts. The list of acts and the equivalent user-defined names are provided. This call must be made only after a call to AWD_BeginWFDefinition.

Syntax

VOID FAR PASCAL AWD_StoreActUserDefinedName (INT iCount, LPACTINFO ActPtr, LPERRCODE lpError)

Input Parameters

| Name | Type | Description |
| --- | --- | --- |
| iCount | INT | The number of acts for which the user-defined name has been provided. |
| ActPtr | LPACTINFO | A pointer to an array of ACTINFO structures which contains the list of acts, i.e., Act Names and user-defined Names for the acts. |

Output Parameters

| Name | Type | Description |
| --- | --- | --- |
| lpError | LPERRCODE | Error code returned value |

ACTINFO

| Name | Type | Description |
| --- | --- | --- |
| ActId | ACT | ID of the act |
| szActName | STRING | Name of the act |

Return Value

None.

AWD_StoreStateUserDefinedName

Description

Set the User-defined description for the workflow States. The list of states and the equivalent user-defined names are provided. This call must be made only after a call to AWD_BeginWFDefinition.

Syntax

VOID FAR PASCAL AWD_StoreStateUserDefinedName(INT iCount, LPSTATEINFO lpStatePtr, LPERRCODE lpError)

Input Parameters

| Name | Type | Description |
| --- | --- | --- |
| iCount | INT | The number of states for which the user-defined name has been provided. |
| lpStatePtr | LPSTATEINFO | A pointer to an array of STATEINFO structures which contains the list of states, i.e., State Names and user-defined names for the states. |

Output Parameters

| Name | Type | Description |
| --- | --- | --- |
| lpError | LPERRCODE | Error code returned value |

STATEINFO

| Name | Type | Description |
| --- | --- | --- |
| StateId | STATE | ID of the state |
| szStateName | STRING | Name of the state |

Return Value

None.

AWD_StoreActScript

Description

Set the workflow script for an Act. The act and the script text are the parameters to this function. This call must be made only after a call to AWD_BeginWFDefinition.

Syntax

VOID FAR PASCAL AWD_StoreActScript(ACT ActId, LPMEM lpScript, SCRIPTTYPE ScriptType, LPINT lpiMemBlockSize, INT iPositionNotify, LPERRCODE lpError)

Input Parameters

| Name | Type | Description |
| --- | --- | --- |
| ActId | ACT | The type of act, e.g., Request, Agree, etc. |
| lpScript | LPMEM | The workflow script associated with the act. The script is executed when the corresponding act in the workflow is executed. |
| ScriptType | SCRIPTTYPE | ScriptType is a flag which indicates the type of script. |
| lpiMemBlockSize | LPINT | Size of the memory block in bytes. |
| iPositionNotify | INT | This variable identifies the first script buffer, subsequent buffers and the last one. It should be set to 0 to identify first map buffer, 1 to identify subsequent map buffers. |

Output Parameters

| Name | Type | Description |
| --- | --- | --- |
| lpError | LPERRCODE | Error code returned value |

SCRIPTTYPE

Following are the types of script:
SCRIPTTYPE_USER
SCRIPTTYPE_USERSYST
SCRIPTTYPE_SYST
SCRIPTTYPE_NOTIFY Return Value None.

AWD_StoreStateScript

Description

Set the workflow script for a State. The state and the script text are the parameters to this function. This call must be made only after a call to AWD_BeginWFDefinition.

Syntax

VOID FAR PASCAL AWD_StoreStateScript(STATE StateId, LPMEM lpScript, SCRIPTTYPE ScriptType, LPINT\lpiMemBlockSize, INT iPositionNotify, LPERRORCODE lpError)

Input Parameters

| Name | Type | Description |
|---|---|---|
| StateId | STATE | The type of state, e.g., Initiate, Negotiation, Completing, Satisfied, etc. |
| lpScript | LPMEM | The workflow script associated with the state. The script is executed when the workflow transits to the specified state. |
| ScriptType | SCRIPTTYPE | ScriptType is a flag which indicates the type of script. |
| lpiMemBlockSize | LPINT | Size of the memory block in bytes. |
| iPositionNotify | INT | This variable identifies the first script buffer, subsequent buffers and the last one. It should be set to 0 to identify first map buffer, 1 to identify subsequent map buffers. |

Output Parameters

| Name | Type | Description |
|---|---|---|
| lpError | LPERRCODE | Error code returned value |

SCRIPTTYPE

Following are the types of script:

SCRIPTTYPE_USER
SCRIPTTYPE_USERSYST
SCRIPTTYPE_SYST
SCRIPTTYPE_NOTIFY

Return Value

None.

AWD_DefineWFAppFields

Description

Define the list of application data fields associated with the workflow. The field name, type, size, default attributes and initial value, if any, are specified.

Syntax

VOID FAR PASCAL AWD_DefineWFAppFields(INT iFields, LPAPPDATAINFO lpBDFieldStruct, LPERRCODE lpError)

Input Parameters

| Name | Type | Description |
|---|---|---|
| iFields | INT | The number of fields to attach with the workflow. |
| lpBDFieldStruct | LPAPPDATAINFO | A pointer to an array of APPDATAINFO structures containing field name, type, size, default attributes and initial value, if any. |

Output Parameters

| Name | Type | Description |
|---|---|---|
| lpError | LPERRCODE | Error code returned value |

APPDATAINFO

| Name | Type | Description |
|---|---|---|
| szFieldName | STRING | Name of the application data |
| szValue | STRING | Initial value of the application data |
| AppDataType | APPDATATYPE | Type of the application data |
| iSize | INT | Maximum size of the application data |
| AppDataAttribute | APPDATAATTRIBUTE | Default attribute of the application data |

APPDATATYPE

Following are the types of application data type:

ADT_TEXT
ADT_NUMERIC
ADT_DATE

Return Value

None.

AWD_SetDisplayType

Description

Define the field attributes of application data fields associated with the workflow. The field attributes, Read-only, Editable, Hidden and MustFill, may be specified for each Act and/or State for a specific workflow role. A call to AWD_SetDisplayType can be made only after a calling AWD_SetWFBoundDataFields.

Syntax

VOID FAR PASCAL AWD_SetDisplayType(WFROLE WFRole, ACTSTATETYPE ASTIndicator, ACTSTATEID ActOrStateId, INT iFields, LPWFDISPLAYINFO lpWFDisplayInfo, LPERRCODE lpError)

Input Parameters

| Name | Type | Description |
|---|---|---|
| WFRole | WFROLE | Whether the field is accessible to Customer, Performer or Observers. |
| ASTIndicator | ACTSTATETYPE | Flag whether the display type for act or state |
| ActOrStateId | ACTSTATEID | ID of the act or state for which the display type is specified. |
| iFields | INT | The number of fields to attach with the workflow. |
| lpWFDisplayInfo | LPWPDISPLAYINFO | A pointer to an array of WFDISPLAYINFO structures containing field name and attribute. The attributes are: Read-only, Editable, Hidden and MustFill. |

Output Parameters

| Name | Type | Description |
|---|---|---|
| lpError | LPERRCODE | Error code returned value |

WFDISPLAYINFO

| Name | Type | Description |
|---|---|---|
| szWFName | STRING | Name of the workflow for which this display type is specified. |

| Name | Type | Description |
|---|---|---|
| szFieldName | STRING | Name of the application data for which display type is specified. |
| AppDataAttribute | APPDATAATRIBUTE | Attribute for the application data |

APPDATAATTRIBUTE

Following are the types of attribute an application data can have:

ADATTR_READONLY
ADATTR_HIDDEN
ADATTR_MUSTFILL
ADATTR_EDITABLE

Return Value

None.

AWD_SetFormInfo

Description

Specify workflow form names for Customer, Performer and Observer.

Syntax

VOID FAR PASCAL AWD_SetFormInfo(STRING szCusForm, STRING szPerForm, STRING szObsForm, STRING szInitForm, LPERRCODE lpError)

Input Parameters

| Name | Type | Description |
|---|---|---|
| szCusForm | STRING | Form name for Customer of workflow |
| szPerForm | STRING | Form name for Performer of workflow |
| szObsForm | STRING | Form name for Observer of workflow |
| szInitForm | STRING | Init form name of the workflow |

Output Parameters

| Name | Type | Description |
|---|---|---|
| lpError | LPERRCODE | Error code returned value |

Return Value

None.

AWD_SetFollowupInfo

Description

Set up follow-up information associated with the workflow. The follow-up time offsets for Completion, Reply and Reminder are specified.

A follow-up is sent after the Completion is past due. It is sent at the specified time interval after it is past due. If the recurring flag for Completion is set, then till Completion, follow-up messages are sent at every time interval specified. The maximum number of times a follow-up notification is sent could be set using this call.

A follow-up is sent after the Reply is past due. It is sent at the specified time interval after it is past due. If the recurring flag for Reply is set, then till Reply has been sent, follow-up messages are sent at every time interval specified. The maximum number of times a follow-up notification is sent could be set using this call.

A reminder may be sent before Completion or Reply is due. The reminder is sent at a time interval specified before the event is due. Reminders may be disabled. A reminder is sent only once.

Syntax

VOID FAR PASCAL AWD_SetFollowupInfo(BOOL bPCFollowUpFlag, AWTIME PCompOffset, FOLLOWUPRECURRENCE PCompletionRecur, INT iPCompletionCounter, BOOL bPRFollowUpFlag, AWTIME PReplyOffset, FOLLOWUPRECURRENCE bReplyRecur, INT iReplyCounter, BOOL bCRFollowUpFlag, AWTIME CReplyOffset, FOLLOWUPRECURRENCE CReplyRecur, INT iCReplyCounter, AWTIME RemindOffset, BOOL bRemindFlag, BOOL bActNotifyFlag, LPERRCODE lpError)

Input Parameters

| Name | Type | Description |
|---|---|---|
| bPCFollowUpFlag | BOOL | Performer completion follow-up flag. |
| PCompOffset | AWTIME | A follow-up message is sent at an interval, specified by PCompOffset, after performer completion is past due. |
| bPCFollowUpRecur | FOLLOWUPRECURRENCE | If set, recurring notifications are sent at every PCompOffset interval as many as iPCompletionCounter times. |
| iPCompletionCounter | INT | Number of times the follow-up notifications should be sent after performer completion is past due. If this parameter is not specified, and bPCFollowupFlag is set, then notifications are sent till performer completes. |
| bPRFollowUpFlag | BOOL | Performer response follow-up flag |
| PReplyOffset | AWTIME | A follow-up message is sent at an interval, specified by this parameter after Performer reply is past due. |
| PReplyRecur | FOLLOWUPRECURRENCE | If set, recurring notifications are sent at every PReplyOffset interval as many as iPReplyCounter times. If bPRFollowUpFlag is set TRUE and iPReplyCounter is not specified, then follow-up messages are sent until performer replies. |

-continued

| Name | Type | Description |
|---|---|---|
| ipReplyCounter | INT | Number of times the follow-up notifications should be sent after performer Completion is past due. If this parameter is not specified, and bPRFollowUpFlag is set, then notifications are sent till performer completes. |
| bCRFollowUpFlag | BOOL | Customer response follow-up flag |
| CReplyOffset | AWTIME | A follow-up message is sent at an interval, specified by this parameter after customer reply is past due. |
| bCReplyRecur | FOLLOWUPRECURRENCE | If set, recurring notifications are sent at every CReplyOffset interval as many as iCReplyCounter times. |
| iCReplyCounter | INT | Number of times the follow-up notifications should be sent after Customer Completion is past due. If this parameter is not specified, and bCRFollowUpFlag is set, then notifications are sent till customer replies. |
| RemindOffset | AWTIME | A reminder is sent at an interval RemindOffset before Completion or Reply is due. |
| bRemindFlag | BOOL | If this flag is enabled, reminders are sent. If disabled, no reminders are sent. |
| bActNotifyFlag | BOOL | Indicates notification status. If set to TRUE, notification is enabled else if set to FALSE, it is disabled. |

Output Parameters

| Name | Type | Description |
|---|---|---|
| lpError | LPERRCODE | Error code returned value |

AWTIME

| Name | Type | Description |
|---|---|---|
| iYear | INT | Year of the time (NOT USED) |
| iMonth | INT | Month of the time (NOT USED) |
| iDay | INT | Day of the month or number of days |
| iHour | INT | Hour of the day or number of hours |
| iMinute | INT | Number of minutes |
| iSecond | INT | Number of seconds |
| TimeType | TIMETYPE | TIMETYPE_ABSOLUTE or TIMETYPE_OFFSET (Must be TIMETYPE_OFFSET for this function) |

FOLLOWUPRECURRENCE
Following are the type of recurrence for the follow-up event:
FUP_RECUR_NULL
FUP_RECUR_HOURLY
FUP_RECUR_DAILY
FUP_RECUR_WEEKLY
FUP_RECUR_MONTHLY
Return Value
None.
AWD_SetLinkInfo
Description
Specify a incoming link to a workflow. For each link, the source workflow name, triggering and triggered information is provided. Triggering information constitutes whether the link is anchored at an act or state and the act/state name. Triggered information constitutes whether the link terminates at an act or state and the act/state name.

Note: AWD_SetLinkInfo must be called only after all workflows have been created using AWD_BeginBPDefinition.
Syntax
VOID FAR PASCAL AWD_SetLinkInfo(STRING szFWFName, ACTSTATETYPE FASTIndicator, ACTSTATEID FActState, STRING szTWFName, ACTSTATETYPE TASTIndicator, ACTSTATEID TActState, LPERRCODE lpError)
Input Parameters

| Name | Type | Description |
|---|---|---|
| szFWFName | STRING | The source or "from" workflow name. The name of the workflow where a link is anchored. |
| FASTIndicator | ACTSTATETYPE | Flag to indicate if it is an Act or State link at source. |
| FActState | ACTSTATEID | The act or state from where the link starts. |
| szTWFName | STRING | The destination or "to" workflow name. The name of the workflow to which the link is targeted. |
| TASTIndicator | ACTSTATETYPE | Flag to indicate if it is an Act or State link at destination. |
| TActState | ACTSTATE | The act or state where the link ends. |

Output Parameters

| Name | Type | Description |
|---|---|---|
| lpError | LPERRCODE | Error code returned value |

Return Value
None.
AWD_StoreMap
Description

Associates a map file with the specified Business Process. The map file is inserted as a series of memory blocks. This function requires the business process context to be setup before execution.

Syntax

VOID FAR PASCAL AWD_StoreMap (LPMEM lpMapMemPtr, LPINT lpiMemBlockSize, INT iPositionNotify, LPERRCODE lpError)

Input Parameters

| Name | Type | Description |
| --- | --- | --- |
| lpMapMemPtr | LPMEM | Pointer to a memory block containing map. |
| lpiMemBlockSize | LPINT | Size of the memory block in bytes. |
| iPositionNotify | INT | This variable identifies the first map buffer, subsequent map buffers and the last one. It should be set to 0 to identify first map buffer, 1 to identify subsequent map buffers. |

Output Parameters

| Name | Type | Description |
| --- | --- | --- |
| lpError | LPERRCODE | Error code returned value |

Return Value

None.

AWD_GetMap

Description

Get the map file associated with the specified Business Process. The map file is returned as a series of memory blocks. The memory block pointer and the block size allocated is passed to this function and the number of bytes actually written in the memory block is returned. Initially, the caller must pass a zero in the lpOffset variable to indicate start of the block transfers. The caller will be notified with a negative value in the lpOffset variable to indicate end of the block transfers.

Syntax

VOID FAR PASCAL AWD_GetMap (STRING szBPName, LPMEM lpMapMemPtr, LPINT lpiMemBlockSize, LPLONG lpOffset, LPERRCODE lpError)

Input Parameters

| Name | Type | Description |
| --- | --- | --- |
| szBPName | STRING | Business Process Name with which to associate the map. |
| lpMapMemPtr | LPMEM | Pointer to a memory block where map can be returned. |
| lpiMemBlockSize | LPINT | Size of the memory block in bytes. |
| lpOffset | LPLONG | Initially, the caller must set this to zero. |

Output Parameters

| Name | Type | Description |
| --- | --- | --- |
| lpOffset | LPLONG | Each block transfer changes the value contained in this variable and the caller can only check the value returned here. This will be negative if end is reached. |
| lpError | LPERRCODE | Error code returned value |

Return Value

None.

AWD_AssignToRoleInBP

Description

Sets the Organization Role to Identity mapping at the Business Process level.

Syntax void FAR PASCAL AWD_AssignToRoleInBP (IDENT lIdentity, IDENT lOrgRoleId, LPERRCODE lpError)

Input Parameters

| Name | Type | Description |
| --- | --- | --- |
| lIdentity | IDENT | Organization Role id. |
| lOrgRoleId | IDENT | Identity Id to be mapped with OrgRole |

Output Parameters

| Name | Type | Description |
| --- | --- | --- |
| lpError | LPERRCODE | Error code returned value |

Return Value

None.

AWD_AssignToRoleInWF

Description

Sets the Organization Role to Identity mapping at the Workflow level.

Syntax void FAR PASCAL AWD_AssignToRoleInWF (IDENT lIdentity, IDENT lOrgRoleId, WFROLE WFRole, LPERRCODE lpError)

Input Parameters

| Name | Type | Description |
| --- | --- | --- |
| lIdentity | IDENT | Identity Id to be mapped with OrgRole. |
| lOrgRoleId | IDENT | Organization Role id. |
| WFRole | WFROLE | Workflow role of the identity. |

Output Parameters

| Name | Type | Description |
| --- | --- | --- |
| lpError | LPERRCODE | Error code returned value |

Return Value

None.

AWD_GetBPVersion

Description

Get the current BP Version for the specified BP name. The function returns the Business Process Version.

Syntax

VOID FAR PASCAL AWD_GetBPVersion (IDENT lIdentity, STRING szBPName, LPINT lpiVersion, LPERRCODE lpError)

Input Parameters

| Name | Type | Description |
| --- | --- | --- |
| lIdentity | IDENT | Identity Id to be mapped with OrgRole. |
| szBPName | STRING | The name of the BP for which the version number is requested |

Output Parameters

| Name | Type | Description |
|---|---|---|
| lpiVersion | LPINT | Pointer to an integer which holds the version number of BP |
| lpError | LPERRCODE | Error code returned value |

Return Value
  None.

AWD_GetLastModifiedDate
Description
  This function returns the last modified date of the Business Process specified.
Syntax
  VOID FAR PASCAL AWD_GetLastModifiedDate (STRING szBPName, LPDATETIMET lpdtLastModified, LPERRCODE lpError)
Input Parameters

| Name | Type | Description |
|---|---|---|
| szBPName | STRING | The name of the BP for which the last modified date is requested |

Output Parameters

| Name | Type | Description |
|---|---|---|
| lpdtLastModified | LPDATETIMET | The pointer to the DATETIMET type which holds the last modified date of the Business Process. DATETIMET is a long integer value where the offset of the date from 1/1/90 is seconds is stored. |
| lpError | LPERRCODE | Error code returned value |

Return Value
  None.

AWD_SetNotificationStringInBP
Description
  The notification string for the event is set with respect to the current BP context.
Syntax
  void FAR PASCAL AWD_SetNotificationStringInBP (NOTIFICATIONTYPE NotificationEvent, STRING szNotificationString, LPERRCODE lpError)
Input Parameters

| Name | Type | Description |
|---|---|---|
| NotificationEvent | NOTIFICATIONTYPE | This parameter notifies the event |
| szNotificationString | STRING | The notification string. |

Output Parameters

| Name | Type | Description |
|---|---|---|
| lpError | LPERRCODE | Error code returned value |

NOTIFICATIONTYPE
  The following are the possible notification types:
  EVENT_PRPASTDUE
  EVENT_PCPASTDUE
  EVENT_PCDUE
  EVENT_CRPASTDUE
  EVENT_ACT
  EVENT_MAIL
Return Value
  None.

AWD_SetNotificationStringInWF
Description
  The notification string for the event is set with respect to the current workflow context.
Syntax
  void FAR PASCAL AWD_SetNotificationStringInWF (NOTIFICATIONTYPE NotificationEvent, STRING szNotificationString, LPERRCODE lpError)
Input Parameters

| Name | Type | Description |
|---|---|---|
| NotificationEvent | NOTIFICATIONTYPE | This parameter notifies the event |
| szNotificationString | STRING | The notification string. |

Output Parameters

| Name | Type | Description |
|---|---|---|
| lpError | LPERRCODE | Error code returned value |

NOTIFICATIONTYPE
  The following are the possible notification types:
  EVENT_PRPASTDUE
  EVENT_PCPASTDUE
  EVENT_PCDUE
  EVENT_CRPASTDUE
  EVENT_ACT
  EVENT_MAIL
Return Value
  None.

AWD_SetCOS
Description
  This function specifies COS associated with a Workflow of a Business Process. The COS is inserted as a series of memory blocks. This function requires the Business Process context and Workflow to be setup before execution.
Syntax
  VOID FAR PASCAL AWD_SetCOS (LPMEM lpCOS, LPINT lpiMemBlockSize, INT iPositionNotify, LPERRORCODE lpError)
Input Parameters

| Name | Type | Description |
|---|---|---|
| lpCOS | LPMEM | Pointer to a memory chunk which stores COS. |
| lpiMemBlockSize | LPINT | Memory allocated for storing COS in bytes. |
| iPositionNotify | INT | This variable identifies the first COS buffer, subsequent COS buffers and the last one. It should be set to 0 to identify first buffer, 1 to identify subsequent buffers. |

Output Parameters

| Name | Type | Description |
| --- | --- | --- |
| lpError | LPERRCODE | Error code returned value |

Return Value

None.

AWD_GetCOS

Description

The function gets the COS associated with the specified Workflow of a Business Process. The COS is returned as a series of memory blocks. The memory block pointer and the block size allocated is passed to this function and the number of bytes actually written in the memory block is returned. For the first call, the contents of the variable lpOffset must be set to zero (0). This indicates the start of the memory block transfers. The caller will be notified with a negative value in the lpOffset variable to indicate end of the block transfers.

Syntax

VOID FAR PASCAL AWD_GetCOS (STRING szBPName, STRING szWFName, LPMEM lpCOS, LPINT lpiMemBlockSize, LPLONG lpOffset, LPERRORCODE lpError)

Input Parameters

| Name | Type | Description |
| --- | --- | --- |
| szBPName | STRING | Business Process Name |
| szWFName | STRING | Workflow Name |
| lpCOS | LPMEM | Pointer to a memory chunk which stores COS. |
| lpiMemBlockSize | LPINT | Memory allocated for storing COS in bytes. |
| lpOffset | LPLONG | Initially, the caller must set this to zero. |

Output Parameters

| Name | Type | Description |
| --- | --- | --- |
| lpOffset | LPLONG | Each block transfer changes the value contained in this variable and the caller can only check the value returned here. This will be negative if end is reached. |
| lpError | LPERRCODE | Error code returned value |

Return Value

None.

AWD_AssignObsRoleInWF

Description

Sets the Observer Organization Role(s) at the Workflow level.

Syntax
VOID FAR PASCAL AWD_AssignObsRoleInWF (IDENT lOrgRoleId, LPERRCODE lpError)

Input Parameters

| Name | Type | Description |
| --- | --- | --- |
| lOrgRoleId | IDENT | Organization Role id. |

Output Parameters

| Name | Type | Description |
| --- | --- | --- |
| lpError | LPERRCODE | Error code returned value |

Return Value
None.

AWD_DeleteObsRoleInWF

Description

Deletes the Observer Organization Role(s) at the Workflow level.

Syntax

VOID FAR PASCAL AWD_DeleteObsRoleInWF (IDENT lOrgRoleId, LPERRCODE lpError)

Input Parameters

| Name | Type | Description |
| --- | --- | --- |
| lOrgRoleId | IDENT | Organization Role id. |

Output Parameters

| Name | Type | Description |
| --- | --- | --- |
| lpError | LPERRCODE | Error Code returned value |

Return Value
None.

AWD_GetBPList

Description

Returns the list of names of all business processes whose definition exist in the database.

Syntax

VOID FAR PASCAL AWD_GetBPList (LPINT lpiCount, BOOL bFileOrMemory, LPBPNAME lpBPNames, STRING szFileName, LPERRCODE lpError)

Input Parameters

| Name | Type | Description |
| --- | --- | --- |
| lpiCount | LPINT | Number of Business processes to get. |
| bFileOrMemory | BOOL | Whether the list is to be put in a file or in memory. |
| lpBPNames | LPBPNAME | If set to NULL, then lpiCount returns number of business processes. |

Output Parameters

| Name | Type | Description |
| --- | --- | --- |
| lpiCount | LPINT | Number of Business processes. |

| Name | Type | Description |
|---|---|---|
| lpBPNames | LPBPNAME | The list of names of all business processes. |
| lpError | LPERRCODE | Error code returned value |

Return Value
None.

AWD_StoreNotificationScript

Description

Stores the compiled script for a specific type notification in the definition database.

Syntax

VOID FAR PASCAL AWD_StoreNotificationScript (NOTIFICATIONTYPE NotificationType, LPMEM lpScript, LPINT lpiMemBlockSize, INT iPositionNotify, LPERRCODE lpError)

Input Parameters

| Name | Type | Description |
|---|---|---|
| NotificationType | NOTIFICATIONTYPE | Type of notification |
| lpScript | LPMEM | Compiled form of notification script |
| lpiMemBlockSize | LPINT | Size of this block of memory |
| iPositionNotify | INT | Whether this is the first, middle or last block. |

Output Parameters

| Name | Type | Description |
|---|---|---|
| lpError | LPERRCODE | Error code returned value |

Return Value
None.

AWD_GetConfigInfo

Description

This routine returns the details of workflow server's configuration such as blob file path, database polling interval, maximum number of business processes etc.

Syntax

VOID FAR PASCAL AWD_GetConfigInfo (LPCONFINFO lpConfigInfo, LPERRCODE lpError)

Output Parameters

| Name | Type | Description |
|---|---|---|
| lpConfigInfo | LPCONFINFO | Returns the configuration details in a CONFINFO structure. |
| lpError | LPERRCODE | Error code returned. |

CONFINFO

| Name | Type | Description |
|---|---|---|
| szLogFilePath | STRING | File path of Log file. |
| szLogFileName | STRING | File name of Log file. |
| iTMPollInterval | INT | Transaction Manager polling interval |
| TMOptions | INT | Transaction Manager options |
| iSCHPollInterval | INT | Scheduler polling interval |
| szBlobFilePath | STRING | File path for Blob file. |
| iMaxBPInst | INT | Maximum number of Business Process instances |

Return Value
None.

AWD_BeginTransaction

Description

This routine must be called before any modification to the database. After the call of this routine, several calls can be made which may modify the database records. At the end, AWD_EndTransaction can be Syntax VOID FAR PASCAL AWD_BeginTransaction (LPERRCODE lpError)

Output Parameters

| Name | Type | Description |
|---|---|---|
| lpError | LPERRCODE | Error code returned value |

Return Value
None.

AWD_EndTransaction

Description

This routine is used to end a series of database transactions.

Syntax

VOID FAR PASCAL AWD_EndTransaction (BOOL bCommitOrRollBack, LPERRCODE lpError)

Input Parameters

| Name | Type | Description |
|---|---|---|
| bCommitOrRollBack | BOOL | Whether all the changes done after the AWD_BeginTransaction call are to be retained in the database or not. |

Output Parameters

| Name | Type | Description |
|---|---|---|
| ipError | LPERRCODE | Error code returned value |

Return Value
None.

AWD_GetDraftBPDefId

Description

Returns the id of the business process definition in the database. This id is a unique number to identify a business process in the database.

Syntax

VOID FAR PASCAL AWD_GetDraftBPDefId (STRING szBPName, LPIDEN lpBPDefId, LPBOOL lpbDraftIsPresent, LPERRCODE lpError)

Input Parameters

| Name | Type | Description |
|---|---|---|
| szBPName | STRING | Business Process Name for which the definition id is required. |

Output Parameters

| Name | Type | Description |
|---|---|---|
| lpBPDefId | LPIDEN | The id of the business process returned to the caller. |
| lpbDraftIsPresent | LPBOOL | Returned value is TRUE if there is a draft definition present in the database. |
| lpError | LPERRCODE | Error code returned value |

Return Value
None.

AWD_GetWfDefId

Description

Returns the id of a workflow in the database. This id is a unique number to identify a workflow in the database.

Syntax

VOID FAR PASCAL AWD_GetWfDefId (STRING szWFName, LPIDEN lpWFDefId, LPERRCODE lpError)

Input Parameters

| Name | Type | Description |
|---|---|---|
| szWFName | STRING | Name of the workflow for which definition id is required |

Output Parameters

| Name | Type | Description |
|---|---|---|
| lpWfDefId | LPIDEN | The definition id of the workflow is returned through this parameter. |
| lpError | LPERRCODE | Error code returned value |

Return Value
None.

AWD_GetAppFieldId

Description

Returns the id of the specified application data in the database. This id is a unique number to identify an application data in the database.

Syntax

VOID FAR PASCAL AWD_GetAppFieldId (STRING szAppDataFieldName, LPIDEN lpAppFieldID, LPERRCODE lpError)

Input Parameters

| Name | Type | Description |
|---|---|---|
| szAppDataFieldName | STRING | Name of the application data whose id is required |

Output Parameters

| Name | Type | Description |
|---|---|---|
| lpAppFieldID | LPIDEN | The id of the specified application data is returned through this parameter. |
| lpError | LPERRCODE | Error code returned value |

Return Value
None.

AWD_strcmp

Description

This routine compares two strings. The functionality is similar to the standard C implementation of strcmp but with a difference. This routine does case sensitive or insensitive comparison based on the flag set in the aws.ini file.

Syntax

INT FAR PASCAL AWD_strcmp (LPSTR str1, LPSTR str2)

Parameters

| Name | Type | Description |
|---|---|---|
| str1 | LPSTR | pointer to the first string to be compared |
| str2 | LPSTR | pointer to the second string to be compared |

Return Value

0 If both the strings are same

Negative If str1 is less than the str2

Positive If the str1 is greater than the str2

AWD_strncmp

Description

This routine compares some specified number of initial characters of two strings. The functionality is similar to the standard C implementation of strncmp but with a difference. This routine does case sensitive or insensitive comparison based on the flag set in the aws.ini file.

Syntax

INT FAR PASCAL AWD_strncmp (LPSTR str1, LPSTR str2, INT n)

Parameters

| Name | Type | Description |
|---|---|---|
| str1 | LPSTR | pointer to the first string to be compared |
| str2 | LPSTR | pointer to the second string to be compared |
| n | INT | the maximum number of characters to be compared |

Return Value

| 0 | If the first n characters of both the strings are same |
| Negative | If the first n characters of str1 is less than the first n characters of str2 |
| Positive | If the first n characters of the str1 is greater than the first n characters of str2 |

Forms and Views API

The Application Builder takes a business process map definition and, after it is checked for consistency, the Application Builder produces an application definition (via the definitions API). To generate an application, the Application Builder produces a database description of the business process, which includes workflow descriptions and relations, business process parameters, follow up information, application data (along with its visibility and protection description), and workflow language scripts to drive the flow and actions as defined by the business process map.

A workflow-enabled application is usually composed of forms (a number of fields to be filled) and views (status reports and lists of system pending actions). The Application Builder generates a standard set of Forms and Views as part of the application generation process and thus provide the developer with a starting point for his/her application.

The following description outlines the mechanism through which the Application Builder produces such forms and views for the workflow enabled application.

Objective

The Application Builder allows the application designer to design forms and views to be used with the workflow enabled application. The application can be of many types like Notes, Visual Basic, and the like.

General Mechanism

The Forms Generation Package is a series of APIs with a standard name.

The Forms Generation Package responds to the Application Builder APIs and generates the forms needed to implement the whole set of data as defined by the user. This process involves creating one or more forms per workflow, depending on the flexibility and constraints of the Forms platform. The Forms Generation Package minimizes the number of generated forms from the data received from the Application Builder.

The Application Builder provides all the information available regarding form names, application data, and field attributes for different acts/states.

The Application Builder only accepts the input of the initial form name only for the primary workflow of a business process. In any other workflows there are only three form names: Customer, Performer and Observer. The user of the Application Builder should be able to specify the Form Field Attributes for the initial form in a way that is distinguished from any act/state.

When the user selects the Generate Application menu Item, the Application Builder checks if the specified Forms Generation Package library exists. If the library exists, the Application Builder calls the FVInitApplication routine in the library with some information about the business process and the database. The FVInitApplication routine returns a handle that the Application Builder uses in all the subsequent calls to the Form Generation Package's routines. This handle is used on the Application Builder side to identify the form generation instance, and it is not to be used to extract any information. The library uses this as a space to keep its state and various variables. After the successful completion of this process it proceeds to create the application definition in the database via the standard workflow definition APIs.

The FVInitApplication routine of the library may or may not implement some user interface to get the designer's choice on what (s)he wants. This is also the place when the library can initialize all fries of the application to be generated e.g., if the application is template based, then the base template fries should be copied to a selected directory and the customization points located.

After the successful return from the FVInitApplication, the Application Builder calls a set of routines to inform the library about application data of the business process and of all the workflows. This information can be used by the library to provide an additional user interface to design views which can refer to the application data, or simply to keep track of the data for the fields it will generate.

After that the FVCreateViews routine is called. This functionality allows the library to add fields to the views of the application, If desired, e.g. The user could be presented with the data sent on the previous calls and prompted to add those (s)he wants to view.

The Application Builder scans all the workflows and informs the library about the names of forms selected for each workflow, a workflow at a time. After that the Application Builder calls a routine for each field with all the details of the visibility of an application data for a given moment. All these calls are sorted with Roles as the primary key and Moments (Acts/States) as the secondary key. All the calls related to one role are bracketed by FVBeginRole and FVEndRole. Similarly all the calls of a moment are bracketed by FVBeginMoment and FVEndMoment. This is the moment in which the fields are added to the appropriate forms.

Application Builder's Calling Mechanism

After verifying that there is no information missing and the map is consistent, Application Builder will do the following steps:

1. After successful loading of library, call FVInitApplication routine so that designer can set some parameters for forms and views creation. The FVInitApplication routine returns a handle to its data.

2. Call FVBeginWorkflowData with a None parameter as a type to identify the start of the Business Process Dam.

3. For each data item of this business process, Call FVAppData with a null hWorkflow parameter 4. Call FVEndWorkflowData with the handle from step 2.

5. For each workflow in the map, Call FVBeginWorkflowData with the workflow type. For each data of this workflow. Call FVAppData with the hWorkflow from FVBeginWorkflowData above 6. Call FVEndWorkflowData 7. Call FVCreateViews.

8. For each workflow a) Call FVBeginWorkflow with Initial form name if the workflow is primary or NULL otherwise.

b) In case this is the primary workflow send all the default role assignments

Call FVBeginDefRoleTold

For every role mapping call FVDefRoleTold

Call FVEndDefRoleTold c) For Each Workflow Role (Customer/Performer/Observer)

Call FVBeginRole with role's form name

For Each Act/State

Call FVBeginMoment with role form name again (this could be used if a form per moment is desired).

For each Form Field Attribute call FVFieldAttribute

Call FVEndMoment

Call FVEndRole

Call FVEndWorkflow

9. If forms were successfully generated Call FVEndApplication.

10. If there was an error call FVGetErrorStr and FVAbortApplication.

Standard Set of API

The following are the routines the forms generation package should support.

1. FVInitApplication
2. FVGetErrorString
3. FVBeginWorkflowData
4. FVEndWorkflowData
5. FVBeginWorkflow
6. FVEndWorkflow 7. FVAppData
8. FVCreateViews
9. FVBeginRole
10. FVEndRole
11. FVBeginMoment
12. FVEndMoment
13. FVFieldAttrib
14. FVEndApplication
15. FVAbortApplication FVInitApplication Syntax:

int FVInitApplication(HWND hParentWindow, int iVersion,
    char far *pszBPName, char far *pszDBName,
    char far *pszUserName, char far *pszPassword,
    AppHandle far *hApp);

Input Parameters:

| | | |
|---|---|---|
| hParentWindow | HWND | handle of the parent window Library routine can use this to implement its own user interface, get options from the designer and remember the selected options for the final forms/views generation process. |
| iVersion | int | version number of the standard set of API |
| pszBPName | char far* | Null terminated name of the business process |
| pszDBName | char far* | Null terminated name of the database in which application is to be generated. |
| pszUserName | char far* | Null terminated name of the user who has logged in the database through Application Builder |
| pszPassword | char far* | Null terminated password which has been used by Application Builder to connect to the database. |

Output Parameters:

| | | |
|---|---|---|
| hApplication | AppHandle far* | A long id which builder can use in rest of the communication with the library. Should be null if not successful |

Return Value:

| | | |
|---|---|---|
| iErrorCode | int | 0 if successful. Builder can use GetErrorStr to get the detail description of error message. |

FVGetErrorStr

Syntax:

char far * FAR PASCAL FVGetErrorStr(AppHandle hApp, int iErrorCode);

Input Parameters:

| | | |
|---|---|---|
| hApp | AppHandle | A long id which identifies the application |
| iErrorCode | int | Error code returned by the library routine. |

Output Parameters

None

Return Value:

| | | |
|---|---|---|
| lpszErrorMsg | char far* | Null terminated error message. Should be set to null if library has already displayed error message to the user. |

FVBeginWorkflowData

Syntax:

int FAR PASCAL FVBeginWorkflowData(AppHandle hApp, char far *pWorkflowName, enum WfType eWfType, WorkflowHandle far *hWorkflowData);

Input Parameters:

| | | |
|---|---|---|
| hApp | AppHandle | A long id which identifies the application |
| pWorkflowName | char far* | Null terminated name of the workflow |
| eWfType | WfType | Type of workflow (Request, Offer, None) |

Output Parameters:

| | | |
|---|---|---|
| hWorkflowData | WorkflowHandle far* | A long id which identifies the workflow |

Return Value

| | | |
|---|---|---|
| iErrorCode | int | 0 if successful. Builder can use GetErrorStr to get the detail description of error message. |

FVEndWorkflowData

Syntax:

int FAR PASCAL FVEndWorkflowData (WorkflowHandle hWorkflowData);

Input Parameters;

| | | |
|---|---|---|
| hWorkflowData | WorkflowHandle | A long id which identifies the workflow |

Output Parameters:

None

Return Value

| | | |
|---|---|---|
| iErrorCode | int | 0 if successful. Builder can use GetErrorStr to get the detail description of error message. |

FVAppData

Syntax:

int FAR PASCAL FVAppData(AppHandle hApp, WorkflowHandle hWorkflowData, AppDataInfo far *pAppDataInfo);

Input Parameters:

| | | |
|---|---|---|
| hApp | AppHandle | A long id which identifies the application being generated. |

| | | |
|---|---|---|
| hWorkflowData | WorkflowHandle | A long id which identifies the workflow. If 0 this is an application data specification. |
| pAppDataInfo | AppDataInfo far* | pointer to a struct with full info about an application's data. |

Output Parameters

None

Return Value

| | | |
|---|---|---|
| iErrorCode | int | 0 if successful. Builder can use GetErrorStr to get the detail description of error message. |

FVCreateViews

Syntax:

int FAR PASCAL FVCreateViews(AppHandle hApp, ViewInfo far *pViewInfo);

Input parameters:

| | | |
|---|---|---|
| hApp | AppHandle | A long id which identifies the application |
| pViewInfo | ViewInfo far* | For future use |

Output Parameters

None

Return Value

| | | |
|---|---|---|
| iErrorCode | int | 0 if successful. Builder can use GetErrorStr to get the detail description of error message. |

FVBeginWorkflow

Syntax:

int FAR PASCAL FVBeginWorkflow(AppHandle hApp, char far *pWorkflowName, enum WfType eWfType, FormName pszFormName, WorkflowHandle far *hWorkflow);

Input Parameters:

| | | |
|---|---|---|
| hApp | AppHandle | A long id which identifies the application |
| pWorkflowName | char far* | Null terminated name of the workflow |
| eWfType | WfType | Type of workflow (Request, Offer, None) |
| pszFormName | FormName | Initial Form name for primary workflow. NULL otherwise. |

Output Parameters

| | | |
|---|---|---|
| hWorkflow | WorkflowHandle far* | A long id which identifies the workflow |

Return Value

| | | |
|---|---|---|
| iErrorCode | int | 0 if successful. Builder can use GetErrorStr to get the detail description of error message. |

FVEndWorkflow

Syntax:

int FAR PASCAL FVEndWorkflow(WorkflowHandle hWorkflow);

Input Parameters:

| | | |
|---|---|---|
| hWorkflow | WorkflowHandle | A long id which identifies the workflow |

Output Parameters:

None

Return Value

| | | |
|---|---|---|
| iErrorCode | int | 0 if successful. Builder can use GetErrorStr to get the detail description of error message. |

FVBeginDefRoleToId

Syntax:

int FAR PASCAL FVBeginDefRoleToId (WorkflowHandle hWorkflow);

Input Parameters:

| | | |
|---|---|---|
| hWorkflow | WorkflowHandle | A long id which identifies the workflow |

Output Parameters:

None

Return Value

| | | |
|---|---|---|
| iErrorCode | int | 0 if successful. Builder can use GetErrorStr to get the detail description of error message. |

FVEndDefRoleToId

Syntax:

int FAR PASCAL FVEndDefRoleToId(WorkflowHandle hWorkflow);

Input Parameters:

| | | |
|---|---|---|
| hWorkflow | WorkflowHandle | A long id which identifies the workflow |

Output Parameters:

None

FVDefRoleToId

Syntax:

int FAR PASCAL FVDefRoleToId(WorkflowHandle hWorkflow,
   char far * lpRoleName,
   char far * lpIdentityName);

Input Parameters:

| | | |
|---|---|---|
| hWorkflow | WorkflowHandle | A long id which identifies the workflow |
| lpRoleName | char far* | Name of organizational role |
| lpIdentityName | char far* | Default identity to perform for the given organizational role. |

Output Parameters:

| | |
|---|---|
| None | |

Return Value

| | | |
|---|---|---|
| iErrorCode | int | 0 if successful. Builder can use GetErrorStr to get the detail description of error message. |

FVBeginRole

Syntax:

int FAR PASCAL FVBeginRole(WorkflowHandle hWorkflow, enum Roles eRole, FormName pszFormName, RoleHandle far *hRole);

Input Parameters:

| | | |
|---|---|---|
| hWorkflow | WorkflowHandle | A long id which identifies the workflow context. |
| eRole | enum Roles | Role Id |
| pszFormName | FormName | Role Form name. |

Output Parameters:

| | | |
|---|---|---|
| hRole | RoleHandle far* | A Handle which can be used in subsequent calls |

Return Value

| | | |
|---|---|---|
| iErrorCode | int | 0 if successful. Builder can use GetErrorStr to get the detail description of error message. |

FVEndRole

Syntax:

int FAR PASCAL FVEndRole(RoleHandle hRole);

Input Parameters:

| | | |
|---|---|---|
| hRole | RoleHandle | Handle of role whose specification is over |

Output Parameters

| | |
|---|---|
| None | |

Return Value

| | | |
|---|---|---|
| iErrorCode | int | 0 if successful. Builder can use GetErrorStr to get the detail description of error message. |

FVBeginMoment

Syntax:

int FAR PASCAL FVBeginMoment(long hRole, int bIsAct, ACT eServerId, FormName pszFormName, MomentHandle far *hMoment);

Input Parameters:

| | | |
|---|---|---|
| hRole | RoleHandle | A long id which identifies the role context |
| bIsAct | int | Boolean to specify if act or state |
| eServerId | ACT | Act or State of the moment |
| pszFormName | FormName | Role Form name. |

Output Parameters

| | | |
|---|---|---|
| hMoment | MomentHandle far* | A Handle which can be used in subsequent calls |

Return Value

| | | |
|---|---|---|
| iErrorCode | int | 0 if successful. Builder can use GetErrorStr to get the detail description of error message. |

FVEndMoment

Syntax:

int FAR PASCAL FVEndMoment(MomentHandle hMoment);

Input Parameters:

| | | |
|---|---|---|
| hMoment | MomentHandle | Handle of moment whose specification is over |

Output Parameters

| | |
|---|---|
| None | |

Return Value

| | | |
|---|---|---|
| iErrorCode | int | 0 if successful. Builder can use GetErrorStr to get the detail description of error message. |

FVFieldAttribute

Syntax:

int FAR PASCAL FVFieldAttribute(MomentHandle hMoment, AppDataInfo far *pAppDataInfo, FieldAttribInfo far * pFieldAttribInfo);

Input Parameters:

| hMoment | MomentHandle | Handle of the moment for which this field attribute is. |
| pAppDataInfo | AppDataInfo far* | pointer to struct containing full info about application data |
| pFieldAttribInfo | FieldAttribInfo far* | pointer to structure containing information about the moment specific visibility. |

Output Parameters

None

Return Value

| iErrorCode | int | 0 if successful. Builder can use GetErrorStr to get the detail description of error message. |

FVEndApplication

Syntax:

int FAR PASCAL FVEndApplication(AppHandle hApp);
Input Parameters:

| hApp | AppHandle | A long id which identifies the application. This id will become invalid if this routines terminates successfully. |

Output Parameters

None

Return Value

| iErrorCode | int | 0 if successful. Builder can use GetErrorStr to get the detail description of error message. |

FVAbortApplication

Syntax:

int FAR PASCAL FVAbortApplication(AppHandle hApp);
Input Parameters:

| hApp | AppHandle | A long id which identifies the application. This id will become invalid if this routines terminates successfully. |

Output Parameters

None

Return Value

| iErrorCode | int | 0 if successful. Builder can use GetErrorStr to get the detail description of error message. |

Data Structures

This section is intended to give a complete view of the data structures used in the API calls other than those defined in the Windows API. This includes both the constant values and structure contents.

Enumeration Types

Enumeration data types are given instead of symbolic defines. The definition is as follows:

Workflow Role Types

Workflow roles are those that appear in the workflow. These are defined as follows:

typedef enum Roles {AnyRole, Customer, Performer, Observer};

Customer, Performer, Ovserver workflow roles are used to mean that a given role information is about to be passed. AnyRole is used whenever the role information is either meaningless or applies to any of the three previous rules.

Workflow Types

Workflow Types are the standard types a given workflow can have.

typedef enum WfType {Offer, Request, None };

None is used when Business Process Data is about to be sent.

Visibility/Protection of fields

The visibility and protection of a given field are used when an form field definition is sent and specifies the way a specific field should appear in the form. This is usually stored per act/state.

typedef enum FieldAttr {Hide, Readonly, Editable, Mustfill};

Application Data Types

The following data types are the ones that the Application Builder manages at the time.

typedef enum AppDataType {Undefined, Text, Numeric, Date};

The Undefined type is not currently sent.

Structures

Following are the data structures used to pass information to the Forms Generation Package.

Application Data Information—AppDataInfo

```
struct AppDataInfo {
    char far*           Name,
    enum AppDataType    Type;
    short int           MaxLen;
    char                InitialVal[256];
    AWTIME              TimeVal;
    DWORD               dwOSFieldLength;
    HANDLE              hOSField;
};
```

| Name | char far* | Contains the name of the application data field. The workflow name (empty in the case of a business process application data) and this name define uniquely an application data. The workflow context is set via FVStartWorkflow. |

-continued

| Type | enum AppDataType | Defines the type of this application data. See definition above. |
| --- | --- | --- |
| MaxLen | short int | Defines the maximum allowed length of the field. This value varies depending on the Type value. |
| InitialVal | char [256] | Contains the default/initial value of the field. |
| TimeVal | AWTIME | If Type is date then this variable contains the representation in date format, as specified in the Workflow Client Libraries. |
| dwOsFieldLength | DWORD | Contains the length of the memory block below. |
| hOSField | HANDLE | Memory block of the field as got from the import functionality. May be NULL. It is only defined in the case of a custom Application Builder (as in the case of the Application Builder for Notes) in which the Import fields functionality can obtain such information. |

Field Attribute Information—FieldAttribInfo
Usually the function calls that use this structure also pass AppDataInfo

```
struct FieldAttribInfo {
    const char far*    OwnerWf;       // name of BD owner
    enum FieldAttr     eDataAttrib;   // Field attribute
};
```

| OwnerWf | char far* | Contains the name of the workflow that owns this application data. This value may be different from the context set in FVBeginWorkflow given the visibility rules for application data variables. |
| --- | --- | --- |
| eDataAttrib | enum FieldAttr | Defines the type of this application data. See definition above. |

Defined Types
  AppHandle
  This is used as a handle to an instance of an Application and is defined as a LONG.
  WorkflowHandle
  This is used as a handle to an instance of a Workflow and is defined as a LONG.
  RoleHandle
  This is used as a handle to an instance of an Organizational Role and is defined as a LONG.
  MomentHandle
  This is used as a handle to an instance of a Moment (Act or State) and is defined as a LONG.
  FormName
  This is used as the name of a form and is defined as a char far*.
Error Codes
  The Forms Generation Package should return the following errors as appropriate, whenever an error condition is found. A return code of zero means no error.

| FVERR_LOW_MEMORY | A low memory condition has been found. Execution is stopped. |
| --- | --- |
| FVERR_DB_NOT_OPENED | The database connection (if any) cannot be performed. Execution is stopped |
| FVERR_MAX_FIELDS_REACHED | The number of accepted fields has been exceeded. Execution is stopped. |
| FVERR_FORM_EXISTS | The form to be created is already present. Execution continues. |

We claim:

1. A computer based system for building business process applications, said system including a computer which executes a program, said program when executed by said computer comprising:
   a) means for creating a set of business process definitions for storage in a database and a set of business process applications for execution by a processor, said business process definitions and said business process applications for use with a business process and its associated workflows,
   b) means for generating:
      i) a component representation of at least a predetermined subset of said business process in terms of its workflows, and
      ii) at least a predetermined subset of links between said workflows.

2. The system defined by claim 1 wherein each of said workflows has four phases.

3. The system defined by claim 1 wherein said links are defined by a predetermined set of map rules.

4. The system defined by claim 1 wherein said component representation of said predetermined subset of said business process in terms of its workflows and links between said workflows is represented as at least one image displayed on a video display device.

5. The system defined by claim 1 wherein said links each have a corresponding workflow script.

6. The system defined by claim 5 wherein each of said workflow scripts upon execution causes a workflow server to take a predetermined action.

7. The system defined by claim 1 wherein each of said workflows include at least one act and at least one state.

8. The system defined by claim 7 wherein each of said workflow scripts upon execution causes a workflow server to take a predetermined action.

9. The system defined by claim 7 wherein the workflow states are at least one of Preparation, Negotiation, Performance, Acceptance, Satisfied, Negotiation, Cancelled, Declined and Revoked.

10. The system defined by claim 7 wherein a workflow is one of a request workflow and an offer workflow and the predetermined workflow acts for request workflows are at least one of:

Activate
Initiate
Request
Agree
Counteroffer
Report Completion
Decline
Declare Satisfaction
Cancel
Revoke
Decline To Accept
Agree To Counteroffer Counter
Decline Counteroffer
Comment
and wherein the predetermined workflow states for offer workflows are at least one of:

Activate
Initiate
Offer
Agree to Offer
Counter
Report Completion
Decline Offer
Declare Satisfaction
Cancel
Revoke
Decline To Accept
Agree To Counter
CounterOffer
Decline Counter
Comment.

11. The system defined by claim 1 further comprising checking means for performing consistency checking to assist in the creation of proper business process maps.

12. The system defined by claim 11 wherein said checking means includes a set of business process map rules which are applied to each workflow in said predetermined subset of said business process and are used to determine consistency of said predetermined subset of said business process.

13. The system defined by claim 1 further comprising means for performing a consistency check of said component representation of said predetermined subset of said business process to ensure that proper business process definitions are created.

14. The system defined by claim 1 further comprising means for performing a consistency check of said component representation of said predetermined subset of said business process to ensure that proper business process applications are created.

15. The system defined by claim 1 wherein each business process application is a workflow enabled application including forms and views.

16. The system defined by claim 15 wherein said views provide predetermined status reports and lists of pending system actions.

17. The system defined by claim 15 wherein said forms are associated with particular workflows and provide to a user fields to enter workflow data.

18. The system defined by claim 17 wherein said fields, include at least one of workflow name, customer, performer, conditions of satisfaction, costs and values, cycle times, application data, forms and type of workflow.

19. The system defined by claim 1 further comprising means for automating the generation of workflow scripts used by said business process applications.

20. The system defined by claim 19 wherein said scripts are generated from said workflows based upon a set of predetermined map rules.

21. The system defined by claim 19 wherein said scripts are generated from said links based upon a set of predetermined map rules.

22. The system defined by claim 19 wherein each of said workflow scripts upon execution causes a workflow server to take a predetermined action.

23. The system defined by claim 1 wherein said workflows include roles and identities.

24. The system defined by claim 1 wherein said component representation of said predetermined subset of said business process is a business process map.

25. The system defined by claim 1 further comprising:
tool means for drawing, filing, editing, printing and viewing said predetermined subset of said business process and its associated workflows, and business process application data.

26. The system defined by claim 25 wherein said tool means includes a testing tool which analyses all workflows in the predetermined subset of the business process and generates a report specifying workflows which have at least one of roles, conditions of satisfaction, cycle times and workflow name missing.

27. The system defined by claim 22 wherein said business process application data includes attributes, forms, cycle times, cost and value, roles and identities.

28. The system defined by claim 27 wherein said forms are associated with particular workflows and provide to a user fields to enter workflow data.

29. The system defined by claim 28 wherein said fields, include at least one of workflow name, customer, performer, conditions of satisfaction, costs and values, cycle times, application data, forms and type of workflow.

30. The system defined by claim 1 further comprising scripting means for enabling a user of the system to specify workflow scripts associated with at least one of an act and a state in a workflow and for producing system generated scripts which upon execution implement the links between the workflows of the predetermined subset of the business process.

31. The system defined by claim 24 wherein each of said workflow scripts upon execution causes a workflow server to take a predetermined action.

32. A method for building business process applications utilizing a computer which executes a program, said method comprising the steps of:
a) creating a set of business process definitions for storage in a database and a set of business process applications for execution by a processor, said business process definitions and said business process applications for use with a business process and its associated workflows,
b) generating:
i) a component representation of at least a predetermined subset of said business process in terms of its workflows, and
ii) at least a predetermined subset of links between said workflows.

33. The method defined by claim 32 further comprising the step of performing consistency checking to assist in the creation of proper business process maps.

34. The system defined by claim 32 further comprising the step of performing a consistency check of said component representation of said predetermined subset of said business process to ensure that proper business process definitions are created.

35. The method defined by claim 32 further comprising the step of performing a consistency check of said component representation of said predetermined subset of said business process to ensure that proper business process applications are created.

36. The method defined by claim 32 wherein each business process application is a workflow enabled application including forms and views.

37. The method defined by claim 32 further comprising the step of automating the generation of workflow scripts used by said business process applications.

* * * * *

UNITED STATES PATENT AND TRADEMARK OFFICE
CERTIFICATE OF CORRECTION

PATENT NO. : 5,734,837
DATED : March 31, 1998
INVENTOR(S) : Flores et al.

It is certified that error appears in the above-identified patent and that said Letters Patent is hereby corrected as shown below:

In column 71, at line 55, please delete "fries" and insert --files.--.

Signed and Sealed this

Sixth Day of July, 1999

Attest:

Q. TODD DICKINSON

*Attesting Officer*   Acting Commissioner of Patents and Trademarks